United States Patent [19]
Kitani

[11] Patent Number: 5,625,792
[45] Date of Patent: Apr. 29, 1997

[54] REPRODUCING APPARATUS WITH TRANSFER BUFFER AND SHARED EXTENDED MEMORY

[75] Inventor: Satoshi Kitani, Tokyo, Japan

[73] Assignee: Sony Corporation, Tokyo, Japan

[21] Appl. No.: 548,273

[22] Filed: Oct. 25, 1995

[30] Foreign Application Priority Data

Oct. 27, 1994 [JP] Japan .................................. 6-264202

[51] Int. Cl.⁶ ............................................ G06F 12/02
[52] U.S. Cl. .................................... 395/440; 395/480
[58] Field of Search ............................. 395/440, 439, 395/428, 474, 480

[56] References Cited

U.S. PATENT DOCUMENTS 5,287,468  2/1994  Furuhashi et al. .................. 395/375

*Primary Examiner*—David L. Robertson
*Attorney, Agent, or Firm*—Limbach & Limbach L.L.P.

[57] ABSTRACT

A reproducing apparatus including a rotating means having a disk-like recording medium set thereon and rotating the disk-like recording medium, a reproducing means for reproducing information data from the disk-like recording medium, a control means for controlling at least the rotating means and the reproducing means, a memory means for temporarily storing information data reproduced by the reproducing means and interface means for transferring information data stored in the memory means to an external device in accordance with a read request supplied thereto from the control means, wherein a memory region of the memory means is assigned to a transfer buffer region whose data transfer destination is the disk-like recording medium and an extended memory region from which data is transferred to an arbitrary destination and in which data is inhibited from being replaced to a region in which data is recorded.

7 Claims, 55 Drawing Sheets

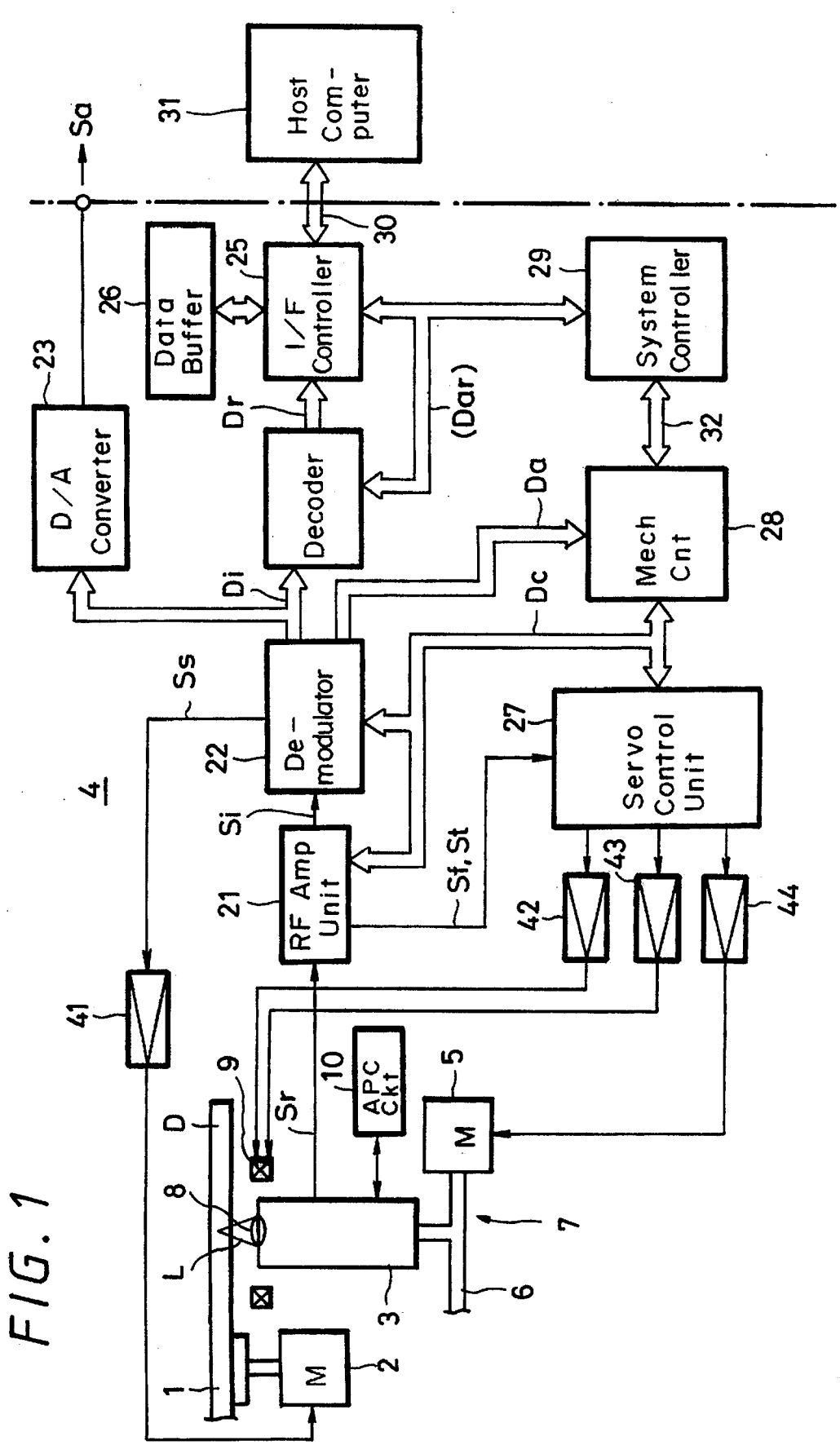

REPRODUCING APPARATUS WITH TRANSFER BUFFER AND SHARED EXTENDED MEMORY

BACKGROUND OF THE INVENTION

The present invention relates to a reproducing apparatus for reproducing information data from a disk-like recording medium, e.g., CD-ROM, a phase-change type optical disk and a magneto-optical disk and, particularly to a reproducing apparatus for transferring information data reproduced from a disk-like recording medium to an external device, e.g., host computer after the information data was temporarily stored therein.

Recently, use of auxiliary storage that can handle mass-storage data becomes indispensable for data processing using computers. In particular, in data processing for processing image data, music data and dictionary data, auxiliary storages are used in computer operation based on GUI (graphical user interface) where previously-determined background image, icon image or character image is displayed on a monitor, computer games, dictionaries and electronic books that can be substantially used as dictionaries.

Read-only optical disks (CD-ROMs) that can record mass-storage data become widespread because image data needs vehemently large capacity of data.

Semiconductor memories are generally assembled into an optical disk reproducing apparatus in order to efficiently transfer data recorded on an optical disk to a host computer. The reason for this is that a data transfer rate can be improved by temporarily storing data from the optical disk in the semiconductor memories.

Data can be stored temporarily even when data is stored in the semiconductor memory in response to a data read request command issued from the host computer to the optical disk. Because, if data except the data stored in the semiconductor memory is to be read out next, i.e., read address on the optical disk is different, data that had been stored in the semiconductor memory is erased and designated data newly read out from the optical disk is stored in the semiconductor memory.

When data is read out from the optical disk, data of a certain address is read out frequently or data of arbitrary address is read out randomly. In such a case, it is customary that the reproducing apparatus stores temporarily data read out from the optical disk in the semiconductor memory and transfers the data temporarily stored in the semiconductor memory to the host computer. Therefore, if data of random address on the optical disk is read out and transferred to the host computer after data has been read out from the address from which data is highly frequently and transferred to the host computer, then the former data is recorded on almost all portion of the semiconductor memory. As a consequence, when data of the address from which data is read out highly frequently is read out one more time, data of the address from which data is read out highly frequently should be read out from the optical disk from the beginning.

Data access time in the reproducing apparatus depends upon an average access time of the reproducing apparatus. Therefore, advantages of the semiconductor memory that is assembled into the reproducing apparatus in order to improve a data transfer rate cannot be demonstrated sufficiently.

SUMMARY OF THE INVENTION

In view of the aforesaid aspect, it is an object of the present invention to provide a reproducing apparatus which can take full advantages of a semiconductor memory assembled into the reproducing apparatus in order to improve a data transfer rate and in which data on an optical disk can be transferred to a host computer efficiently.

It is another object of the present invention to provide a reproducing apparatus in which a semiconductor memory assembled therein can be used as an external storage of a host computer when a capacity of a memory of the host computer is not sufficient.

It is a further object of the present invention to provide a reproducing apparatus in which data for making program concerning the reproducing apparatus and data for making program concerning a host computer can be stored after the reproducing apparatus is deenergized, facilitating a maintenance of a system.

According to the present invention, there is provided a reproducing apparatus which comprises a rotating means having a disk-like recording medium set thereon and rotating the disk-like recording medium set thereon, a reproducing means for reproducing information data from the disk-like recording medium, a control means for controlling at least the rotating means and the reproducing means, a memory means for temporarily storing information data reproduced by the reproducing means, and an interface means for transferring information data stored in the memory means to an external device in response to a read request supplied thereto from the control means. The memory region of the memory means is assigned to a transfer buffer region from which data is transferred to the disk-like recording medium and an extended memory region from which data is transferred to an arbitrary destination and in which data is inhibited from being replaced to a data holding portion.

In the reproducing apparatus according to the present invention, the disk-like recording medium is rotated loaded on the rotating means is rotated by the rotating means and the information data recorded on the disk-like recording medium is reproduced by the reproducing means.

The information data reproduced by the reproducing means is temporarily stored in a transfer buffer region of the memory region of the memory means and then transferred to the external device by the interface means. Since the data is transferred from the transfer buffer region to the disk-like recording medium, data reproduced from the disk-like recording medium by the reproducing means is temporarily stored in the transfer buffer region. In this case, past data is erased and present data is overwritten.

The data reproduced by the reproducing means is also stored in the extended memory region of the memory region of the memory means. Since data is inhibited from being replaced to the stored data hold portion unlike the case of the transfer buffer region, the past data can be prevented from being erased and the present data can be prevented from being overwritten. Specifically, the data that was stored in the extended memory region once is held on the extended memory region without being affected even when data is read out from the disk-like recording medium next.

Therefore, if data of address from which data is read out from the disk-like recording medium highly frequently is stored in the extended memory region and data of other address are temporarily stored in the transfer buffer region, when data of the address from which data is read out highly frequently is transferred to the external device, data need not be frequently read out from a proper address of the disk-like recording medium by the reproducing means but data store in the extended memory region can be directly transferred to the external device.

As a consequence, a data access time for the reproducing apparatus does not depend upon the average access time of the reproducing apparatus, thereby making it possible to demonstrate a performance of the average access time or higher.

In the reproducing apparatus according to the present invention, effects of the memory means (e.g., semiconductor memory) assembled thereunto in order to improve data transfer efficiency can be demonstrated sufficiently and data on the disk-like recording medium can be efficiently transferred to the external device.

Since data in the extended memory region can be transferred to the arbitrary destination, data transferred from the external device also can be stored in the extended memory region. If the capacity of the memory of the external device is not sufficient, then it becomes possible to use the extended memory region as an external storage of the external device.

The reproducing apparatus further includes an extended memory reserve means for logically assigning the memory region of the memory means to a transfer buffer region and an extended memory region. When an extended memory reserve request from the external device is not received, the memory region is used as the transfer buffer region and data from the disk-like recording medium is transferred through the memory region to the external device.

The extended memory reserve means logically assigns the memory region to the transfer buffer region and the extended memory region based on the extended memory reserve request supplied thereto from the external device. Thereafter, the above-mentioned data access is carried out through the transfer buffer region and the extended memory region. Specifically, data on random address on the disk-like recording medium is transferred to the external device through the transfer buffer region from the disk-like recording medium. Data on the address from which data is read out highly frequently is transferred through the extended memory region to the external device. Further, data from the external device 31 is stored in the extended memory region.

As described above, the memory region of the memory means is used as the transfer buffer region from which data is transferred only to the disk-like recording medium. Also, a part of the region can be used as the extended memory region from which data is transferred to the arbitrary destination by supplying the extended memory reserve request from the external device. Therefore, the memory means (semiconductor memory) incorporated in the reproducing apparatus can be used sufficiently and effects of the memory means can be demonstrated satisfactorily.

The reproducing apparatus further includes a first transfer means for transferring data on a predetermined address on the disk-like recording medium through the extended memory region to the external device in response to a first data read request command for reading data on the predetermined address previously-determined on the disk-like recording medium and transferring data stored in the extended memory region to the external device in response to a second or following read request command, and a second transfer means for transferring data of a predetermined address on the disk-like recording medium through the transfer buffer region to the external device in response to a data read request command for reading data on other address than the predetermined address on the disk-like recording medium.

If the data read request command for reading data on other address than the previously-determined predetermined address on the disk-like recording medium is received, then data reproduced by the reproducing means is transferred by the second transfer means through the transfer buffer region of the memory region in the memory means to the external device. When data on other address than the predetermined address is transferred to the external device from the next time, the address data reproduced by the reproducing means is transferred by the second transfer means through the transfer buffer region to the external device. Specifically, while data on the transfer buffer region are sequentially overwritten, data is transferred to the external device.

If on the other hand a data read request command for reading data of a previously-determined predetermined address on the disk-like recording medium is received, in response to the first read request command, the address data reproduced by the reproducing means is stored by the first transfer means in the extended memory region of the memory region of the memory means and the data stored in the extended memory region is transferred by the first transfer means to the external device. Further, the data stored in the extended memory region is transferred by the first transfer means to the external device.

When the data of the predetermined address is transferred to the external device from the next time, the data stored in the extended memory region is directly transferred by the first transfer means to the external device. Specifically, when the data of the predetermined address is transferred to the external device, data need not be read out from the corresponding address on the disk-like recording medium by the reproducing means and data stored in the extended memory region can be directly transferred to the external device.

The reproducing apparatus further includes a third transfer means for transferring data temporarily stored in the transfer buffer region to the extended memory region on the basis of the region transfer request command supplied thereto from the external device.

When data of a second predetermined address determined later on the optical disk is stored by the second transfer means in the transfer buffer region, data within the transfer buffer region is transferred by the third transfer means to the extended memory region on the basis of the region transfer request command supplied thereto from the external device.

This becomes effective when the address from which data is highly frequently read becomes clear later. The address from which data is highly frequently read out is clear from the beginning or becomes clear later when the reproducing apparatus has been in use. According to the present invention, when data of the address from which data is highly frequently read out and which become clear later is stored by the second transfer means in the transfer buffer region, the third transfer means can transfer and store the data in the extended memory region. When data of the address which becomes clear as the address from which data is read out highly frequently is transferred from the next time, data stored not in the disk-like recording medium but in the extended memory region can be transferred to the external device. As a result, data transfer between the reproducing apparatus and the external device can be carried out highly efficiently.

The reproducing apparatus further includes a data write means for writing data transferred from the external device in the extended memory region on the basis of a data write request command supplied thereto from the external device.

In this case, the data write means can write data transferred thereto from the external device in the extended memory region on the basis of the data write request command supplied thereto from the external device. When the capacity of the memory of the external device is not sufficient, this extended memory region can be used as the external storage of the external device.

The reproducing apparatus further includes a reserve cancel means for canceling the logical assignment of the transfer buffer region and the extended memory region to the memory means by the extended memory reserve means on the basis of the reserve cancel request command supplied thereto from the external device and assigning a whole of the memory region of the memory means or the extended memory region concerning the request to the transfer buffer region.

The above reserve cancel means becomes effective for the following case.

When a disk-like recording medium with fixed data, which need not be accessed frequently, recorded therein (e.g., data recorded on the disk-like recording medium is of the sequential file format) is accessed, the reserve cancel means assigns a whole of the recording region or the extended memory region concerning the above request to the transfer buffer region, whereby one data transfer size can be enlarged. Therefore, the access time for accessing the disk-like recording medium can be reduced efficiently.

Further, the extended memory region of the memory means can be formed of a nonvolatile semiconductor memory. When the extended memory region of the memory means is formed of the nonvolatile semiconductor memory, if the data write means writes data made by the program operation in the reproducing apparatus, e.g., address to be read out next, various parameters and data made by the program operation in the external device, such as address which becomes clear later as the address from which data is read out highly frequently and various parameters, in the extended memory region, then the above data can be held after the power switch of the reproducing apparatus has been turned off and a sudden power failure occurred. Therefore, it becomes possible to facilitate the later system maintenance.

BRIEF DESCRIPTION OF THE DRAWINGS

FIG. 1 is a block diagram showing a reproducing apparatus according to the present invention applied to a CD-ROM drive in which a read-only optical disk (CD-ROM) is a recording medium used as an external storage of a host computer;

DETAILED DESCRIPTION OF THE PREFERRED EMBODIMENT

Figure 2B:
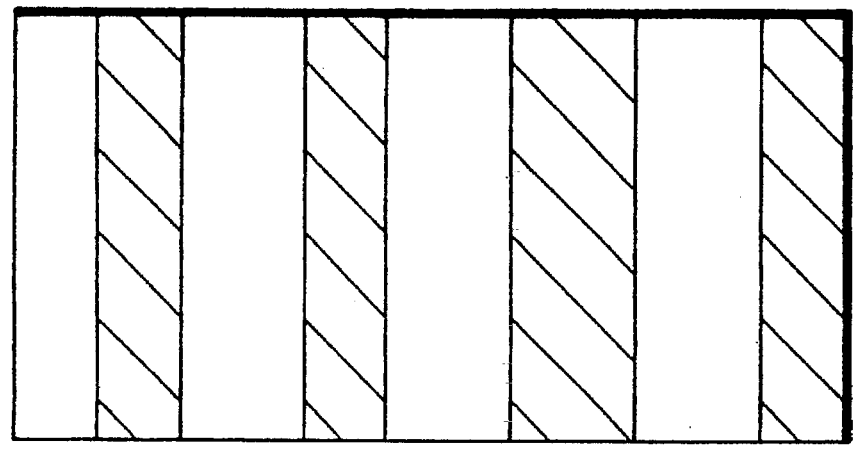
FIGS. 2A and 2B are schematic diagrams showing a manner in which extended memory regions are logically allocated to a data buffer.

A reproducing apparatus according to the present invention applied to a CD-ROM drive where a read-only optical disk (CD-ROM) is a recording medium used as an external storage of a host computer will be described with reference to FIG. 1 through FIGS. 55A, 55B.

FIG. 1 of the accompanying drawings shows a reproducing apparatus according to the present invention. As shown in FIG. 1, the reproducing apparatus comprises a turntable 1 with an optical disk D loaded thereon, a spindle motor (M) 2 for rotating the optical disk D loaded on the turntable 1 at a constant linear velocity (CLV), for example, an optical pickup 3 for reproducing an information signal from the rotating optical disk D and a signal processing system 4 for demodulating a reproduced signal Sr from the optical pickup 3 to transmit the reproduced signal Sr to the outside as reproduced data.

The optical disk D has tracks where irregular patterns, i.e., phase pits are formed concentrically or spirally on the basis of a recorded information signal on one surface. Specifically, the optical disk D comprises a disk base made of a transparent synthetic resin such as polycarbonate or polymethyl methacrylate (PMMA), a reflecting film made of metal such as Al or Au formed so as to cover the phase pits formed on one surface of the disk base and a protecting layer formed on the reflecting film so as to protect the reflecting film.

Further, the optical disk D has data concerning attribute of the optical disk D, e.g., track pitch, the number of tracks, etc., i.e., TOC data recorded on its inner peripheral portion as pit information as irregular patterns. The optical disk D has image data, audio data and ROM (read-only memory) data such as dictionary data recorded on its portions except the system region in which the TOC data is recorded.

The optical pickup 3 can be moved in the radius direction of the optical disk D by a known optical pickup slide mechanism 7 mainly composed of a linear motor (M) 5 and a guide shaft 6. The optical pickup 3 includes at least a semiconductor laser (not shown) serving as a laser light source, an objective lens 8 for focusing laser beam L emitted from this semiconductor laser on a recording surface of the optical disk D, a photodetector (not shown) for detecting the laser beam L emitted from the semiconductor laser and converting detected laser beam into an electrical signal (i.e., reproduced signal), and a beam splitter (not shown) for spatially separating reflected laser beam and laser beam emitted from the semiconductor laser.

The objective lens 8 can be moved close to or away from the optical disk D and moved along the radius direction of the optical disk D in very small ranges by a two-dimensional actuator 9 of a simple arrangement. The two-dimensional actuator 9 is formed of a magnetic circuit composed of a focusing coil, a tracking coil and a magnet not shown.

The optical pickup 3 includes therein another photodetector (not shown) for detecting an intensity (power) of laser beam L. A detected signal from this photodetector is supplied to an automatic power control (APC) circuit 10 disposed outside the optical pickup 3. The APC circuit 10 controls a power of the laser light source on the basis of the detected signal supplied thereto from the photodetector such that the laser light source can be oscillated stably.

As shown in FIG. 1, the signal processing system 4 comprises an RF amplifier unit 21, a demodulator 22, a digital-to-analog (D/A) converter 23, a decoder 24, an interface protocol controller (hereinafter simply referred to as an I/F controller) 25, a data buffer 26, a servo control unit 27, a mechanism controller 28, and a system controller 29 for controlling these circuits. Further, a host computer 31 is connected through an interface bus 30 to the rear stage of the I/F controller 25. The mechanism controller 28 and the system controller 29 each composed of a micro-processing unit are connected to each other by an internal bus 32.

A motor driver 41 for supplying a drive current to the spindle motor 2 is connected to the front stage of the spindle motor 2 which rotates the optical disk D. A focusing driver 42 an a tracking driver 43 for supplying excitation currents to the focusing coil and the tracking coil are connected to the front stage of the two-dimensional actuator 9 which moves the objective lens 8 in a very small range. A motor driver 44 for supplying a drive current to the motor 5 is connected to the front stage of the motor 5 which is the drive source of the optical pickup slide mechanism.

The RF amplifier unit 21 amplifies the reproduced signal Sr from the photodetector in the optical pickup 3 to generate an information signal Si, a focus error signal Sf and a tracking error signal St from an amplified reproduced signal. The demodulator 22 and the servo control unit 27 are connected to the rear stage of the RF amplifier unit 21. The information signal Si is supplied to the demodulator 22 and the focus error signal Sf and the tracking error signal St are supplied to the servo control unit 27.

The demodulator 22 demodulates the information signal Si supplied thereto from the RF amplifier unit 21 in an eight-to-fourteen (EFM) fashion and also decodes the information signal Si in a proper decoding such as error-correction to provide digital reproduced data Di. The demodulator 22 incorporates therein a spindle servo error signal generator (not shown) for extracting a reference signal from the information signal Si. The spindle servo error signal generator generates and outputs a spindle servo error signal Ss for rotating the optical disk D at the same linear velocity as that used when the optical disk D is produced by mastering on the basis of the reference signal to the motor driver 41.

The servo control unit 21 includes therein a focus servo circuit, a tracking servo circuit and a motor servo circuit for servo-controlling the optical pickup slide mechanism 7, though not shown. Data (servo gain, etc.) concerning servo-control, a servo drive control signal such as a drive signal from the mechanism controller 28 and the focus error signal Sf and the tracking error signal St from the RF amplifier 21 are supplied to these servo circuits, respectively.

In the servo control unit 27, the focus servo circuit moves the objective lens 6 close to or away from the optical disk D to properly adjust the focus of the objective lens 8 by driving and controlling the two-dimensional actuator 9 of the optical pickup 3 on the basis of the focus error signal Sf supplied thereto from the RF amplifier unit 21, to be more concrete, the signal Sf which results from calculating by the RF amplifier unit 21 in a predetermined manner a detected signal corresponding to an amount of reflected laser beam reflected from a mirror surface when laser beam is irradiated on the mirror surface of the optical disk D.

In the servo control unit 27, the tracking servo circuit moves the objective lens 8 in the radius direction of the optical disk D to adjust the tracking by driving and controlling the two-dimensional actuator 9 of the optical pickup 3 on the basis of the tracking error signal St supplied thereto from the RF amplifier unit 21, to be more concrete, a signal which results from by the RF amplifier unit 21 in a predetermined manner a detected signal obtained when guide groove formed on the optical disk D are detected.

In the servo control unit 27, the motor servo circuit moves the optical pickup 3 to a desired track by driving the motor 5 of the optical pickup slide mechanism 7 on the basis of a seek operation request signal, a track jump request signal and a step-jump request signal supplied thereto from the mechanism controller 28.

The decoder 24 converts the reproduced data Di output thereto from the demodulator 22 into data of code form handled by the host computer 31, i.e., ROM data Dr. The decoder 24 generates address data (hereinafter referred to as ROM address data) corresponding to the ROM data Dr. The D/A converter 23 converts the reproduced data Di output thereto from the demodulator 22 into an analog reproduced signal Sa. The D/A converter 23 is effective, particularly, for converting audio data recorded on the optical disk D into the analog audio signal Sa.

Subcode address data Da of the reproduced data Di from the demodulator 22 is input to the mechanism controller 28.

Typical operation of the mechanism controller 28 will be described below. The system controller 29 outputs a read control signal to the mechanism controller 28 on the basis of the read request signal input to the system controller 29 from the host computer 31, for example.

The mechanism controller 28 controls the optical pickup 3 on the basis of the read control signal input thereto from the system controller 29 and the subcode address data Da input thereto from the demodulator 22 such that the optical pickup 3 can be moved to a track ahead of the track corresponding to the request address (read address) in a seek operation mode, a track jump operation mode and in a step-jump operation mode.

When the optical pickup 3 reaches the track ahead of the target track, the system controller 29 identifies ROM address data Dar supplied thereto from the decoder 24 and the read address data supplied thereto from the host computer 31 and outputs a read control signal corresponding to an identified result to the mechanism controller 28, whereby the optical pickup 3 is moved to the track portion corresponding to the read address through the mechanism controller 28.

When the optical pickup 3 reaches the track corresponding to the read address, the system controller 29 outputs a read signal to the mechanism controller 28. The mechanism controller 28 outputs control data Dc to the RF amplifier unit 21 and the demodulator 22 on the basis of the read signal input thereto from the system controller 29, thereby reproducing data recorded on the corresponding track.

When the reproduced data Di is supplied to the decoder 24 from the demodulator 22, the ROM address data Dar is supplied to the system controller 29, whereby only data of requested address is transferred through the I/F controller 25 to the data buffer 26.

Figure 2A:
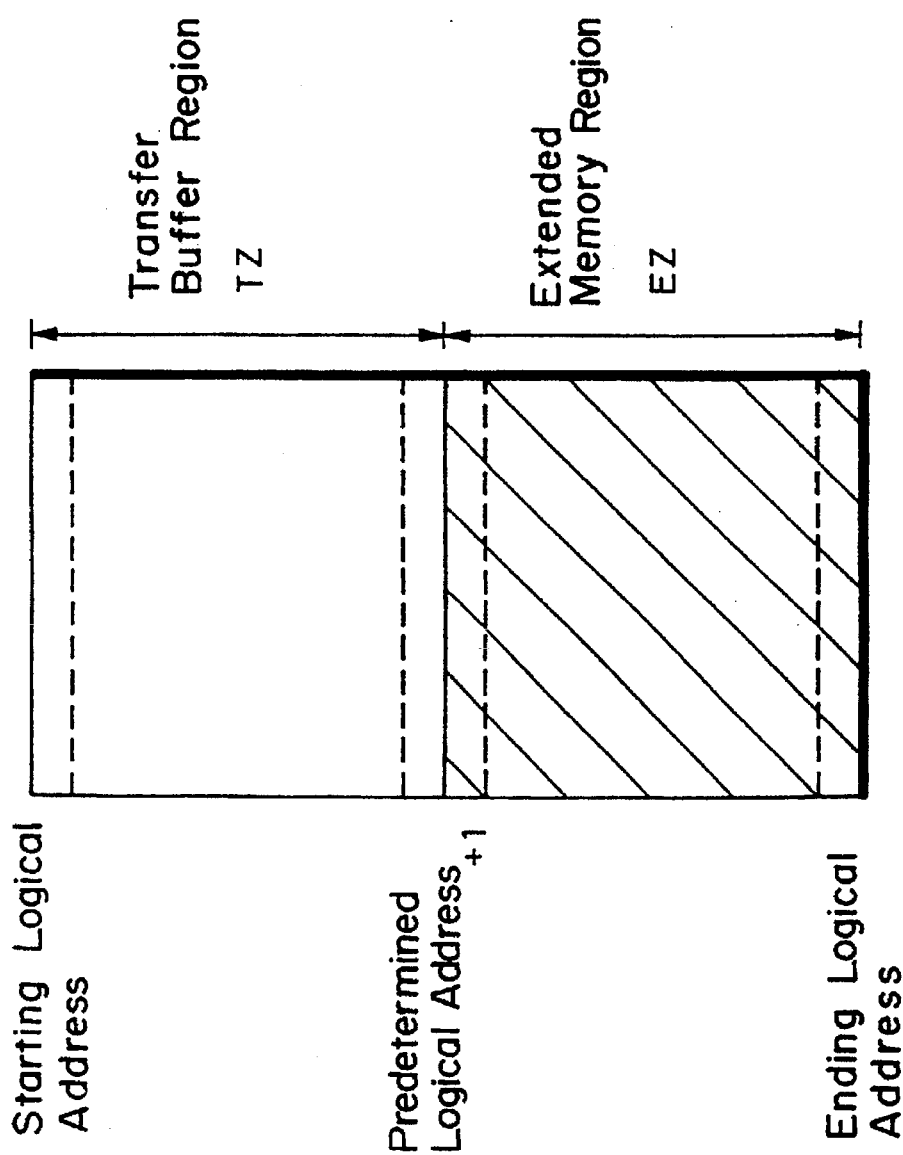

The data buffer 26 is formed of a semiconductor memory such as dynamic random-access memory (DRAM) or static random-access memory (SRAM). As shown in FIG. 2A, for example, a memory region of the data buffer 26 from a starting logical address (relative sector address) to a predetermined logical address (relative sector address) is assigned to a transfer buffer region TZ. A memory region from the predetermined logical address +1 to an ending logical address is assigned to an extended memory region (shown hatched). The allocation of the memory regions is not limited to those shown in FIG. 2A and a plurality of extended memory regions EZ are assigned as shown in FIG. 2B.

The reproduced data from the decoder 24 is stored in the transfer buffer region TZ of the data buffer 26. The reproduced data Di stored in the transfer buffer region TZ is then transferred through the I/F controller 25 to the host computer 31.

The reproducing apparatus prepares the following commands:

(1) Reserve command
(2) Read command
(3) Extended read command
(4) Block transfer command
(5) Extended write command
(6) Extended transfer command
(7) Reserve cancel command Except the read command (2), these commands are used to select a manner in which the data buffer 26 is used. The above commands input from the host computer 31 are supplied to the I/F controller 25 in accordance with an interface protocol such as SCSI (small computer systems interface) which is often used in reproducing apparatus.

Having received a command from the host computer 31, the I/F controller 25 informs the reception of the command to the system controller 29 by use of an interrupt signal, for example. The system controller 29 recognizes the supply of the command from the host computer 31 on the basis of the interrupt signal and receives the command from the I/F controller 25. Having received the command, the system controller 29 interprets the content of the command and executes a processing corresponding to the command.

The commands will be described in detail, wherein the address in the memory region of the data buffer 26 shown in FIGS. 2A, 2B is handled as a logical address corresponding to the data of one sector in the optical disk D.

(1) Reserve command:

The reserve command is used to reserve an extended memory region in the memory region of the data buffer 26. The reserve command has the starting logical address and the ending logical address of the extended memory as parameters. As a consequence, the region from the starting logical address to the ending logical address of the extended memory is used as the extended memory region EZ and the remaining regions are used as the transfer buffer region TZ.

(2) Read command:

The read command enables the host computer 3 to read the reproduced data Di from the optical disk D through the transfer buffer region TZ as the ROM data Dr.

The read command has the starting address of the data read out from the optical disk D and the number of sectors of the data to be read as parameters. When receiving the read command, the system controller 29 confirms whether or not requested data is stored in the transfer buffer region TZ. If the requested data is stored in the transfer buffer region TZ, then the system controller 29 transfers the requested data through the I/F controller 25 to the host computer 31.

If the requested data is not stored in the transfer buffer region TZ, then the system controller 29 instructs the mechanism controller 28 through the internal bus 32 such that the mechanism controller 28 retrieves the optical disk D. The mechanism controller 28 reproduces data from the corresponding address of the optical disk D by controlling the RF amplifier unit 21, the servo control unit 27 and the demodulator 22.

The resultant reproduced data Di is converted by the decoder 24 into the ROM data Dr. Simultaneously, the system controller 29 obtains the ROM address information Dar which results from decoding the reproduced data Di. The system controller 29 controls the I/F controller 25 on the basis of the ROM address information Dar such that only the data requested by the host computer 31 is transferred to the transfer buffer region TZ.

When the requested data is stored in the transfer buffer region TZ, the stored data is transferred through the I/F controller 25 to the host computer 31.

(3) Extended read command:

The extended read command is used to transfer data from the optical disk D to a designated region of the extended memory region EZ so that data stored in the designated region EZ is transferred to the host computer 31. A procedure is equal to that of "(2) Read command".

(4) Block transfer command:

The block transfer command is used to transfer data stored in the transfer buffer region TZ to a designated region of the extended memory region EZ. By this block transfer command, there are designated a data transfer starting logical address within the transfer buffer region TZ, the number of transfer sectors and a write starting logical address within the extended memory region EZ.

(5) Extended write command:

The extended write command is used to write data from the host computer 31 in a designated region of the extended memory region EZ. By this extended write command, after the write starting address logical address within the extended memory region EZ and the number of transfer sectors are designated, data is transmitted from the host computer 3.

(6) Extended transfer command:

The extended transfer command is used to transfer data stored in a designated region of the extended memory region EZ to the host computer 31. By this extended transfer command, after the read starting logical address within the extended memory region EX and the number of transfer sectors are designated, data is transmitted to the host computer 31.

(7) Reserve cancel command:

The reserve cancel command is used to cancel a reserve region of the extended memory region EZ so that the whole of the memory region of the data buffer 26 or the extended memory region EZ which is to be reserve-canceled is assigned to the transfer buffer region TZ. The starting logical address of the extended memory region EZ is designated by the reserve cancel command.

A manner in which the reproducing apparatus is operated in response to the above commands, in particular, data is transmitted and received to and from the data buffer 26 will be described with reference to the hardware of the I/F controller 25, functional block diagrams, flowcharts, the hardware of the system controller 29, functional block diagrams and flowcharts.

Figure 3:
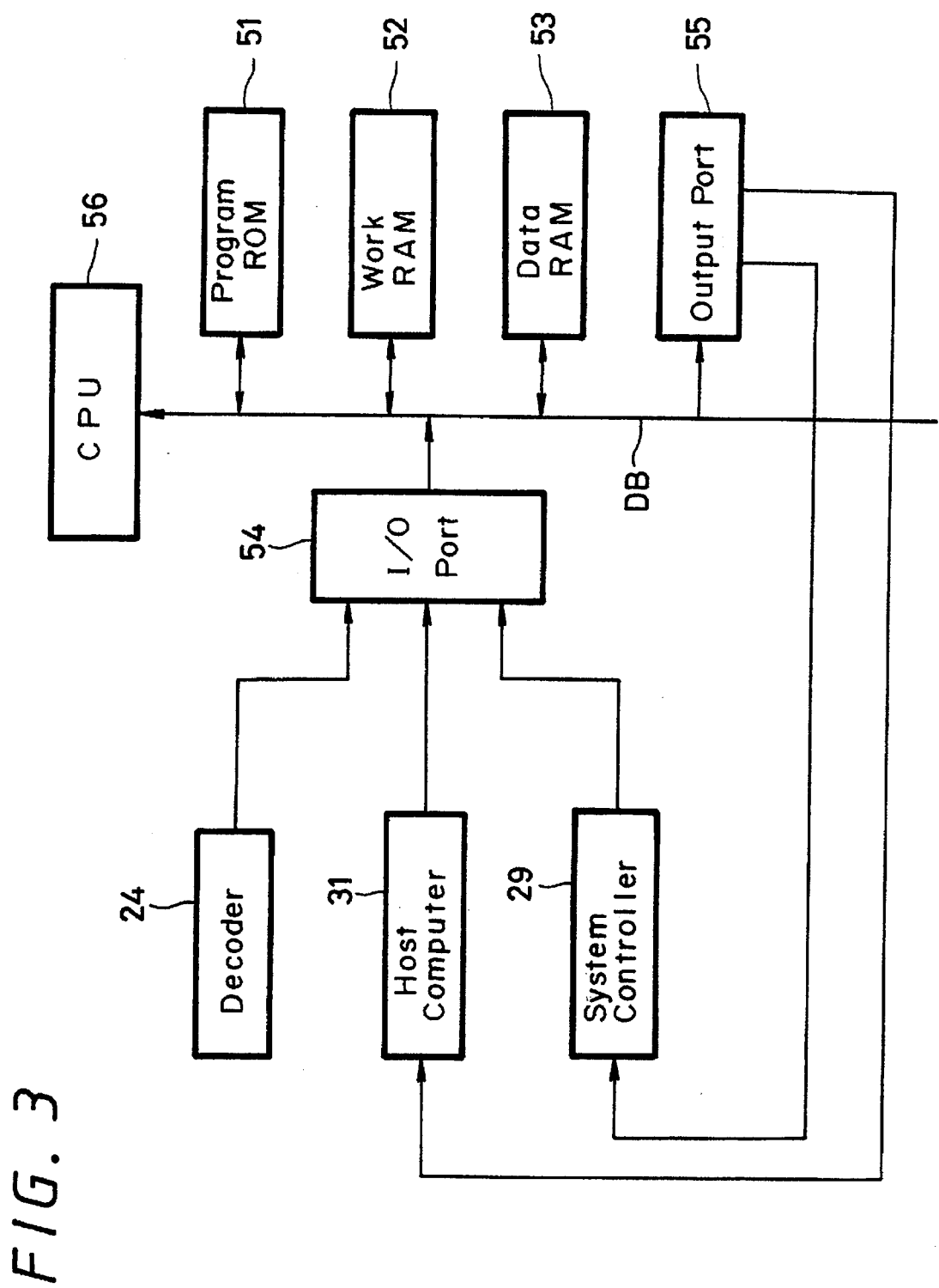
FIG. 3 is a block diagram showing a hardware of an I/F controller.

The hardware of the I/F controller 25 will be described with reference to FIG. 3. As shown in FIG. 3, the I/F controller 25 comprises a program ROM 51 with various programs registered therein, a work RAM 52 used as work area for the programs read out from the program ROM 51, a data RAM 52 with digital data from external circuits (decoder 24, host computer 31 and system controller 29) and variable data formed by program stored therein, an input port 54 supplied with input data from the external circuits, an output port 55 for outputting data stored in the data RAM 53 to the external circuits and a CPU (control device and logical unit) 56 for controlling these circuits.

Data are transmitted and received among these circuits through a data bus DB led out from the CPU 56. These circuits are controlled by the CPU 56 through a control bus (not shown) led out from the CPU 56. A variety of digital data from the decoder 24, the host computer 31 and the system controller 29 are supplied through the input port 54 to the data bus DB.

Figure 7:
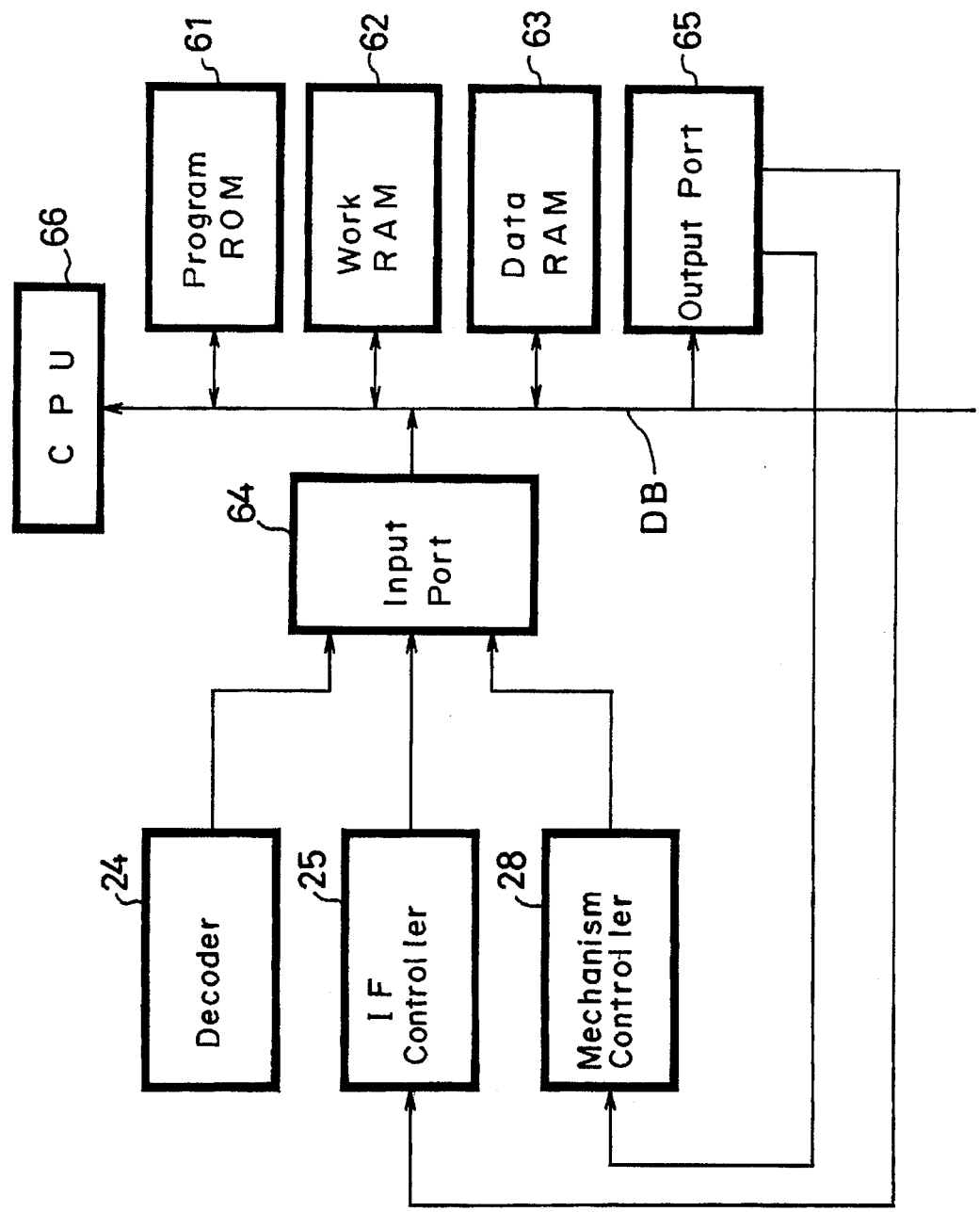
FIG. 7 is a block diagrams showing a hardware of a system controller.

The hardware of the system controller 29 will be described with reference to FIG. 7. As shown in FIG. 7, the system controller 29 comprises a program ROM 61 with various programs registered therein, a work RAM 62 used as a work area in which programs read out from the program ROM 61 are operated, a data RAM 63 with digital data from the external circuits (I/F controller 25 and mechanism controller 28) and variable data formed by programs stored therein, an input port 64 supplied with input data from the external circuits, an output port 65 for outputting data stored in the data RAM 63 to the external circuits and a CPU (control device and logical unit) 66 for controlling these circuits.

Various data are transmitted and received among these circuits through a data bus DB led out from the CPU 66. These circuits are controlled through a control bus (not shown) led out from the CPU 66 by the CPU 66. Various digital data from the I/F controller 25 and the mechanism controller 28 are supplied through the input port 64 to the data bus DB.

Operation of the I/F controller 25 and the system controller 28 will be described in detail.

Figure 5:
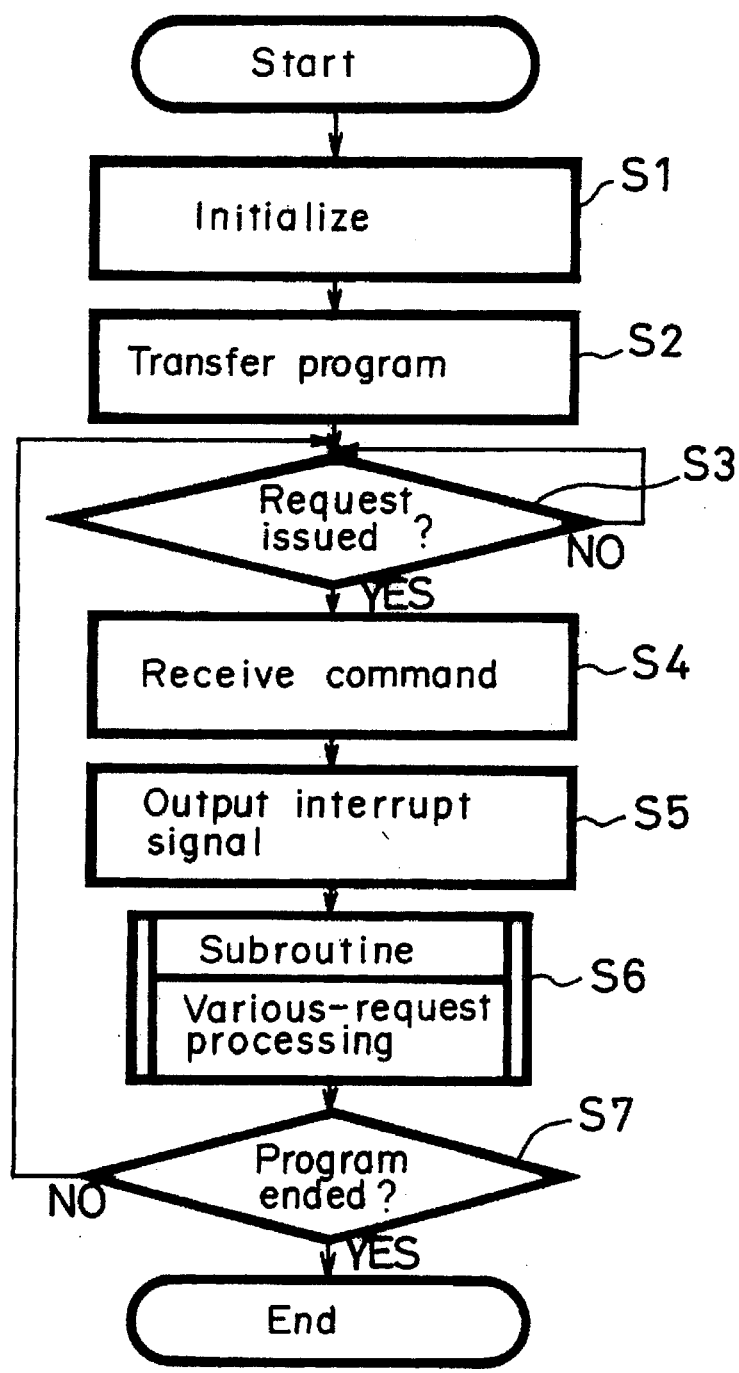
FIG. 5 is a flowchart to which reference will be made in explaining an operation of the data transfer processing means in the I/F controller.

Referring to FIG. 5, following the start of operation, the I/F controller 25 is initialized in step S1. For example, the system and memory within the I/F controller 25 are checked and the I/F controller 25 is setup.

In the next step S2, the program ROM 51 outputs the command from the host computer 31 to the system controller 29. A data transfer processing program which is a data transfer processing means 71 (see FIG. 4) is read out on the basis of the parameter corresponding to the command from the system controller 29 and written in the work RAM 52. Simultaneously, work areas for temporarily saving data during the program is operated and for transmitting and receiving variable of routines forming these programs are assigned to the work RAM 52.

Figure 4:
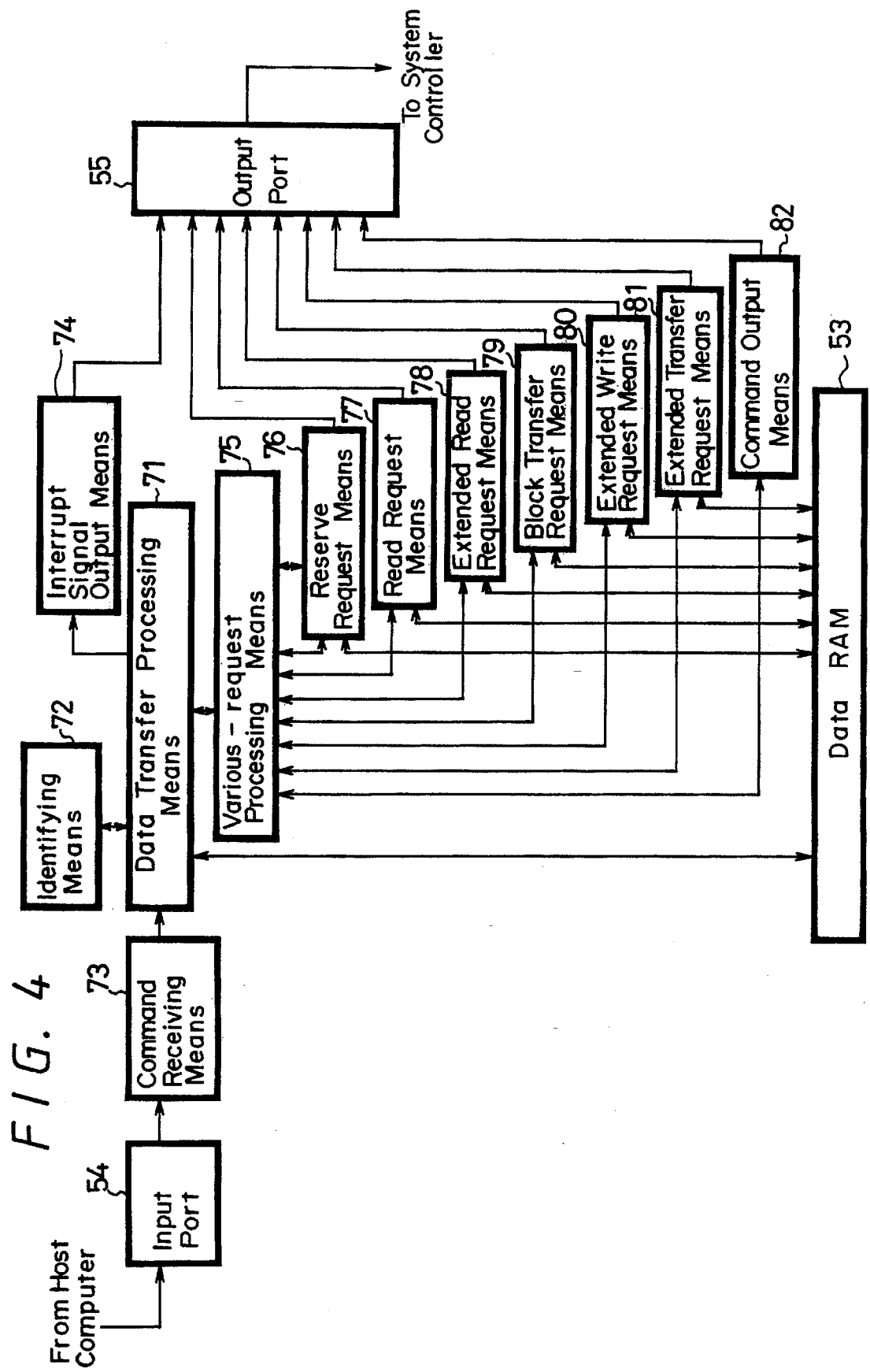
FIG. 4 is a functional block diagram showing a data transfer processing means in the I/F controller.

The data transfer processing program 71 read out to the work RAM 52 comprises, as shown in FIG. 4, an identifying means 72 for effecting various identifications, a command receiving means 73 for receiving commands from the host computer 31, an interrupt signal outputting means 74 for outputting an interrupt signal to the system controller 29 on the basis of data indicative of the fact that the command receiving means 73 receives the command, and various-request processing means 75 for branching processing corresponding to the commands.

The various-request processing means 74 has the following means that are selectively activated in response to the above commands:

A reserve request means 76 for outputting a reserve command from the host computer 31 to the system controller 29, receiving information table from the system controller 29 and logically assigning the extended memory region EZ to the data buffer 26 on the basis of data on the information table;

A read request means 77 for outputting a read command from the host computer 31 to the system controller 29 and transferring reproduced data (ROM data) from the optical disk D through the transfer buffer region TZ to the host computer 31 in response to parameters supplied thereto from the system controller 29;

An extended read request means 78 for outputting an extended read command from the host computer 31 to the system controller 29 and transferring reproduced data from the optical disk D through the extended memory region EZ of the data buffer 26 to the host computer 31 in response to parameters supplied thereto from the system controller 29;

A block transfer request means 79 for outputting a block transfer command from the host computer 31 to the system controller 29 and writing data of the transfer buffer region TZ in the extended memory region EZ of the data buffer 26 in response to parameters supplied thereto from the system controller 26;

An extended write request means 80 for outputting an extended write command from the host computer 31 to the system controller 29 and writing transfer data from the host computer 31 in the extended memory region EZ in response to parameters supplied thereto from the system controller 29;

An extended transfer request means 81 for outputting an extended transfer command from the host computer 31 to the system controller 29 and transferring data of the extended memory region EZ to the host computer 31 in response to parameters supplied thereto from the system controller 29; and A command output means 82 for outputting a reserve cancel command supplied from the host computer 31 to the system controller 29.

At decision step S3 in the flowchart of FIG. 5, it is determined by the identifying means 72 whether or not the host computer 31 issues a request, i.e., command from the host computer is input. The decision step S3 is repeated until a command from the host computer 31 is input and the reproducing apparatus awaits the input of the command.

If the command is input as represented by a YES at decision step S3, then the processing proceeds to step S4, whereat the command receiving means 73 receives the command from the host computer 31 and stores the received command in the command storage region of the data RAM 53. In the next step S5, the interrupt signal outputting means 74 outputs the interrupt signal indicative of the reception of command to the system controller 29.

Figure 6:
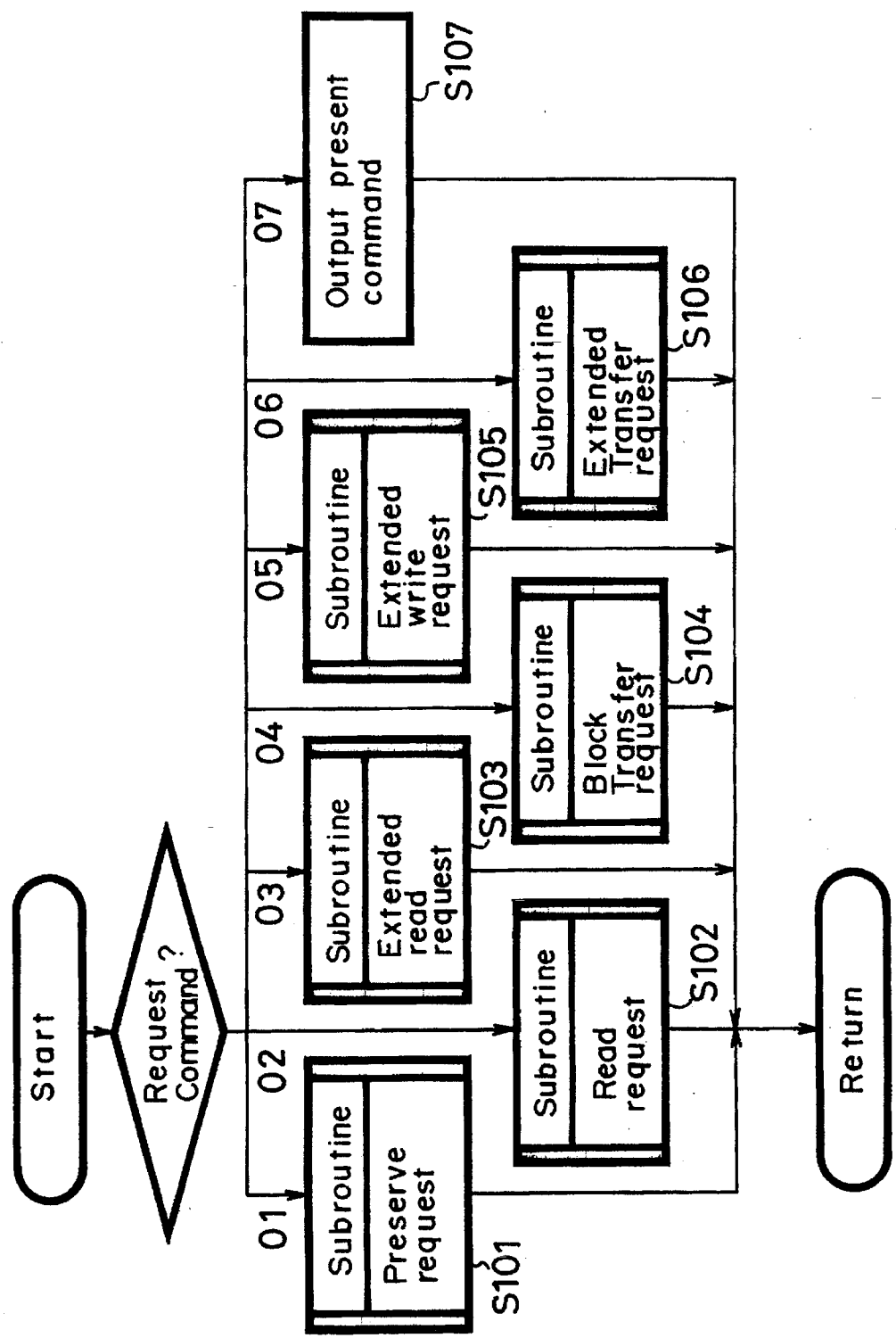
FIG. 6 is a flowchart to which reference will be made in explaining an operation of a various request processing means in the I/F controller.

In the next step S6, the processing enters a various-request processing subroutine (various-request processing means) 75. As shown in FIG. 6, in the various-request processing subroutine 75, following the start of operation, the processing enters corresponding subroutines from the reserve request to the extended write request in response to contents of input commands, i.e., reserve request subroutine (reserve request means 76) S101, read request subroutine (read request means 77) S102, extended read request subroutine (extended read request means 78) S103, block transfer request subroutine (block transfer request means 79) S104, extended write request subroutine (extended write request means 80) S105 and extended transfer request subroutine (extended transfer request means 81) S106. If a command is a reserve cancel request, then the processing proceeds to step S107, whereat the command output means 82 outputs a present command to the system controller 29.

If the request processing corresponding to each command is ended, then the processing returns to the main routine shown in FIG. 5. It is determined in the next decision step S7 by the identifying means 72 whether or not a program end request command is issued. The program end request command is identified when the power switch is turned off or maintenance interrupt is made (when a new program is planted on the basis of function-increase data under the on-line circumstance).

If the program end request is not issued as represented by a NO at decision step S7, then the processing returns to step S3, whereat the input of the command is awaited. If on the other hand the program end request is issued as represented by a YES at decision step S7, then the data transfer processing program is ended.

Figure 9:
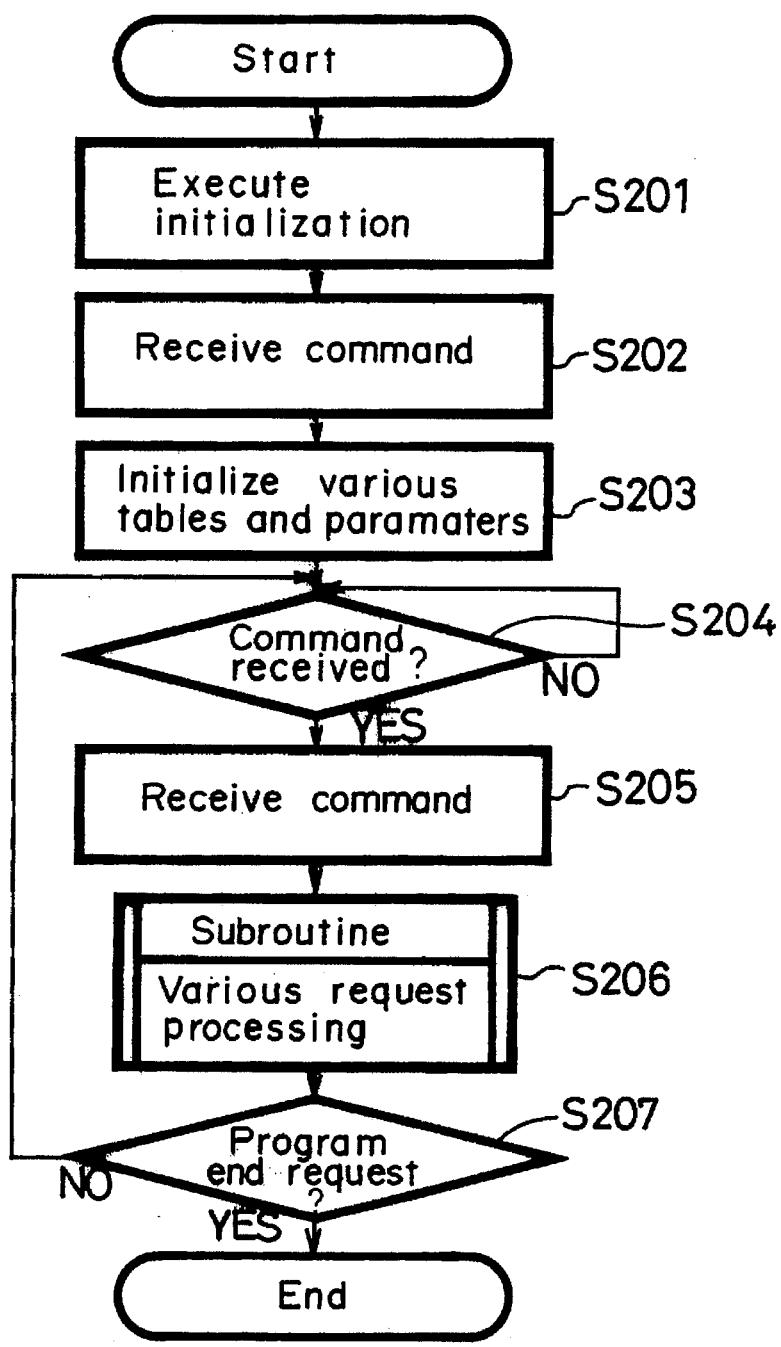
FIG. 9 is a flowchart to which reference will be made in explaining an operation of the command processing means in the system controller.

In the system controller 29, at step S201 in FIG. 9, at the same time the power switch is turned on, the initialization is carried out, e.g., the system and memory of the system controller are checked and the setup is executed.

In the next step S202, the program ROM 61 receives the command from the I/F controller 25, makes various tables in response to the received command and further makes parameters which are supplied to the I/F controller 25. A command processing program which is an output means 91 (see FIG. 8) of the I/F controller 25 is read out and written in the work RAM 62. Concurrently therewith, work areas for temporarily saving data made during this program is operated and for receiving and transmitting variables of routines constructing these programs are assigned to the work RAM 62.

Figure 8:
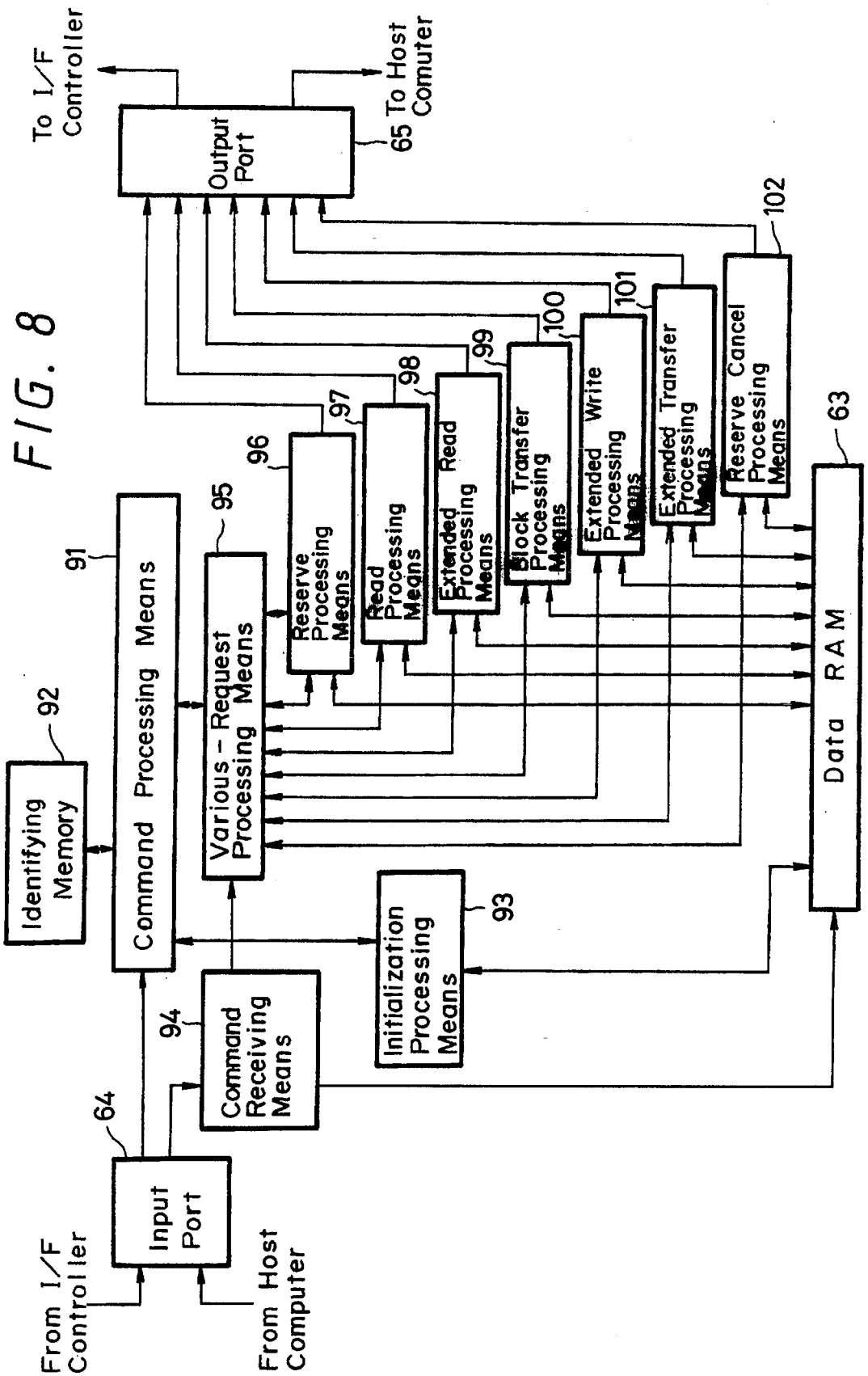
FIG. 8 is a functional block diagram showing a command processing means in the system controller.

As shown in FIG. 8, the command processing program 91 read out to the work RAM 62 comprises an identifying means 92 for effecting various identifications, an initialization processing means 93 for initializing contents of various tables and parameters, a command receiving means 94 for receiving commands from the I/F controller 25, and various-request processing means 95 for branching the processing into processing corresponding to the input command.

The various-request processing means 95 have the following means which are selectively activated in response to commands:

A reserve processing means 96 for receiving a reserve command from the I/F controller 25, making various tables on the basis of the received command and transferring the various tables to the I/F controller 25;

A read processing means 97 for receiving a read command from the I/F controller 25, correcting the various tables, making read parameters having the write starting logical address of the transfer buffer region TZ and outputting the read parameters to the I/F controller 25;

An extended read processing means 98 for receiving an extended read command from the I/F controller 25, correcting various tables, making extended read parameters having a write start logical address of the extended memory region EZ and outputting the extended read parameters to the I/F controller 25;

A block transfer processing means 99 for receiving a block transfer command from the I/F controller 25, correcting various tables, making block transfer parameters having the read starting logical address of the transfer buffer region TZ and the write start logical address of the extended memory region EZ and outputting the block transfer parameters to the I/F controller 25;

An extended write processing means 100 for receiving an extended write command from the I/F controller 25, correcting various tables, making extended write parameters having the write start logical address of the extended memory region EZ and outputting the extended write parameters to the I/F controller 25;

An extended transfer processing means 101 for receiving an extended transfer command from the I/F controller 25, making extended transfer parameters having the read start logical address of the extended memory region EZ and outputting the extended transfer parameters to the I/F controller 25; and A reserve cancel processing means 102 for receiving a reserve cancel command from the I/F controller 25 and correcting various tables for canceling a reserve.

In step S203 of the flowchart of FIG. 9, the initialization processing means 93 initializes various tables and parameters. For examples, an EOF (end of file) code is stored in a starting record of the table and "0" is stored in storage regions of various tables.

It is determined in the next decision step S204 by the identification means 92 whether or not the I/F controller 25 issues a request command, i.e., whether or not the interrupt signal from the I/F controller 25 is input. The decision step S204 is repeated until the interrupt signal from the I/F controller 25 is input. The apparatus awaits the input of the interrupt signal.

If the interrupt signal is input as represented by a YES at decision step S204, then the processing proceeds to step S205, whereat the command receiving means 94 receives the command from the I/F controller 25 and stores the received command in the command storage region of the data RAM 63.

Figure 10:
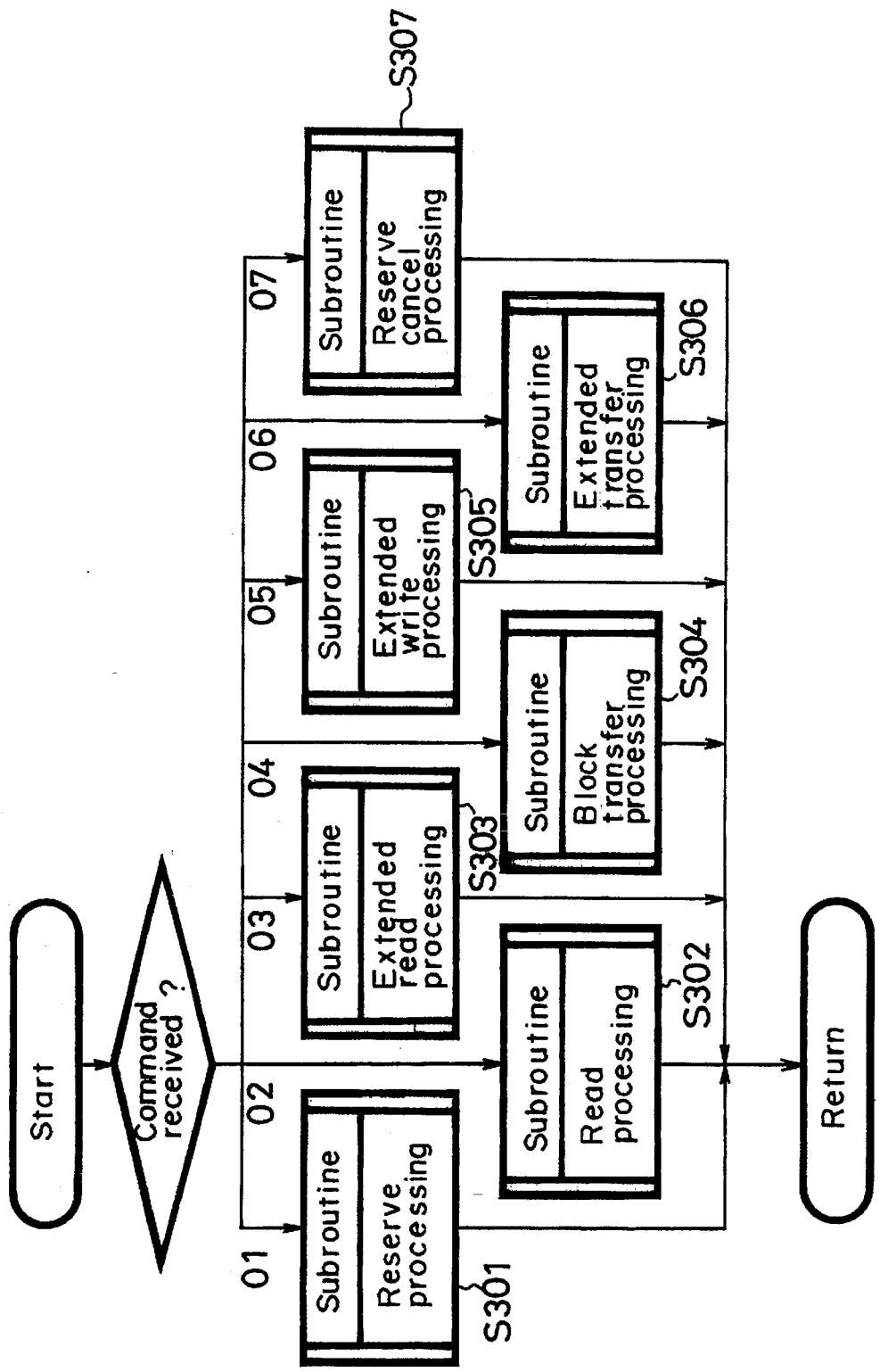
FIG. 10 is a flowchart to which reference will be made in explaining an operation of the various request processing means in the system controller.

In the next step S206, the processing enters a various-request processing subroutine (various-request processing means) 95. In this subroutine 95, as shown in FIG. 10, the processing enters corresponding subroutines in response to contents of input commands, i.e., a reserve processing subroutine (reserve processing means 96) S301, a read processing subroutine (read processing means 97) S302, an extended read processing subroutine (extended read processing means 98) S303, a block transfer processing subroutine (block transfer processing means 99) S304, an extended write processing subroutine (extended write processing means 100) S305, an extended transfer processing subroutine (extended transfer processing means 101) S306, and a reserve cancel processing subroutine (reserve cancel processing means 102) S307.

When the request processing corresponding to the command is ended, then the processing returns to the main routine in FIG. 9. It is determined at the next decision step S207 by the identifying means 92 whether or not a program end request is issued. In other words, it is determined whether or not the program end request is issued when the power switch is turned off or maintenance interrupt is executed (when a new program is planted on the basis of increase of functions under the on-line circumstance).

If the program end request is not issued as represented by a NO at decision step S207, then the processing returns to step S204, whereat the apparatus awaits the input of command. If on the other hand the program end request is issued as represented by a YES at decision step S207, then this data transfer processing program 91 is ended.

A manner in which the I/F controller 25 and the system controller 29 are operated in response to commands from the host computer 31 will be described below.

A reserve processing of extended memory region will be described.

When a reserve command is input to the I/F controller 25 from the host computer 31, the processing enters from the various-request processing subroutine 75 to the reserve request subroutine (reserve request means 76).

Figure 11:
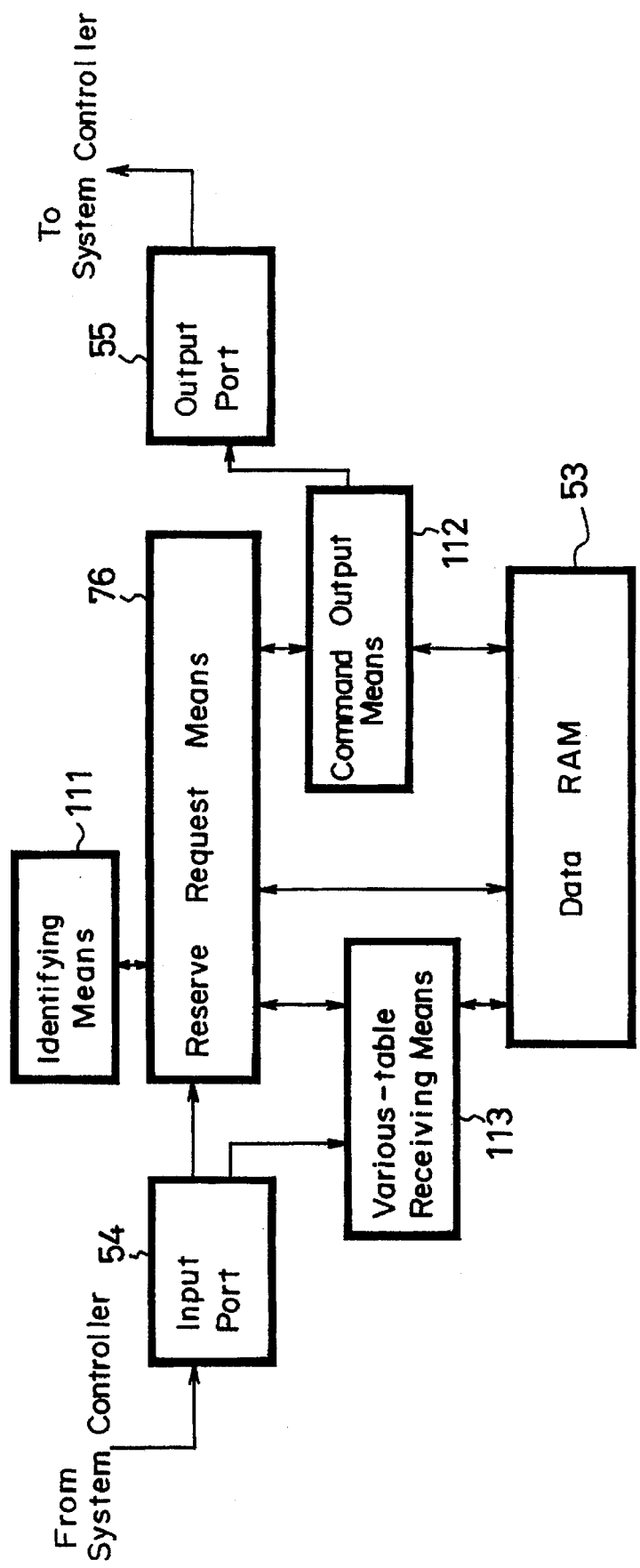
FIG. 11 is a functional block diagram showing a reserved request means in the I/F controller.

As shown in FIG. 11, the reserve request means 76 comprises an identifying means 111 for effecting various identifications, a command output means for outputting a command to the system controller 29, and various-table receiving means 113 for receiving various tables transferred thereto from the system controller 29.

Figure 12:
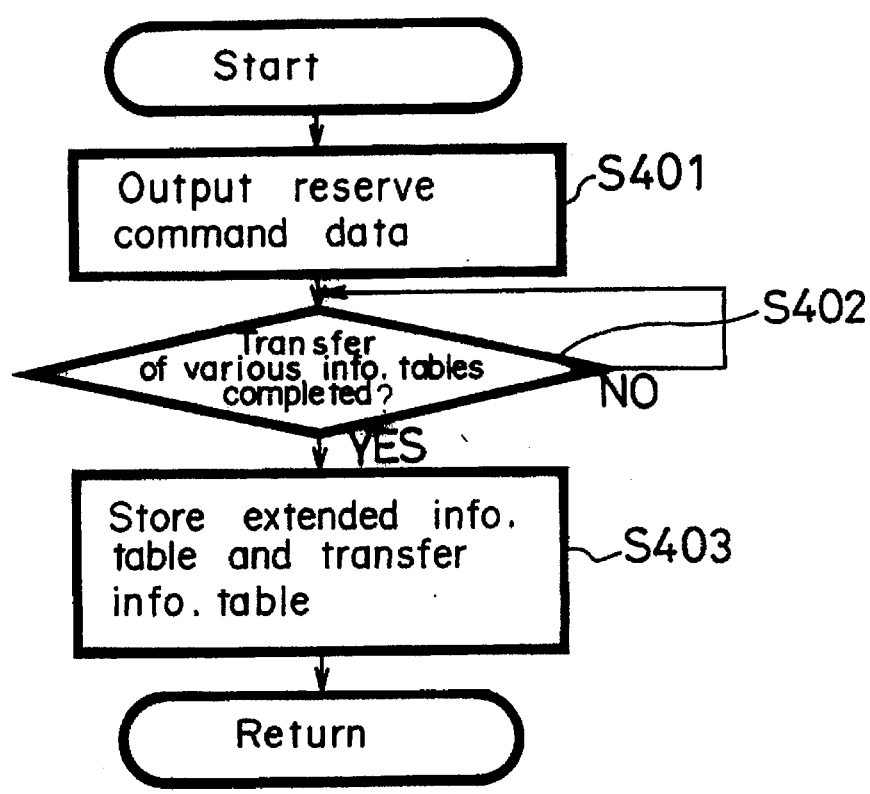
FIG. 12 is a flowchart to which reference will be made in explaining operation of the reserved request means in the I/F controller.

In step S401 of FIG. 12, the reserve request means 76 outputs reserve command data stored in the command storage region to the system controller 29 through the command output means 112.

In the system controller 29, when the reserve command data is input from the I/F controller 25, the processing enters from the various-request processing subroutine shown in FIG. 10 to the reserve processing subroutine (reserve processing means 96). The reserve command data is composed of a start logical address (relative sector address) of the extended memory region EZ and an end logical address (relative sector address) of the extended memory region EZ.

Figure 13:
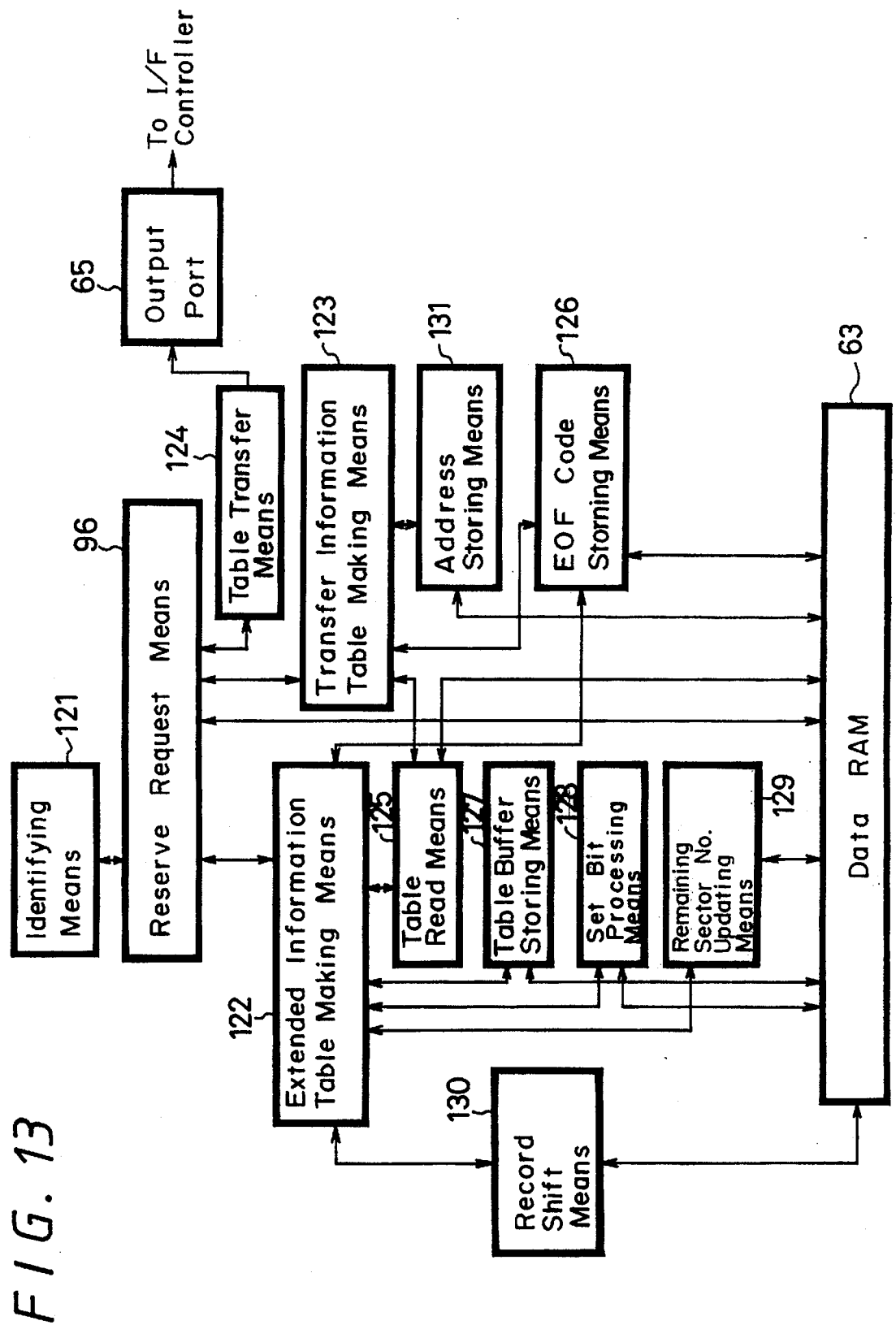
FIG. 13 is a functional block diagram showing a reserved processing means in the system controller.

As shown in FIG. 13, the reserve processing means 96 comprises an identifying means 121 for effecting various identifications, an extended information table making means 122 for making an extended information table developed in a predetermined region of the data RAM 63, a transfer information table making means 123 for making a transfer information table developed in a predetermined region of the data RAM 63, and a table transfer means 124 for transferring the extended information table and the transfer information table made by the two information table making means 122, 123 to the I/F controller 25.

The reserve processing means 96 further includes a table read means 125 activated by the extended information table making means 122 or the transfer information table means 123, an EOF code storing means 126, a table buffer storing means 127 activated only by the extended information table making means 122, a set bit processing means 128, a remaining sector number updating means 129, a record shift means 130 and an address storing mean 131 activated only by the transfer information making means 123.

The table read means 125 reads the extended information table or the transfer information table at every record. The EOF code storing means 126 stores the EOF code in the last record of each information table. The table buffer storing means 127 stores the table buffer developed on the data RAM 63 in the corresponding table of the extended information table. The set bit processing means 128 set-bits instruction information bit of the corresponding record of the extended information table. The remaining sector number updating means increment the sector number of the extended memory region EZ incremented when the extended memory region EZ is expanded on the basis of reserve command or decrements the sector number of the transfer buffer region TZ decreased when the extended memory region EZ is expanded on the basis of reserve command. The record shift means 130 shifts record groups following the corresponding record of the extended information table such that the record begins with a predetermined record.

Figure 54B:
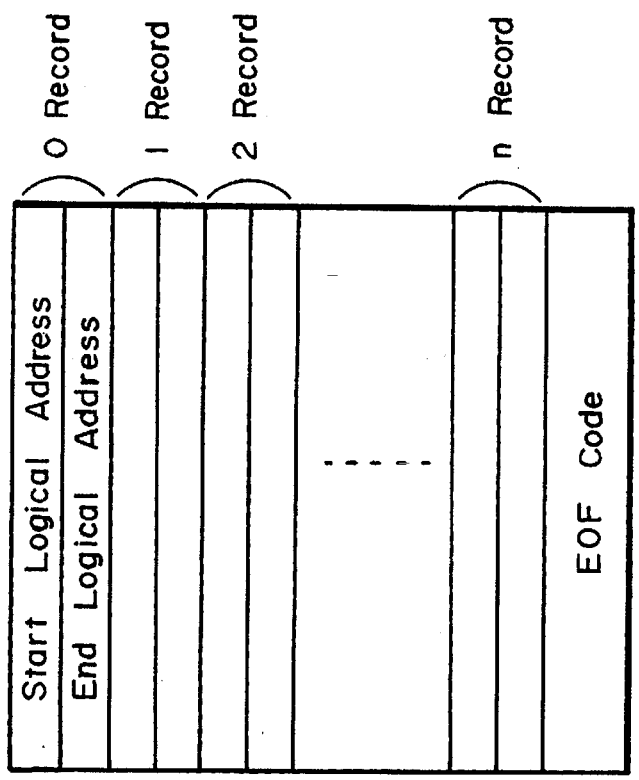
FIGS. 54A, 54B, and 54C are diagrams showing records of an extended information table and a transfer information table and bits of an information flag.
Figure 54A:
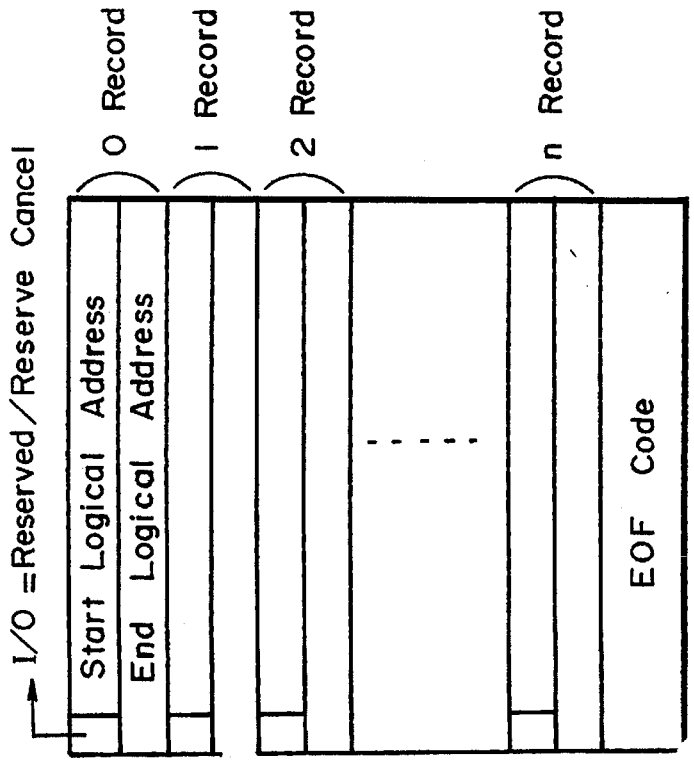

As shown in FIG. 54A, the extended information table includes records corresponding to the number of reserve. A first bit of one record is an indicating information bit indicative of reserved or reserve cancel, i.e., I/O=reserved/reserve cancel. Further, the record has regions in which a start logical address (relative sector address) and an end logical address (relative sector address) are stored, in addition to the indicating information bit.

On the other hand, as shown in FIG. 54B, the transfer information table has records the number of which is equal to reserved number of the extended memory region EZ or the number corresponding to plus or minus 1. One record includes regions in which a start logical address (relative sector) and an end logical address (relative sector) are stored.

Figure 14:
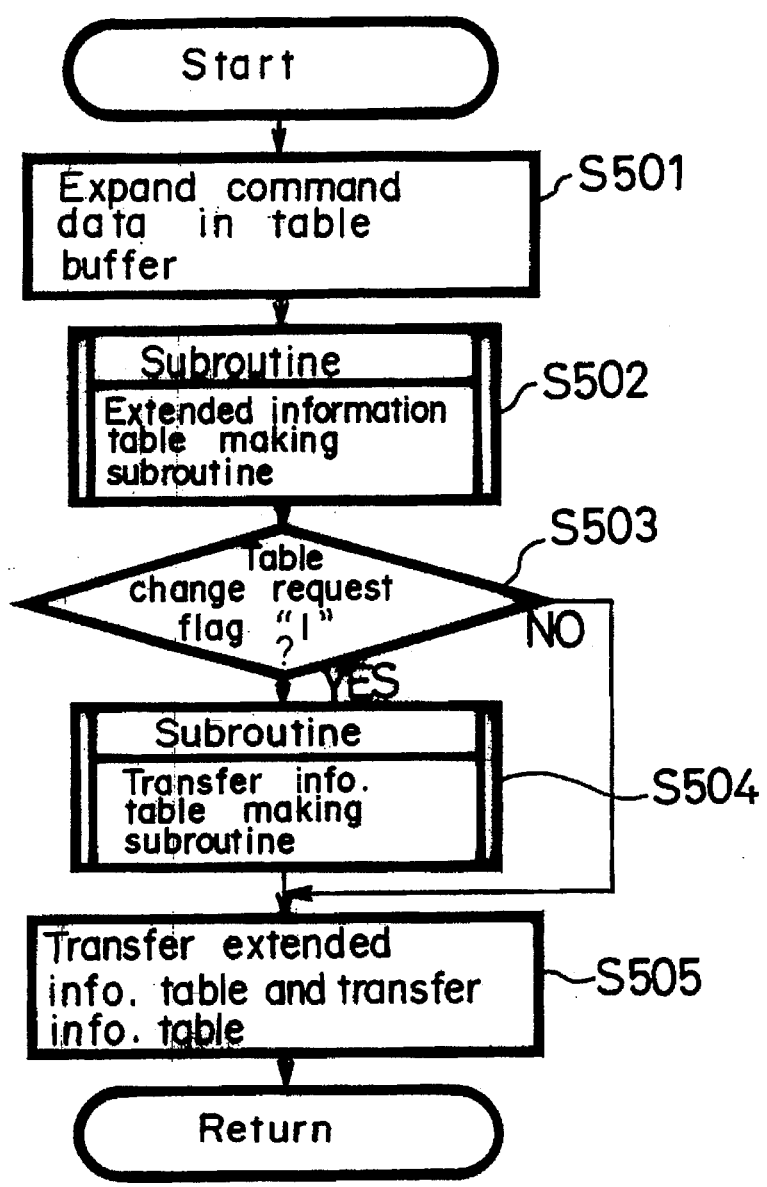
FIG. 14 is a flowchart to which reference will be made in explaining an operation of the reserved processing means in the system controller.

In step S501 of FIG. 14, the reserve processing means 96 expands the command data stored in the command storing region in the table buffer. The table buffer has the same arrangement as one record of the extended information table shown in FIG. 54A. In step S501, command data (start logical address data and end logical address data) are stored in the arrangement order of one record in the extended information table and reserved bits are set.

Figure 15:
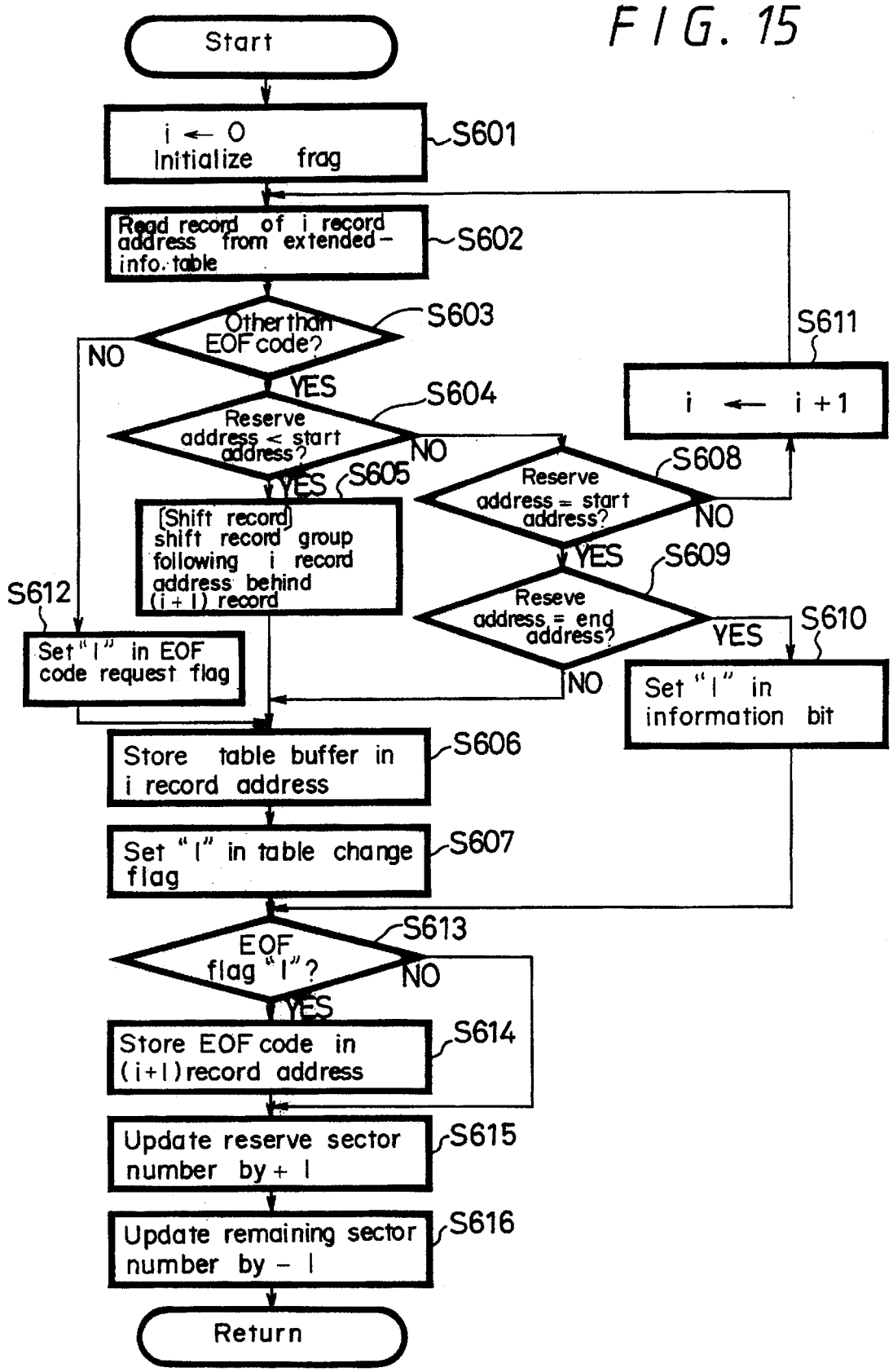
FIG. 15 is a flowchart to which reference will be made in explaining an operation of an extended information table making means in the reserved processing means of the system controller.
Figure 54C:
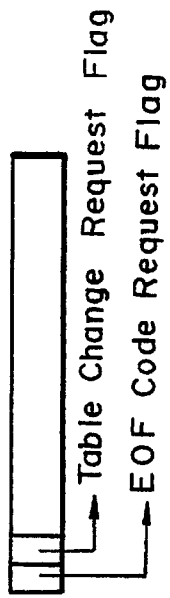

In the next step S502, the processing enters an extended information table making subroutine (extended information table making means). In this subroutine, as shown in FIG. 15, in step S601, an index register i which becomes a record read index of the extended information table is initialized, i.e., value "0" is stored in the index register i. Further, "0" is stored in the information flag shown in FIG. 54C. This information flag comprises a first bit indicative of an EOF code request flag and a second bit indicative of a table change request flag.

In the next step S602, the table read means 125 reads a record of the number indicated by the index register from the extended information table, i.e., a record of i record address from the extended information table. It is determined in the next decision step S603 by the identifying means 122 whether or not the content of the record of the i record address is the EOF code.

If the content of the i record address is other than the EOF code as represented by a YES at decision step S603, then the processing proceeds to the next decision step S604, whereat it is determined by the identifying means 121 whether or not the record should be shifted. This identification is carried out by determining whether or not the start logical address concerning the present reserve stored in the table buffer is smaller than the start logical address stored in the record of the i record address.

If the start logical address concerning the present reserve is smaller than the start logical address concerning the i record address as represented by a YES at decision step S604, then the processing proceeds to the next step S605, whereat the record shift means 130 shifts record groups following the i record address behind (i+1) record in the extended information table.

In the next step S606, the table buffer storing means 127 stores a present table buffer in the i record address of the extended information table In the next step S607, "1" is set in the table change flag of the information flag.

It is determined in decision step S604 that the start logical address concerning the present reserve is not smaller than the start logical address concerning the i record address, then the processing proceeds to the next decision step S608. It is determined in decision step S608 by the identifying means 121 whether or not the start logical address concerning the present reserve is equal to the start logical address concerning the i address. If these address are equal as represented by a YES at decision step S608, then the processing proceeds to the next decision step S609. It is determined at decision step S609 by the identifying means 121 whether or not the end logical address concerning the present reserve is equal to the end logical address concerning the i record address.

If the two address are not equal as represented by a NO at decision step S609, then the processing proceeds to step S606 and the following steps are repeated. If the two addresses are agreed with each other as represented by a YES at decision step S609, then the processing proceeds to step S610, whereat the set-bit processing means 128 sets "1" in the information bit indicated by the i record address of the extended information table. In other words, the region from the start logical address to the end logical address stored in the i record address of the extended memory region EZ is registered as a reserved region.

If the start logical address concerning the present reserve is not equal to the start logical address of the i record address as represented by a NO at decision step S608, then the processing proceeds to step S611, whereat the index register i is updated by +1. Thereafter, the processing returns to step S602, whereat the next record of the extended information table is read out. Then, the step S603 and the following steps are repeated.

If the content of the/record is the EOF code as represented by a NO at decision step S603, then the processing proceeds to step S612, whereat "1" is set in the EOF code request of the information flag. Then, the processing proceeds to step S606 and the step S606 and the following steps are executed.

After the processing in the step S607 and the processing in the step S610 are ended, then the processing proceeds to decision step S613, whereat it is determined by the identifying means 121 whether or not the EOF code request flag in the information flag is "1".

If the EOF code request flag is "1" as represented by a YES at decision step S613, then the processing proceeds to step S614, whereat the EOF code storing means 126 stores the EOF code in (i+1) record address of the extended information table. Then, the processing proceeds to the next step S615, wherein the reserve sector number updating means 129 updates the reserve sector number of the extended memory region EZ by +1. Specifically, a value which results from subtracting (reserve start logical address −1) from the end logical address concerning the present reserve is added to a value stored in the reserve sector number storing region assigned to the data RAM and stored in the reserve number sector storing region.

In the next step S616, the remaining sector number updating means 129 updates the remaining sector number of the transfer buffer region TZ by −1. Specifically, a value which results from subtracting the reserve sector number calculated at step S615 from the whole sector number of the data buffer is stored in the remaining sector number storing region assigned to the data RAM.

If the EOF code request flag is "0" as represented by a NO at decision step S613, then the processing directly proceeds to step S615 and the step S615 and the following steps are executed. When the processing at the step S616 is ended, this extended information table making subroutine 122 is ended.

When the processing returns to the main routine shown in FIG. 14 and the extended information making subroutine 122 in step S502 is ended, then the processing proceeds to the next decision step S503, whereat it is determined by the identifying means 121 whether or not the table change request flag in the information flag is "1".

Figure 16:
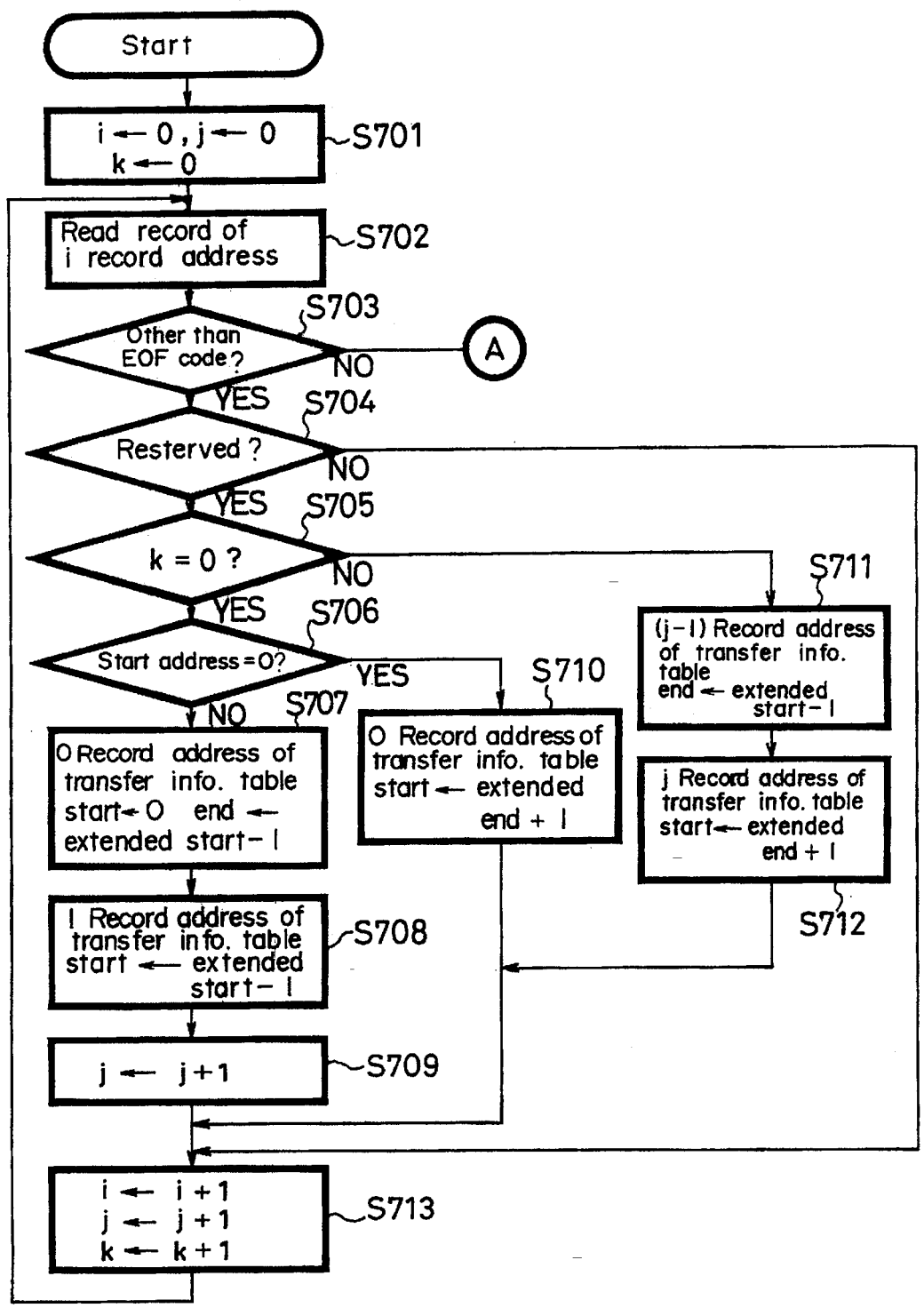
FIGS. 16 and 17 are flowcharts to which reference will be made in explaining an operation of a transfer information table making means in the reserved processing means in the system controller.

If the table change request flag is "1" as represented by a YES at decision step S503, then the processing proceeds to the next step S504 and enters the transfer information table making subroutine 123. As shown in FIG. 16, at step S701, the index register i which is the record read index of the extended information table, an index register j which is a record read index of the transfer information table and an index register k which is an index indicative of the number of routines are initialized, respectively, i.e., "0" are stored in the index registers i, j, k, respectively.

In the next step S702, the table read means 125 reads the record of the address indicated by the index register i from the extended information table, i.e., record of i record address is read out from the extended information table. Then, the processing proceeds to the next decision step S703, whereat it is determined by the identifying means 121 whether or not the content of the record of the i record address is the EOF code.

If the content of the i record address is other than the EOF code as represented by a YES at decision step S703, then the processing proceeds to the next decision step S704. It is determined in decision step S704 by the identifying means 121 whether or not the i record address is reserved. This identification is carried out by determining whether the information bit indicated by the i record address is "1" or "0".

If the i record address is reserved as represented by a YES at decision step S704, then the processing proceeds to the next decision step S705. It is determined in decision step S705 by the identifying means 121 whether or not the value of the index register k is "0".

If the value of the index register k is "1" as represented by a YES at decision step S705, then the processing proceeds to the next decision step S706. It is determined in decision step S706 by the identifying means 121 whether or not the start logical address stored in the i record address is "0". If the start logical address is not "0" as represented by a NO at decision step S706, then the processing proceeds to the next step S707, whereat the address storing means 131 stores "0" in the 0 record address of the transfer information table as the start logical address. Then, the address storing means 131 stores a value which results from subtracting 1 from the start logical address concerning the i record address of the extended information table read out at step S702 as the end logical address.

In the next step S708, the address storing means 131 stores a value which results from adding 1 to the end logical address concerning the i record address of the read-out extended information table in the first record address of the transfer information table as the start logical address. In the next decision step S709, the index register j is corrected, i.e., the index register j is updated by+1.

If the start logical address stored in the i record address is "0" as represented by a YES at decision step S706, then the processing proceeds to step S710, whereat the address storing means 131 stores a value which results from adding 1 to the end logical address concerning the i record address of the read-out extended information table in the 0 record address of the transfer information table as the start logical address.

If the value of the index register k is not "0" as represented by a NO at decision step S705, then the processing proceeds to step S711, whereat the address storing means 131 stores a value which results from subtracting 1 from the start logical address concerning the i record address of the extended information table read at step S702 in the (j−1) record address of the transfer information table as the end logical address. In the next step S712, the address storing means stores a value which results from adding 1 to the end logical address concerning the i record address of the read extended information table in the j record address of the transfer information table as the start logical address.

After the steps S709, S710 or S712 is ended of if it is determined in decision step S704 that the i record address of the extended information table is not reserved, then the processing proceeds to step S714, the index registers i, j, k are respectively updated by +1. Then, the processing proceeds to step S702, whereat the next record is read out from the extended information table. Then, the step S703 and the following steps are repeated.

Figure 17:
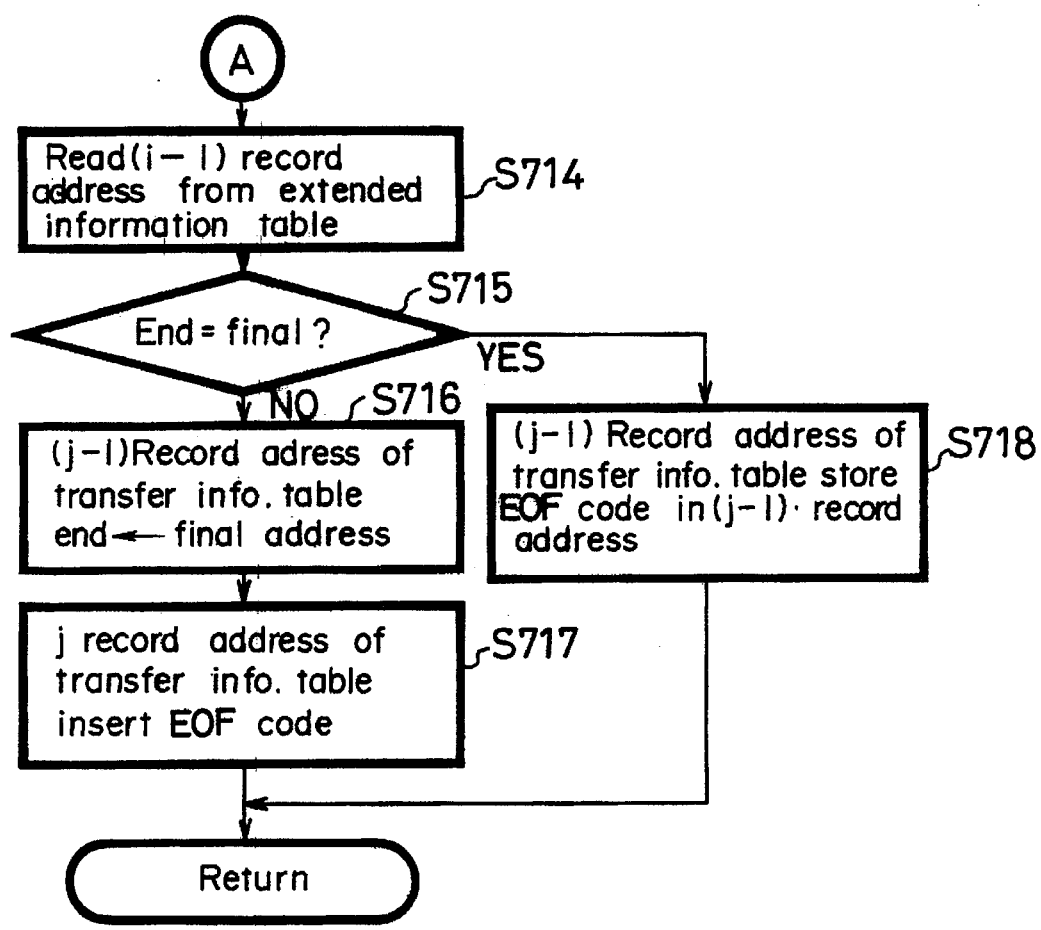
Figure 18:
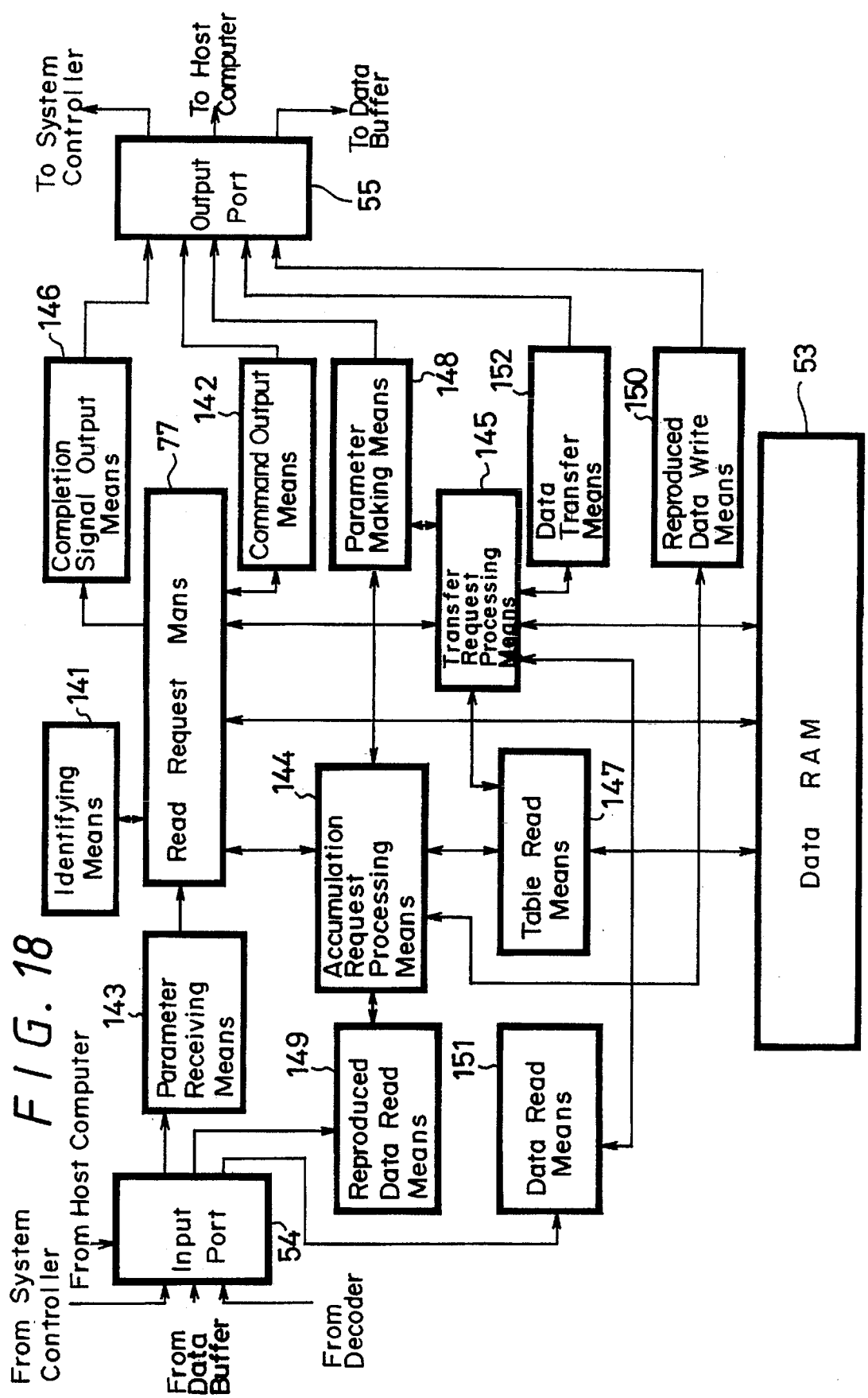
FIG. 18 is a functional block diagram showing a read request means in the I/F controller.

If on the other hand the content of the i record address is EOF code as represented by a NO at decision step S703, then the processing proceeds to step S714 shown in FIG. 17, whereat the table read means 125 reads the (i−1) record address from the extended information table.

It is determined in decision step S715 by the identifying means 121 whether or not the end logical address stored in the (i−1) record address is equal to the final logical address of the data buffer 26. If the two addresses are coincident with each other as represented by a NO at decision step S715, then the processing procees to step S716, whereat the address storing means 131 stores the final logical address of the data buffer in the (j−1) record address of the transfer information table as the end logical address. In the next step S717, the EOF code storing mean 126 stores the EOF code in the j record address of the transfer information table.

If on the other hand the end logical address stored in the (j−1) record address and the final logical address of the data buffer are coincident with each other as represented by a YES at decision step S715, then the processing proceeds to step S718, whereat the EOF code storing means 126 stores the EOF code in the (j−1) record address of the transfer information table.

When the step S717 or S718 is ended, this transfer information table making subroutine 123 is ended.

Then, the processing returns to the main routine of FIG. 14. When the transfer information table making subroutine 123 in the step S504 is ended or the table change request flag in the information flag is "0" as represented by a NO at decision step S503, then the processing proceeds to the next step S505, whereby the table transfer means 124 transfers the extended information table and the transfer information table to the I/F controller 25. Then, the reserve processing subroutine 96 is ended. Simultaneously, the various-request processing subroutine 95 is ended.

Then, the processing returns to the reserve request subroutine 75 in FIG. 12 of the I/F controller 12. After the command output means 112 has output the command data to the system controller 29 in step S401, the processing proceeds to the next decision step S402. It is determined in decision step S402 by the identifying means 111 whether or not various information tables are transferred from the system controller 29, i.e., apparatus await the transfer of various information tables.

If the various information tables are transferred from the system controller 29 as represented by a YES at decision step S402, then the processing proceeds to step S403, whereat the various-information table receiving means 113 stores the various information tables (i.e., extended information table and the transfer information table) in corresponding table storage regions of the data RAM 53. Then, the reserve request subroutine 76 is ended and the various-request processing subroutine 75 is ended simultaneously.

The read request processing means 77 further includes a table read means 147 and a parameter making means 148 activated by a storage request processing means 144 or the transfer request processing means 145, a reproduced data read means 149 and a reproduced data write means 150 activated only by the storage request processing means 144 and a data read means 151 and a data transfer means 152 activated only by the transfer request processing means 145.

The table read means 147 reads the transfer information table at every record. The parameter making means 148 transfers an end address of a present storage requested data to the system controller 29 as a parameter. The reproduced data read means 149 reads the ROM data Dr supplied thereto from the decoder 24 through the input port 54 at every sector and stores the same in a working area assigned to the work RAM 52 or data RAM 53. The reproduced data write means 150 writes the reproduced data stored in the work area in the transfer buffer region TZ at every sector. The data read means 151 reads the stored data supplied thereto from the transfer buffer region TZ through the input port 54 at every sector and stores the same in the working area assigned to the data RAM 53. The data transfer means 152 transfers the storage data stored in the working area to the host computer 31 at every sector.

Figure 19:
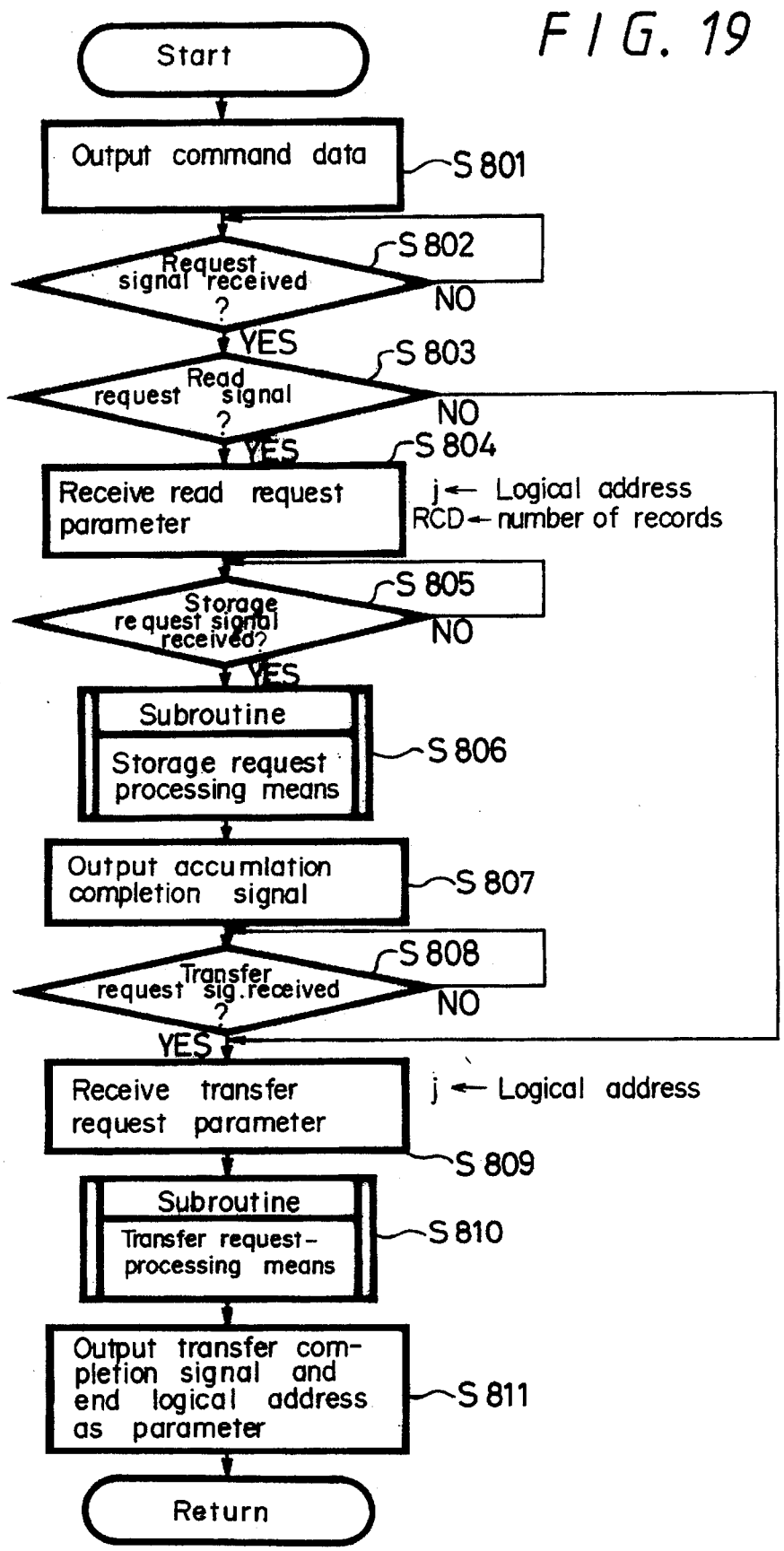
FIG. 19 is a flowchart to which reference will be made in explaining an operation of the read request means in the I/F controller.

In step S801 of FIG. 19, in the read request processing means 77, the command output means 142 outputs the read command data stored in the command storage region to the system controller 29.

When the read command data from the I/F controller 25 is input to the system controller 29, the processing proceeds from the various-request processing subroutine shown in FIG. 10 to the read processing subroutine (read processing means 97) S302. The read command data is composed of addresses and the number of sectors on the optical disk D from which data is to be read out.

Figure 22:
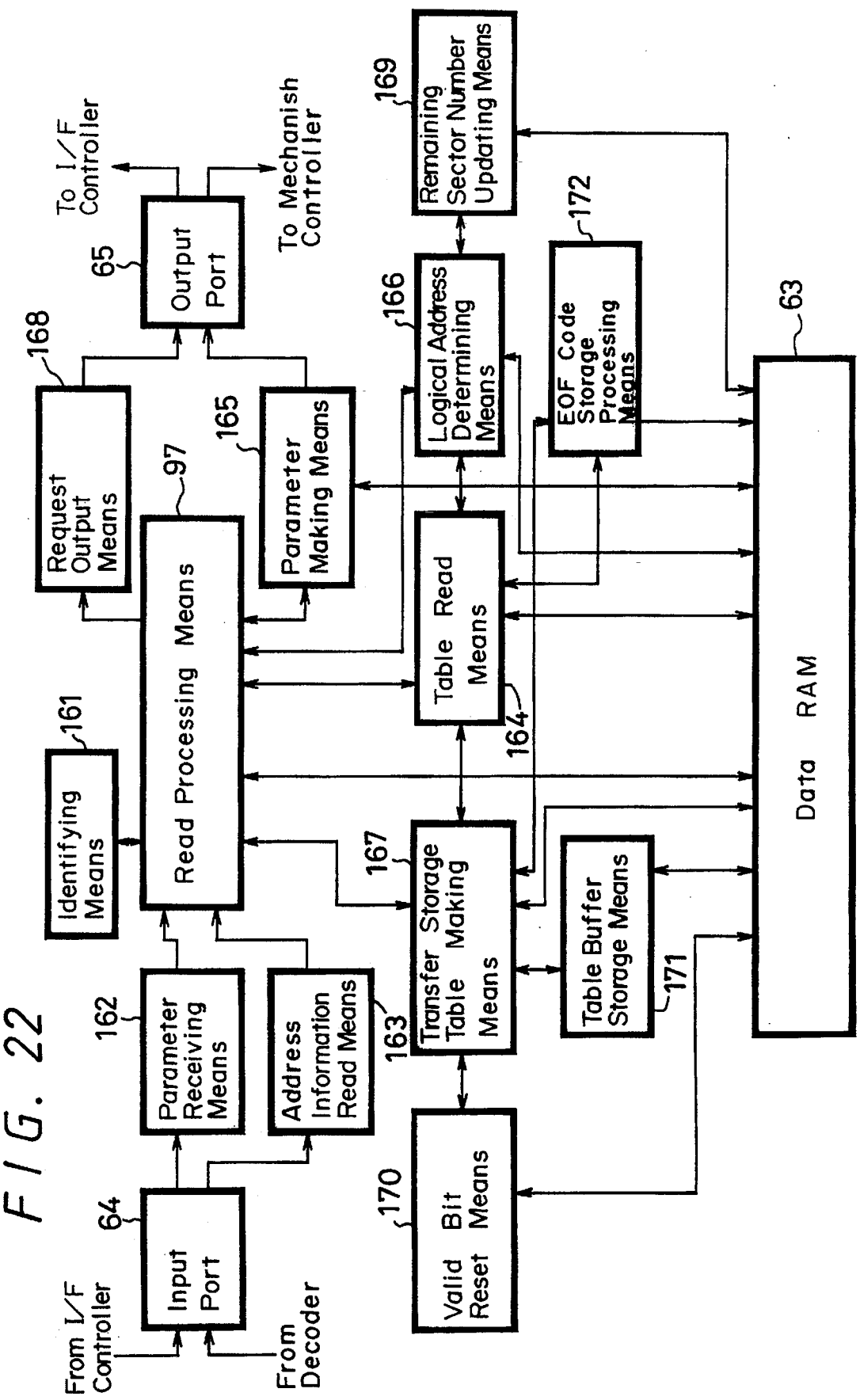
FIG. 22 is a functional block diagram showing a read processing means in the system controller.

As shown in FIG. 22, the read processing means 97 comprises an identifying means 161 for effecting various identifications, a parameter receiving means 162 for receiving parameters supplied thereto from the I/F controller 25 through the input port 64, an address information read means 163 for reading the ROM address information Dar transmitted thereto from the decoder 24 through the input port 64, a table read means 164 for reading at every record the transfer information table or transfer storage table expanded in predetermined regions of the data RAM 63, a parameter making means 165 for making read parameters for requesting reading of data and transfer parameters for requesting transfer of data and transferring the same to the I/F controller 25 or the mechanism controller 28, a logical address determining means 166 for determining a start logical address of the transfer buffer region TZ with the ROM data Dr stored therein, a transfer storage table making means 167 for making a transfer storage table on the basis of the present command data and the parameter from the I/F controller 25, and a request output means 168 for outputting a various-request instructing signal to the I/F controller 25.

The read processing means 97 further includes a remaining sector number updating means 169 activate by the logical address determining means 168 for decrementing the number of sectors of the transfer buffer region TZ, a valid bit reset means 170 activated by the transfer storage table making means 167 for resetting the valid bit of the corresponding record in the transfer storage table, a table buffer storage means 171 for storing the table buffer with the present command data expanded therein in the corresponding record of the transfer storage table, and an EOF code storage processing means 172 for storing an EOF code in the corresponding record of the transfer storage table.

Figure 55A:
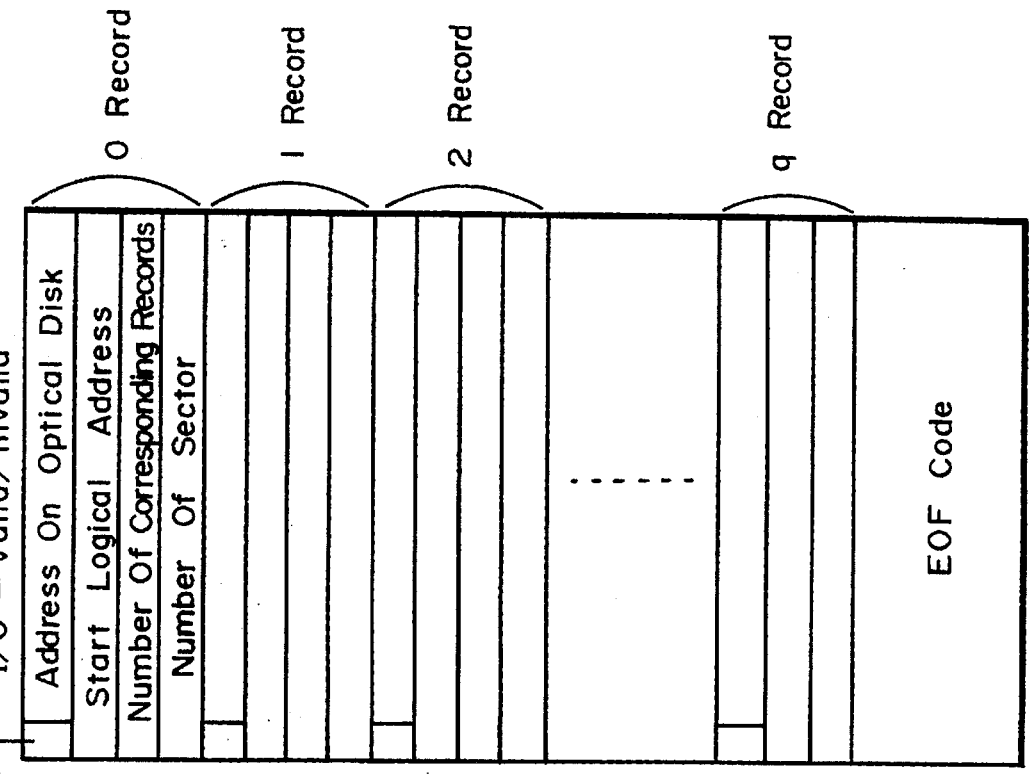
FIGS. 55A and 55B are diagrams showing records of an extended storage table and a transfer storage table.
Figure 55B:
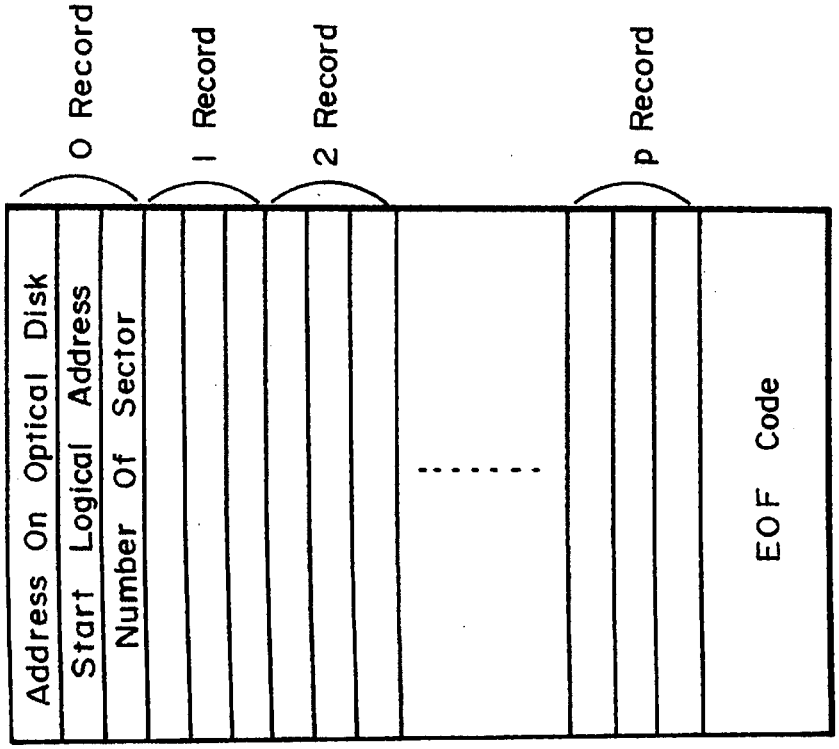

As shown in FIG. 55B, the transfer storage table is composed of a number of records. In the content of one record, the first bit is an indicating information bit indicative of whether the record is valid or invalid and indicates that I/O=valid/invalid. The record has, in addition to the indicating information bit, regions in which target address on the optical disk, a start logical address (relative sector address) and an end logical address (relative sector address) on the transfer buffer region and the number of corresponding records and the number of corresponding sectors to be read of the transfer information table are stored.

Figure 23:
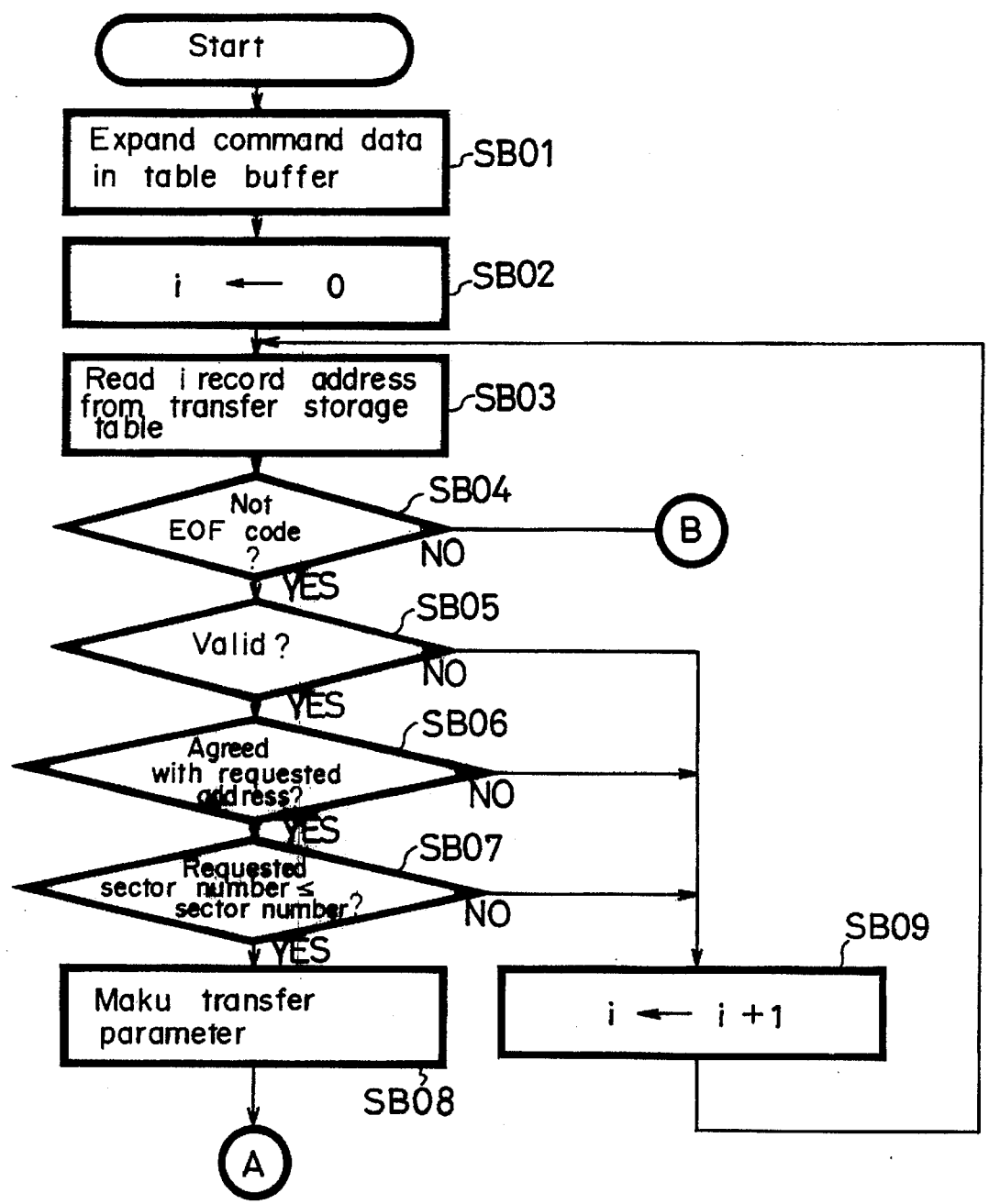
FIGS. 23 and 24 are flowchart to which reference will be made n explaining an operation of the read processing means in the system controller.

As shown in FIG. 23, following the start of operation, at step SB01, the read processing means 97 expands the command data stored in the command storage region in the table buffer. This table buffer has the same arrangement as one record of the transfer storage table shown in FIG. 55B. In step SB01, the command data (address and number of sectors on the optical disk) are stored in the transfer storage table in the sequential order of one record.

In the next step SB02, the index register i serving as a record read-out index of the transfer storage table is initialized, i.e., an initial value "0" is stored in the index register i.

In step SB03, the table read means 164 reads a record of the number indicated by the index register i from the transfer storage table, i.e., record of the i record address is read out from the transfer storage table. It is determined in the next decision step SB04 by the identifying means 161 whether or not the content of the record of the i record address is other than the EOF code. If the content is other than the EOF code as represented by a YES at decision step SB04, then the processing proceeds to the next decision step SB05. It is determined in decision step SB05 by the identifying means 161 whether or not the content of the i record address is valid. This identification is carried out by determining whether the first bit of the i record address is "1" or "0".

If the content of the i record address is valid as represented by a YES at decision step SB05, then the processing proceeds to the next decision step SB06. It is determined in decision step SB06 by the identifying means 161 whether or not the presently requested address on the optical disk D is agreed with the address registered on the i record address on the optical disk D. If the two address are coincident with each other as represented by a YES at decision step SB06, then the processing proceeds to the next decision step SB07, whereat it is determined by the identifying means 161 whether or not the presently-requested number of sectors is less than the number of sectors registered on the i record address.

If the presently-requested sector number is less than the registered sector number as represented by a YES at decision step SB07, then the processing proceeds to step SB08, whereat the parameter making means 165 makes a transfer parameter. Specifically, the start logical address on the transfer buffer region concerning the i record address of the transfer storage table, the number of the records corresponding to the transfer information table and the presently-requested sector number are stored in the parameter storage region assigned to the data RAM 63.

On the other hand, if the presently-requested sector number is larger than the registered sector number as represented by a NO at decision step SB07, if the presently-requested address on the optical disk D is not agreed with the registered address as represented by a NO at decision step SB06 or if the content of the i record address is invalid as represented by a NO at decision step SB05, then the processing proceeds to step SB09, whereat the index register i is incremented. Then, the processing returns to the step SB03, whereat the next table of the transfer storage table is read. Then, the step SB04 and the following steps are repeated.

Figure 24:
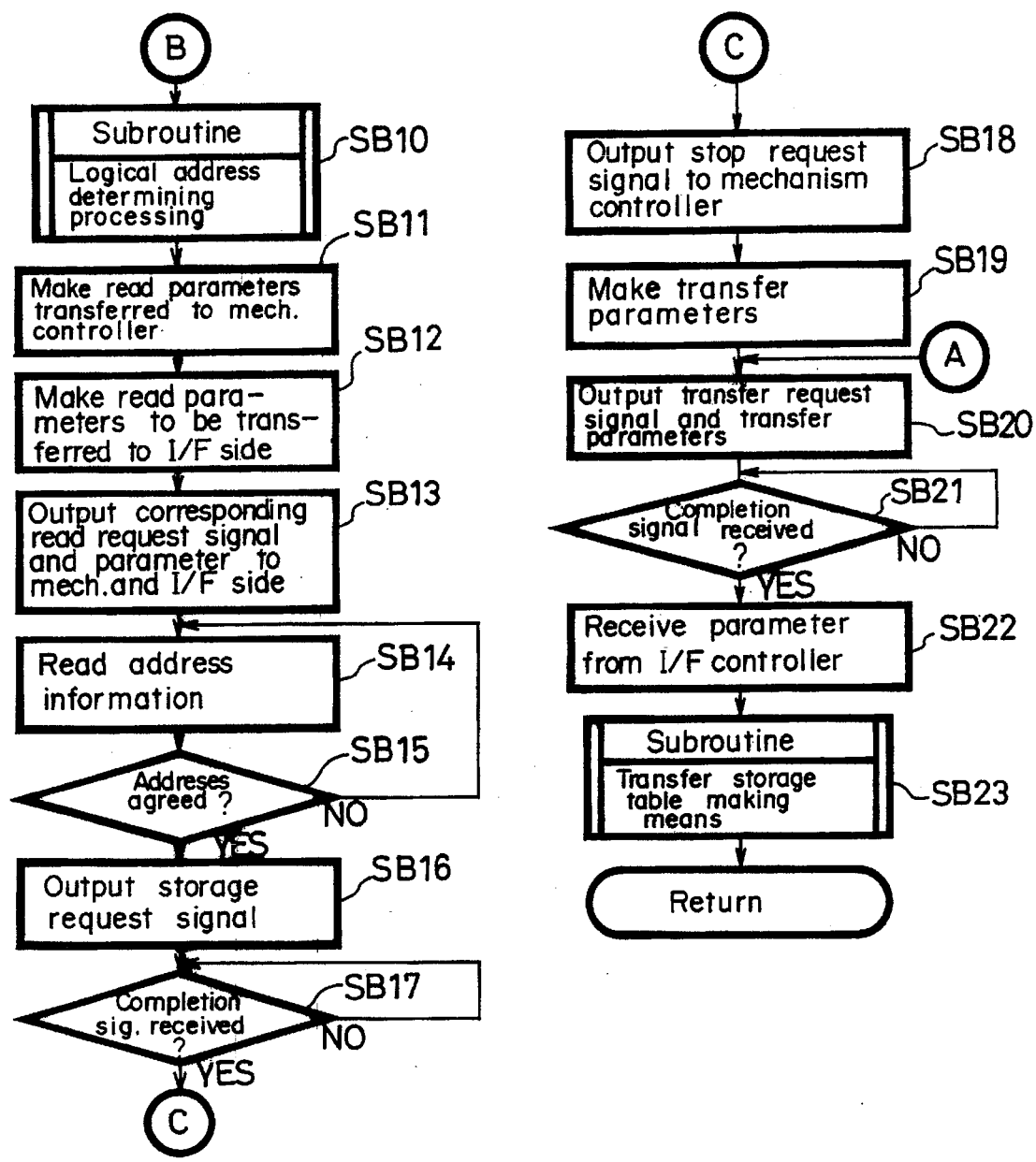
Figure 25:
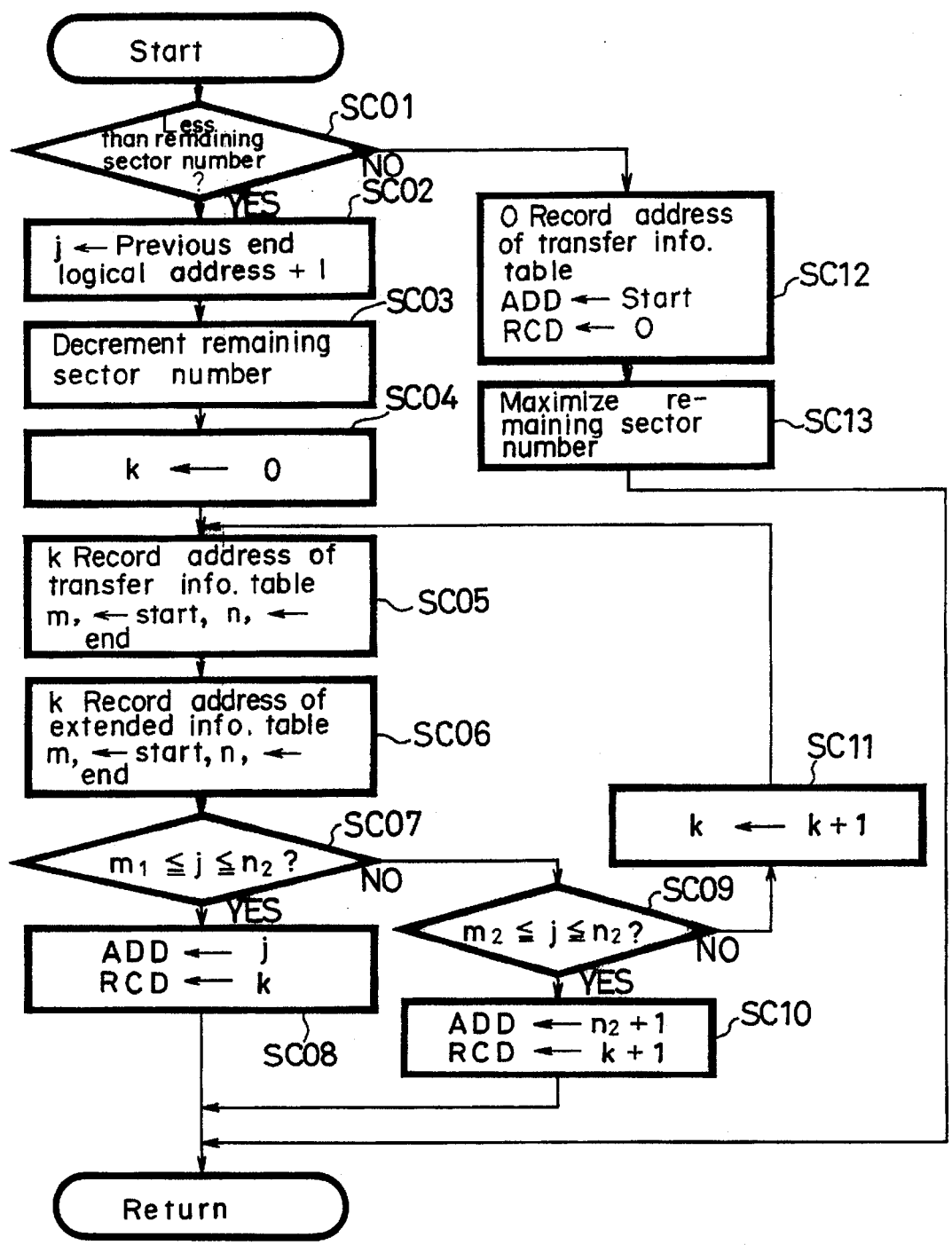
FIG. 25 is a flowchart to which reference will be made in explaining an operation of a logical address determining means in the read processing means of the system controller.

If the content of the i record address is the EOF code as represented by a NO at decision step SB04, then the processing proceeds to step SB10 in FIG. 24 and enters a logical address determining subroutine (logical address determining means) 166. In the logical address determining subroutine 166, as shown in FIG. 25, it is determined by the identifying means 166 whether or not the presently-requested sector number is less than the remaining sector number of the transfer buffer region TZ. This identification is carried out by comparing the value in the remaining sector number storage region and the presently-requested sector number.

If the presently-requested sector number is less than the remaining sector number as represented by a YES at decision step SC01, then the processing proceeds to the next step SC02, whereat a value which results from adding the previous end logical address by 1 is stored in the index register j. Specifically, a value which results from adding 1 to the end logical address used when data stored in the end address storage region assigned to the data RAM 63 is stored in the transfer buffer region TZ previously transferred from the I/F controller 25 is stored in the index register j.

In the next step SC03, the remaining sector number updating means 169 decrements the remaining sector number of the transfer buffer region TZ. Specifically, a value which results from subtracting the presently-requested sector number from the value stored in the remaining sector number storage region is stored one more time in the remaining sector number storage region.

In the next step SC04, the index register k serving as the record read indexes of the transfer information table and the extended information table is initialized. In other words, an initial value "0" is stored in the index register k. In the next step SC05, the table read means 164 reads the record of the number indicated by the index register k from the transfer information table, i.e., reads the record of the k record address from the transfer information table.

In step SC06, the table read means 164 reads the record of the number indicated by the index register k from the extended information table, i.e., reads the record of the k record address from the extended information table.

In the next decision step SC07, it is determined by the identifying means 161 whether or not the value of the index register j falls between the start logical address and the end logical address of the k record address in the transfer information table. If the value of the index register j falls between the start logical address and the end logical address as represented by a YES at decision step SC07, then the processing proceeds to step SC08, wherein the value of the index register j is stored in a register ADD and the value of the index register k is stored in a register RCD.

If on the other hand the value of the index register j does not fall between the start logical address and the end logical address as represented by a NO at decision step SC07, then the processing proceeds to the next decision step SC09. It is determined in decision step SC09 by the identifying means 161 whether or not the value of the index register j falls between the start logical address and the end logical address of the k record address of the extended information table. If the value of the index register j falls between the start logical address and the end logical address as represented by a YES at decision step SC09, then the processing proceeds to the next step SC10, whereat a value which results from adding 1 to the end logical address is stored in the register ADD and a value which results from adding 1 to the value of the index register k is stored in the register RCD.

If the value of the index register j does not fall between the start logical address and the end logical address of the k record address in the extended information table as represented by a NO at decision step SC09, then the processing proceeds to step SC11, whereat the index register k is incremented (updated by +1). Thereafter, the processing proceeds to step SC05 and the step SC05 and the following steps are repeated.

If on the other hand the presently-requested sector number is not less than the remaining sector number of the transfer buffer region TZ as represented by a NO at decision step SC01, then the processing proceeds to step SC12, whereat the table read means 164 reads the 0 record address of the transfer information table. Then, the start logical address of the 0 record address is stored in the register ADD and "0" is stored in the register RCD. In the next step SC13, the remaining sector number is maximized. Specifically, a value which results from subtracting the reserved sector number from the all sector numbers of the data buffer 26 is stored in the remaining sector number storage region.

When the processing in step SC08, the processing in step SC10 or the processing in step SC13 is ended, this logical address determining subroutine 166 is ended.

Then, the processing returns to the main routine in FIG. 24. When the logical address determining subroutine is ended at step SB10, the processing proceeds to step SB11, whereat the parameter making means 165 makes read parameters to be transferred to the mechanism controller 28. Specifically, the presently-requested address of the optical disk D stored in the table buffer is stored in the mechanism read parameter region assigned to the data RAM 63.

In the next step SB12, the parameter making means 165 makes the read parameters which should be transferred to the I/F controller 25. Specifically, the present start logical address stored in the register ADD, the present record number (record number of transfer information table) stored in the register RCD and the presently-requested sector number stored in the table buffer are stored in the I/F read parameter region assigned to the data RAM 63.

In the next step SB13, the parameter making means 165 outputs the read request signal and the read parameter stored in the mechanism read parameter storage region to the mechanism controller 28. Simultaneously, the parameter making means 165 outputs the read request signal and the read parameter stored in the I/F read parameter storage region to the I/F controller 25.

The mechanism controller 28 detects the address on the optical disk D from the read parameter on the basis of the read request signal supplied thereto from the system controller 29. Then, the mechanism controller 28 conveys the optical pickup 3 to the track position corresponding to the requested address by driving the optical pickup slide mechanism 7. At this stage, the mechanism controller 28 allows the RF amplifier unit 21 to input the detected signal Sr. Therefore, the detected signal Sr from the photodetector in the optical pickup 3 is input through the RF amplifier unit 21 to the demodulator 22, from which it is supplied to the decoder 24 as the reproduced data Di and also supplied to the I/F controller 25 as the ROM data Dr.

On the other hand, the decoder 24 generates ROM address information Dar corresponding to the ROM data Dr. The ROM address information Dar is supplied to the system controller 29.

Then, the system controller 29 receives, in the step SB14 of FIG. 24, the ROM address information Dar supplied thereto from the decoder 24 through the address information read means 163 and the input port 64.

It is determined in decision step SB15 by the identifying means 161 whether or not the address received by the address information read means 163 and the presently-requested address on the optical disk D are agreed with each other. Steps sB14 and SB15 are repeated until these address are agreed with each other.

If the addresses are agreed with each other as represented by a YES at decision step SB15, then the processing proceeds to step SB16, whereat the request output means 168 outputs the storage request signal to the I/F controller 25. On the basis of the storage request signal input thereto, the I/F controller 25 stores the ROM data Dr from the decoder 24 from the presently-determined start logical address sequentially at the sector unit in the transfer buffer region TZ. Then, when the ROM data Dr of the amount of the requested sector number are accumulated, the request output means 168 outputs the storage completion signal to the system controller 29. This operation will be described in detail later.

Referring back to the processing routine shown in FIG. 24, after the accumulation request signal has output at step SB16, then the processing proceeds to the next decision step SB17, whereat it is determined whether or not the accumulation completion signal from the I/F controller 25 is input. If the accumulation completion signal from the I/F controller 25 is received as represented by a YES at decision step SB17, then the processing proceeds to the next step SB18, whereat the request output means 168 outputs a stop request signal to the mechanism controller 28. The mechanism controller 28 controls various circuits on the basis of the stop request signal supplied thereto from the system controller 29 so that the reproduction operation of the optical disk D is stopped.

In the next step SB19, the parameter making means 165 makes transfer parameters this time. Specifically, the presently-determined start logical address, the number of records and the presently-requested sector number are stored in the parameter storage region assigned to the data RAM 63.

In the next step SB20, the parameter making means 165 outputs the transfer request signal and the transfer parameters stored in the parameter storage region to the I/F controller 25. The processing at step SB20 is carried out not only after the processing at the step SB19 was ended but also after the step SB03 shown in FIG. 23 was ended.

The I/F controller 25 sequentially reads out ROM data Dr from the start logical address stored in the transfer parameter in the transfer buffer region on the basis of the transfer request signal supplied thereto from the system controller 29 and transfers them to the host computer 31 side. Then, when the ROM data Dr of the amount of the requested sector number are transferred to the host computer 31 side, the I/F controller 25 outputs the transfer completion signal to the system controller 29 and further outputs the parameters. This operation will be described in detail later.

Turning back to the processing routine shown in FIG. 24, after the transfer request signal has been output at step SB20, then the processing proceeds to the next decision step SB21, whereat it is determined whether or not the transfer completion signal from the I/F controller 25 is received. If the transfer completion signal from the I/F controller 25 is received as represented by a YES at decision step SB21, then the processing proceeds to the next step SB22, whereat the parameter receiving means 162 receives the parameter supplied thereto from the I/F controller 25 through the input port 64 and stores the same in the end address storage region assigned to the data RAM 63. The content of the parameter is the end logical address of the ROM data Dr presently stored in the transfer buffer region TZ.

Figure 26:
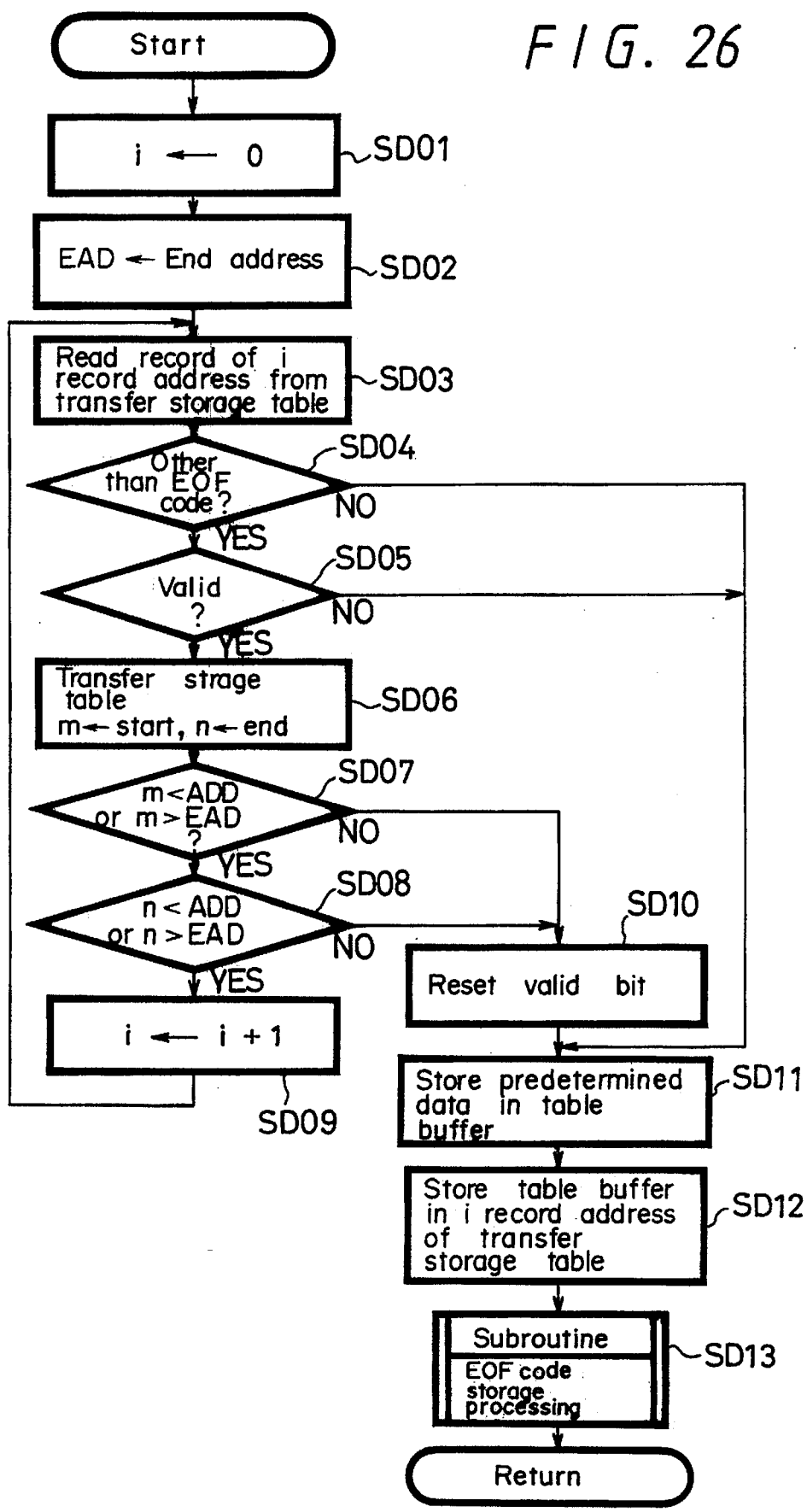
FIG. 26 is a flowchart to which reference will be made in explaining an operation of a transfer and storage table making means in the read processing means of the system controller.

In the next step SB23, the processing enters the transfer storage table making subroutine (transfer storage table making means 167). Referring to FIG. 26, following the start of operation, at step SD01, the index register i serving as the record read index of the transfer storage table is initialized, i.e., an initial value "0" is stored in the index register i.

In the next step SD02, the present end logical address stored in the end address storage region is stored in the register EAD. In step SD03, the table read means 164 reads the record of the number indicated by the index register i from the transfer storage table, i.e., reads the record of the i record address from the storage table.

It is determined in the next decision step SD04 by the identifying means 161 whether or not the content of the record of the i record address is other than the EOF code. If the content is other than the EOF code as represented by a YES at decision step SD04, then the processing proceeds to the next decision step SD05, whereat it is determined by the identifying means 161 whether the content of the i record address is valid or invalid. This identification is carried out by determining whether the first bit of the i record is "1" or "0".

If the content is valid as represented by a YES at decision step SD05, then the processing proceeds to the next step SD06, whereat the start logical address and the end logical address are read out from the i record address of the transfer storage table. It is determined in the next decision step SD07 by the identifying means 161 whether or not the start logical address concerning the i record address is smaller than the start logical address of the presently-accumulated data or larger than the end logical address.

If the start logical address of the i record address is smaller than the start logical address of the data or larger than the end logical address as represented by a YES at decision step SD07, then the processing proceeds to the next decision step SD08, whereat it is determined by the identifying means 161 whether the end logical address of the i record address is smaller than the start logical address of the presently-accumulated data or larger than the end logical address.

If the end logical address of the i record address is smaller than the start logical address of data or larger than the end logical address as represented by a YES at decision step SD08, then the processing proceeds to step SD09, the index register i is incremented by +1. Then, the processing returns to the step SD03, whereat the next record in the transfer storage table is read out. Then, the step SD04 and the following steps are repeated.

If on the other hand the start logical address of the i record address falls between the start logical address and the end logical address of the presently-accumulated data as represented by a NO at decision step SD07 or if the end logical address of the i record address falls between the start logical address and the end logical address of the presently-accumulated data as represented by a NO at decision step SD08, then the processing proceeds to the next step SD10, whereat the valid bit reset means 170 makes the record invalid by resetting the valid bit of the i record address of the transfer storage table.

Then, when the processing at the step SD10 is ended, if the content of the i record address of the transfer storage table is invalid as represented by a NO at decision step SD05 or if the content of the i record address of the transfer storage table is the EOF code as represented by a NO at decision step SD04, then the processing proceeds to the next step SD11.

In the step SD11, predetermined data is stored in the table buffer. Specifically, since the presently-requested address and sector number on the optical disk D are already stored in the step SB01 shown in FIG. 23, other data, i.e., the start logical address of the presently-determined transfer buffer region TZ stored in the register ADD, the end logical address stored in the presently-transferred buffer region TZ stored in the register EAD and the corresponding record number of the transfer information table stored in the register RCD are stored in the arrangement order of one record.

In the next step SD12, the table buffer is stored in the i record address of the transfer storage region. In the next step SD13, the processing enters the EOF code storage processing subroutine (EOF code storage processing means) 172.

Figure 27:
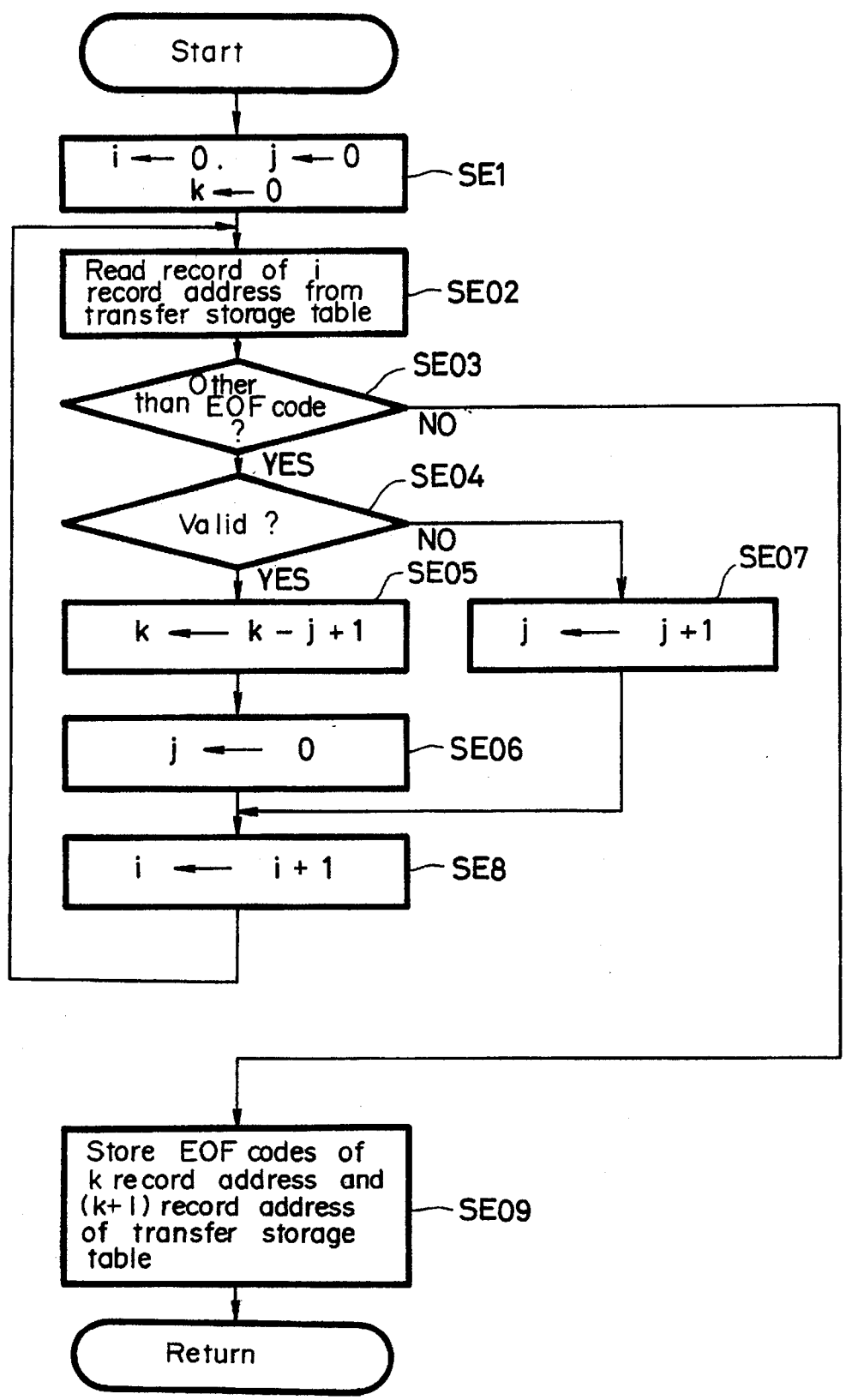
FIG. 27 is a flowchart to which reference will be made in explaining an operation of an EOF code storing means in the read processing means of the system controller.

In this subroutine, as shown in FIG. 27, in step SE01, the index registers i, j and k serving as the record read indexes of the transfer storage table are initialized, i.e., an initial value "0" are stored in the respective index registers i, j and k, respectively.

In the next step SE02, the table read means 164 reads a record of the number indicated by the index register i from the transfer storage table. In other words, the record of the i record address from the transfer storage table. It is determined in the next decision step SE03 by the identifying means 161 whether or not the content of the EOF code of the record of the i record address is other than the EOF code.

If the content of the i record address is other than the EOF code as represented by a YES at decision step SE03, then the processing proceeds to the next decision step SE04. It is determined in decision step SE04 by the identifying means 161 whether or not the content of the i record address is valid. This identification is carried out by determining whether the first bit of the i record address is "1" or "0".

If the content of the i record address is valid as represented by a YES at decision step SE04, then the processing proceeds to step SE05, whereat a value which results from adding 1 to the value of the index register k and the value of the index register j. In the next step SE06, the index register j is initialized, i.e., an initial value "0" is stored in the index register j.

If on the other hand the content of the i record address of the transfer storage table is invalid as represented by a NO at decision step SE04, then the processing proceeds to the next step SE07, whereat the index register j is updated (incremented) by +1.

When the processing in the step SE06 or SE07 is ended, then the processing proceeds to the next step SE08, whereat the index register i is updated (incremented) by +1. Then, the processing returns to the step SE02, whereat the next record in the transfer storage table is read and the step SE03 and the following steps are repeated.

If the content of the i record address of the transfer storage table is the EOF code as represented by a NO at decision step SE03, then the processing proceeds to step SE09, whereat EOF codes are respectively stored in the k record address and (k+1) record address of the transfer storage table. When the processing at the step SE09 is ended, the EOF code storage processing subroutine 172 is ended.

Turning back to the processing routine shown in FIG. 26, when the step SD13 is ended, this transfer storage table making subroutine is ended. Then, the processing returns to the main routine shown in FIG. 24. Then, when the transfer storage table making subroutine in step SB23 is ended, this read processing subroutine is ended. Simultaneously, the various-request processing subroutine shown in FIG. 10 is ended.

Then, the processing returns to the read request subroutine shown in FIG. 19 of the I/F controller 25. As shown in FIG. 19, following the start of operation, the command output means 142 outputs command data to the system controller 29 at step S801. Then, the processing proceeds to the next decision step S802.

It is determined in decision step S802 by the identifying means 141 whether or not the request signal from the system controller 29 is received, i.e., the apparatus awaits the input of the request signal from the system controller 29. If the request signal from the system controller 29 is received as represented by a YES at decision step S802, then the processing proceeds to the next decision step S803. It is determined in decision step S803 by the identifying means 141 whether or not the request signal input from the system controller 29 is the read request signal.

If the request signal is the read request signal as represented by a YES at decision step S803, then the processing proceeds to the next step S804, whereat the parameter receiving means 143 receives the read parameter supplied thereto through the input port 54 and stores the same in the parameter storage region assigned to the data RAM 53. Thus, the start logical address of the transfer buffer region TZ in which data should be accumulated and the corresponding record number and sector number of the transfer information table are stored in the parameter storage region.

Figure 20:
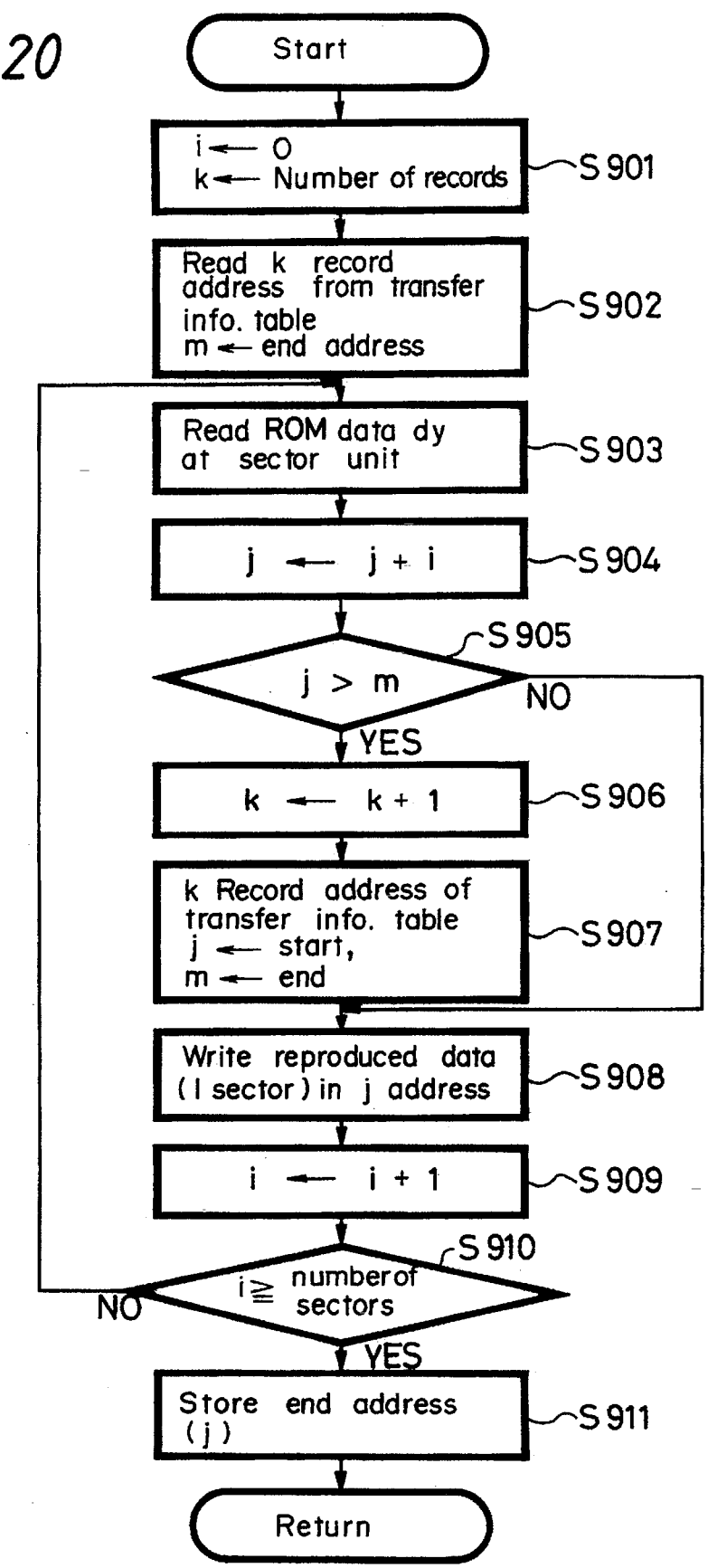
FIG. 20 is a flowchart to which reference will be made in explaining an operation of a storage request means in the read request means of the I/F controller.

In the next decision step S805, it is determined by the identifying means 141 whether or not the storage request signal from the system controller 29 is received. If the storage request signal from the system controller 29 is received as represented by a YES at decision step S805, then the processing proceeds to the next step S806, wherein the processing enters the storage request processing subroutine (storage request means) 144. In this subroutine, as shown in FIG. 20, following the start of operation, an initial value "0" is stored in the index register i in step S901. Then, the number of records stored in the parameter storage region is stored in the index register k.

In the next step S802, the table read means 148 reads the record of the number indicated by the index register k from the transfer information table, i.e., reads the record of the k record address from the transfer information table.

In the next step S903, the reproduced data read means 149 reads ROM data (one sector) from the decoder 24 through the input port 54. In the next step S904, an address at which the ROM data is stored in the transfer buffer region is calculated. Specifically, a value which results from adding the value of the index register j and the value of the index register i is stored in the index register j as the stored address.

In the next decision step S905, it is determined by the identifying means 141 whether or not the write target region of presently-accumulated data iS out of the transfer buffer region TZ (i.e., extended memory region EZ). This identification is executed by determining whether or not the value of the index register j is larger than the end logical address of the k record address of the transfer information table. If the value of the index register j is larger than the end logical address and the write target region in which data should be accumulated is other than the transfer buffer region TZ as represented by a YES at decision step S905, then the processing proceeds to the next step S906, whereat the index register k i updated (incremented) by +1.

In the next step S907, the table read means 147 reads the k record address of the transfer information table and stores the start logical address of the k record address in the index register j.

When the processing in step S907 is ended or if the value of the index register j is less than the end logical address of the k record address of the transfer information table as represented by a No at decision step S905, then the processing proceeds to step S908, whereat the reproduced data write means 150 writes the ROM data (one sector) read in the step S903 in the logical address of the transfer buffer region TZ indicated by the value of the index register j.

In the next step S909, the index register i is updated (incremented) by +1. It is determined in the next decision step S910 by the identifying means 141 whether or not the value of the index register i is greater than the number of sectors stored in the parameter storage region. If the value of the index register i is smaller than the number of sectors as represented by a NO at decision step S910, then the processing returns to the step S903, whereat the next ROM data (one sector) is read. Then, the next step S904 and the following steps are repeated.

If on the other hand the value of the index register i become greater than the number of sectors as represented by a YES at decision step S910, then the processing proceeds to the next step S911, whereat the parameter making means 148 stores the value (end logical address) of the index register j in the end address parameter storage region. When the processing in step S911 is ended, this accumulation request processing subroutine 144 is ended.

Then, the processing returns to the main routine shown in FIG. 19. When the accumulation request processing in step S806 is ended, the processing proceeds to the next step S807, whereat the completion signal output means 146 outputs the accumulation completion signal to the system controller 29.

In the next step S808, it is determined by the identifying means 141 whether or not the transfer request signal from the system controller 141 is received, i.e., the apparatus awaits the input of the transfer request signal.

If the transfer request signal from the system controller 29 is received as represented by a YES at decision step S808 or if the signal is not the read request signal as represented by a NO at decision step S803, then the processing proceeds to step S809, whereat the parameter receiving means 143 receives the transfer parameter supplied thereto through the input port 54 and stores the same in the parameter storage region assigned to the data RAM 53. Thus, the star logical address of the transfer buffer region TZ in which data to be transferred are accumulated and the corresponding record number and sector number of the transfer information table are stored in the parameter storage region.

Figure 21:
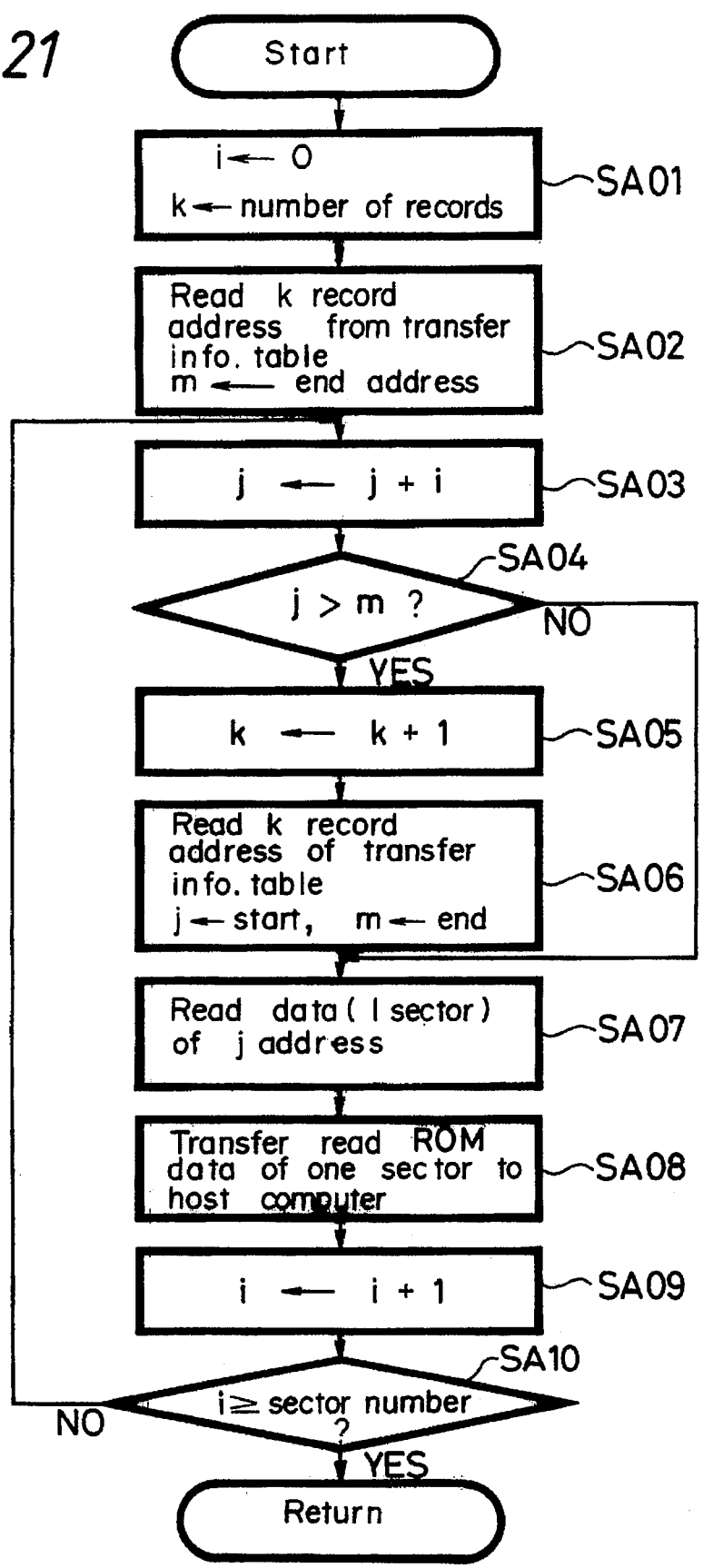
FIG. 21 is a flowchart to which reference will be made in explaining an operation of a transfer request means in the read request means of the I/F controller.

In the next step S810, the processing enters the transfer request processing subroutine (transfer request processing means) 145. In this subroutine, as shown in FIG. 21, following the start of operation, in step SA01, an initial value "0" is stored in the index register i and the record number stored in the parameter storage region is stored in the index register k.

In the next step SA02, the table read means 147 reads the record of the number indicated by the index register k from the transfer information table, i.e., reads the record of the k record address from the transfer information table. In the next step SA03, an address at which data should be read is calculated from the transfer buffer region. To be more concrete, a value which results from adding the value of the index register j and the value of the index register i is stored in the index register j as the read address.

It is determined in decision step SA04 by the identifying means 141 whether or not the read target region of data to be transferred is out of the transfer buffer region TZ (i.e., extended memory region EZ). This identification is carried out by determining whether the value of the index register j is larger than the end logical address of the k record address of the transfer information table. If the value of the index register j is larger than the end logical address and the read target region of data to be transferred this time is out of the transfer buffer region TZ as represented by a YES at decision step SA04, then the processing proceeds to the next step SA05, whereat the index register k is updated (incremented) by +1.

In the next step SA06, the table read means 141 reads the k record address of the transfer information table and stores the start logical address of the k record address in the index register j.

When the processing in the step SA06 is ended or if the value of the index register j is less than the end logical address of the k record address of the transfer information table as represented by a NO at decision step SA04, then the processing proceeds to the next step SA07, whereat the data read means 151 reads the ROM data (one sector) accumulated in the logical address indicated by the index register j of the transfer buffer region TZ.

In the next step SA08, the data transfer means 152 transfers the ROM data of one sector read out in the step SA07 to the host computer 31. In the next step SA09, the index register j is updated (incremented) by +1.

It is determined in the next decision step SA10 by the identifying means 141 whether or not the value of the index register i is greater than the number of sectors stored in the parameter storage region. If the value of the index register i is smaller than the sector number as represented by a NO at decision step SA10, then the processing returns to step SA03, whereat the read address is updated. Then, the step SA04 and the following steps are repeated. If on the other hand the value of the index register i becomes greater than the sector number as represented by a YES at decision step SA10, then the transfer request processing subroutine 145 is ended.

Then, the processing returns to the main routine shown in FIG. 19. When the transfer request processing subroutine 145 at step S810 is ended, the processing proceeds to the next step S811, whereat the completion signal output means 146 outputs the transfer completion signal to the system controller 29. Simultaneously, the parameter making means 148 outputs the end logical address stored in the end address parameter storage region to the system controller 29 as the parameter.

When the processing at step S811 is ended, this read request subroutine 77 is ended. Concurrently therewith, the various-request processing subroutine 75 shown in FIG. 6 is ended.

A processing of data transmission via the extended memory region will be described below.

When an extended read command is input from the host computer 31 to the I/F controller 25, the processing of the I/F controller 25 proceeds from the various-request processing subroutine (the various-request processing means 75) to the extended read request subroutine (the extended read requesting means 78) in step S103 shown in FIG. 6.

Figure 28:
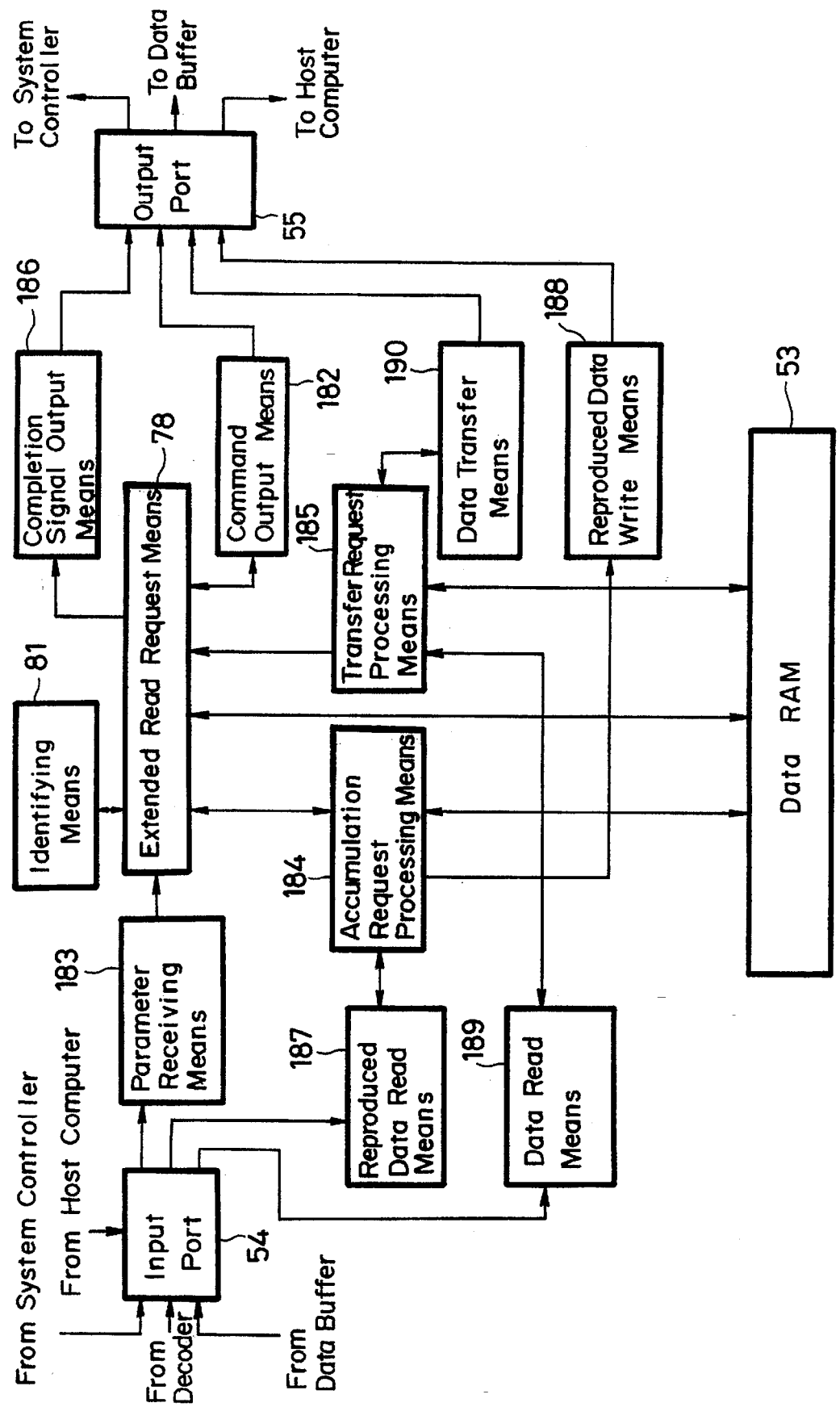
FIG. 28 is a functional block diagram showing an extended read request means in the I/F controller.

As shown in FIG. 28, the extended read requesting means 78 has an identifying means 181 for carrying out various discriminations, a command outputting means 182 for outputting the command to the system controller 29, a parameter receiving means 183 for receiving a read parameter transferred from the system controller 29, an accumulation requesting means 184 for accumulating a ROM data Dr supplied from the decoder 24 in the extended memory region EZ, a transfer-request processing means 185 for transferring the ROM data Dr accumulated in the extended memory region Dr to the host computer 31, and a completion-signal outputting means 186 for supplying the system controller 29 with a completion signal indicative of completion of a requested processing.

In addition to the above means, the extended read requesting means 186 further includes a reproduced-data reading means 187 and a reproduced-data writing means 188 which are activated by the storage requesting means 184, and a data reading means 189 and a data transfer means 190 which are activated by the transfer-request processing means 190.

The reproduced-data reading means 187 reads the ROM data Dr supplied from the decoder 24 through an input port 54 by a sector unit to store the supplied ROM data Dr in a working area allocated to the operation RAM 52 or the data RAM 53. The reproduced-data writing means 188 writes the ROM data Dr stored in the above working area in the extended memory region EZ by a sector unit. The data reading means 189 reads the ROM data Dr supplied from the extended memory region EZ through the input port 54 by a sector unit to store the working area allocated to the operation RAM 52 or the data RAM 53. The data transfer means 190 transfers the ROM data stored in the above ROM data Dr to the host computer 31 by a sector unit.

Figure 29:
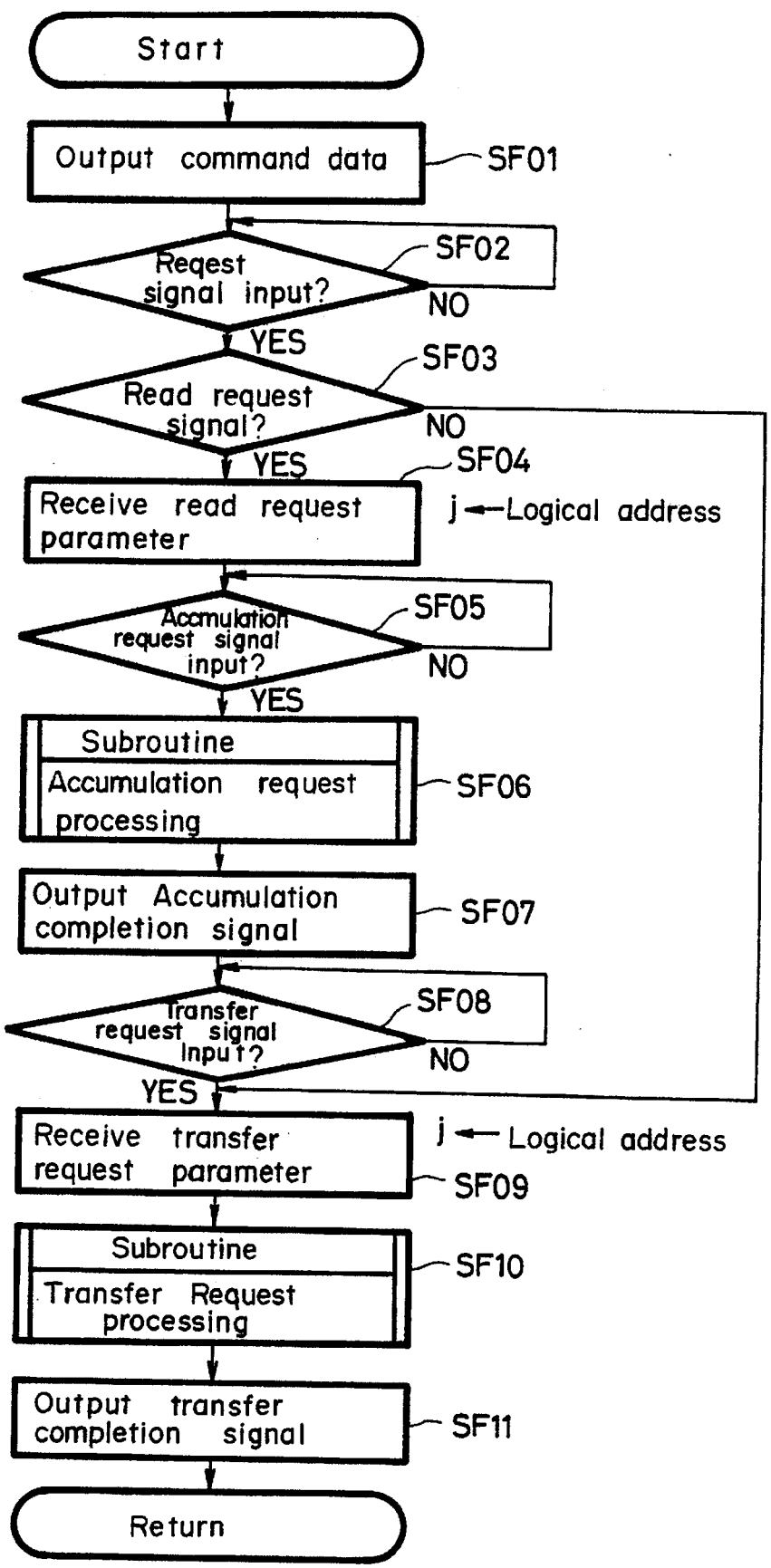
FIG. 29 is a flowchart to which reference will be made in explaining an operation of the extended read request means in the I/F controller.

A command outputting means 182 of the extended read requesting means 78 initially outputs extended read command data stored in a command storage region to the system controller 29 in step SF01 shown in FIG. 29.

When the extended read command data is input to the system controller 29, the processing of the system controller 29 proceeds from the various-request processing routine (the various-request processing means 95) to an extended read processing subroutine (the extended read processing means 98) in S303 shown in FIG. 10. The read command data is composed of an address of the optical disc D from which data is to be read out, a start logical address of the extended memory region EZ in which the ROM data Dr is to be accumulated and the sector number thereof.

Figure 32:
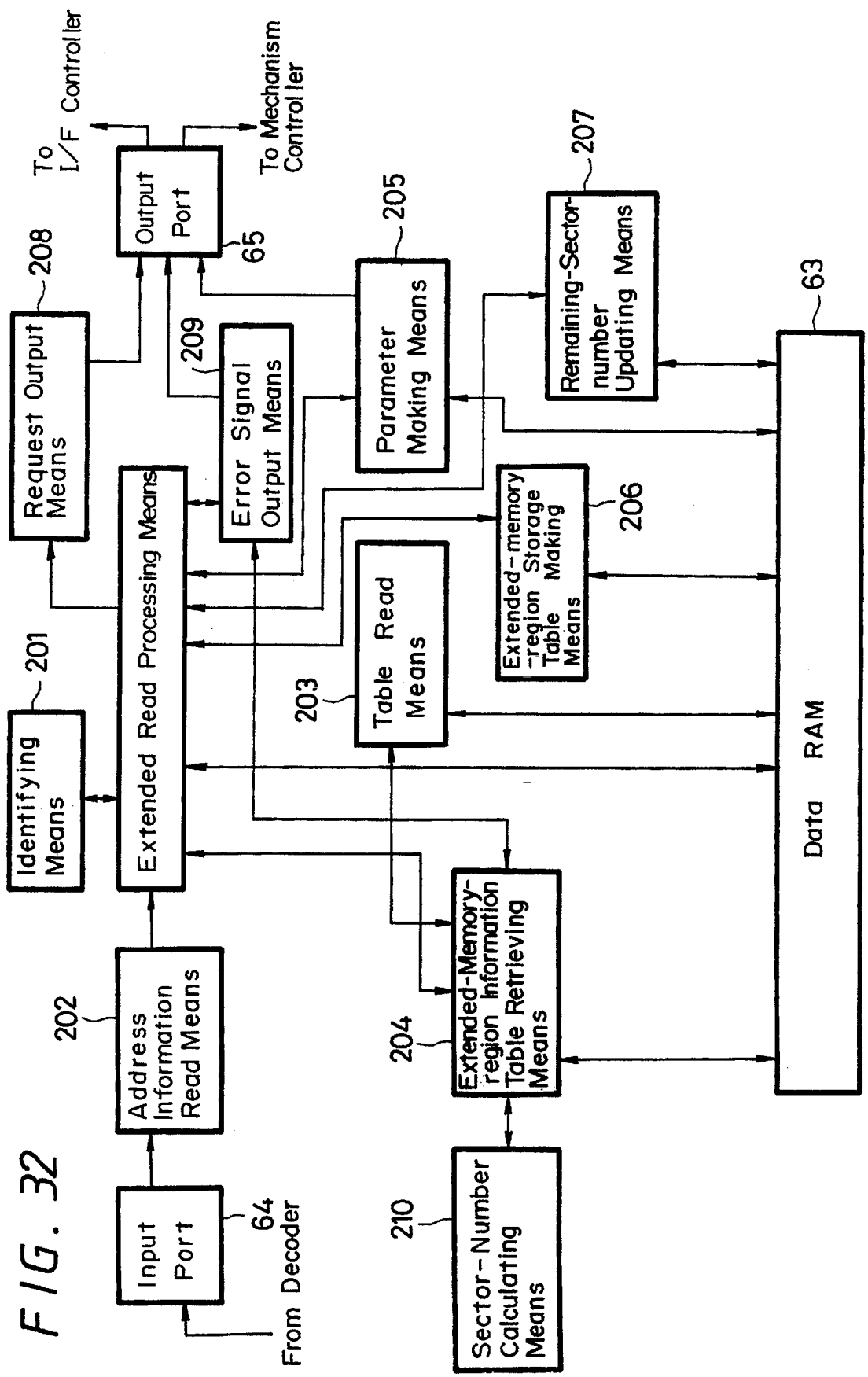
FIG. 32 is a functional block diagram showing an extended read processing means in the system controller.

As shown in FIG. 32, the extended read processing means 98 has an identifying means 201 for carrying out various discriminations, an address-information reading means 202 for reading ROM address information Dar supplied from the decoder 24 through an input port 64, a table reading means 203 for reading an extended-memory-region information table or an extended- memory-region storage table stored in a predetermined region of the data RAM 63 by a record unit, an extended-memory-region information table retrieving means 204 for retrieving a designated record address of the corresponding extended-memory-region information table based on a present command data, a parameter generating means 205 generating a read parameter used to request data reading and a transfer parameter used to request transfer of data to the host computer 31 to respectively transfer these parameters to the I/F controller 25 and the mechanism controller 28, an extended-memory-region storage table generating means 206 for generating the extended-memory-region storage table based on a present command data, a remaining-sector-number updating means 207 for updating a reserved-sector number which is decreased as data is stored in the extended memory region EZ, a request outputting means 208 for outputting a signal used to command various requests to the I/F controller 25, and an error signal outputting means 209 for outputting an error signal to the I/F controller 25.

In addition to the above means, the extended read processing means 98 has a sector-number calculating means 210 which is activated by the extended-memory-region information table retrieving means 204 to calculate the number of usable sectors of the extended memory region EZ where data is to be stored at present.

As shown in FIG. 55A, the extended-memory-region storage table is formed of a large number of records, each of records having regions used to store an address of the optical disc from which data is to be read out, the start logical address (relative sector address) of the extended memory region, and the number of sectors.

Figure 33:
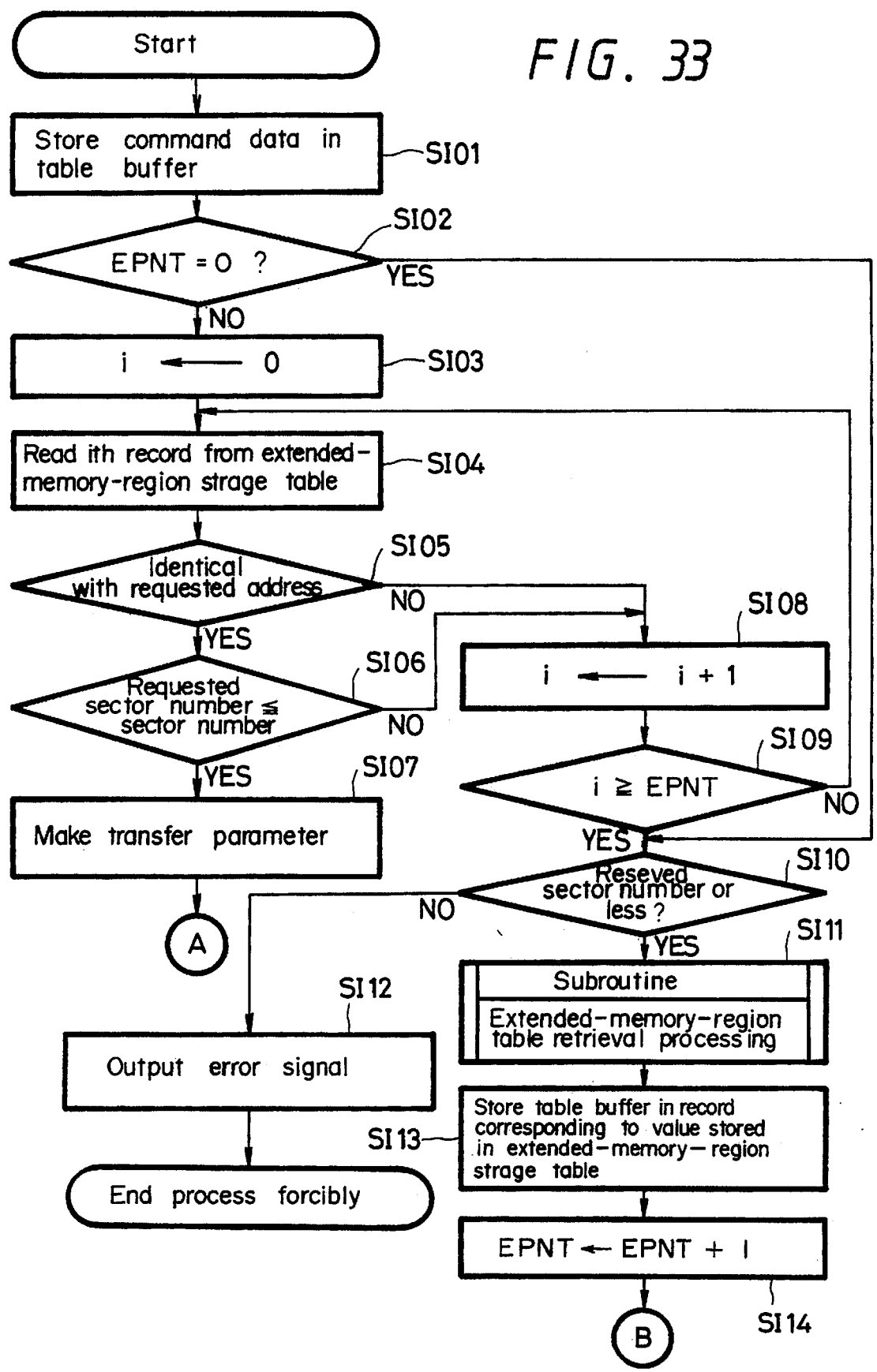
FIGS. 33 and 34 are flowcharts to which reference will be made in explaining an operation of the extended read processing means in the system controller.

In step SI01 shown in FIG. 33, the extended read processing means 98 stores the command data stored in the command storage region in a table buffer. The table buffer is arranged similarly to one record of the extended-memory-region storage table shown in FIG. 55A. In step S101, the command data (indicating the address on the optical disc D, the start logical address of the extended memory region EZ, and the number of sectors) is stored in accordance with an arrangement order of one record.

In step SI02, the identifying means 201 discriminates whether or not at least one ROM data Dr is stored in the extended memory region EZ. This discrimination is carried out by determining whether or not a value EPNT stored in a accumulation-point storage region allocated to the data RAM 63 is "0".

If the value stored in the above accumulation-point storage region is not "0", then the processing proceeds to the next step SI03. In step SI03, an index register i which is to be an index used for reading a record of the extendedmemory-region storage table is initialized. Specifically, an initial value "0" is stored in the index register i.

In step SI04, the table reading means 203 reads a record of the number indicated by the index register i from the extended-memory-region storage table. Specifically, the table reading means 203 reads a record of the ith record from the extended-memory-region storage table.

In step SI05, the identifying means 201 discriminates whether or not an address of the optical disk D which is requested at present is agreed with the address of the optical disk D which is registered in the ith record. If they are agreed with each other, then the processing proceeds to step SI06. In step SI06, the identifying means 201 discriminates whether or not the number of sectors requested at present is equal to or smaller than the number of sectors registered in the ith record.

If the number of sectors requested at present does not exceed the number of registered sectors, then the processing proceeds to step SI07. In step SI07, the parameter generating means 205 generates the transfer parameter. Specifically, the parameter generating means 205 stores a start logical address of the extended memory region stored in the ith record of the extended-memory-region storage table and the number of sectors requested at present in the parameter storage region allocated to the data RAM 63.

If on the other hand it is determined in step SI06 that the number of sectors requested at present exceeds the number of registered sectors or if it is determined in step SI05 that the address of the optical disk D requested at present is not agreed with the registered address, then the processing proceeds to step SI08 in which the index register i is updated by adding "1" to its value.

In step SI09, the identifying means 201 discriminates whether or not retrieval of the data accumulated in the extended memory region EZ has been finished completely. The discrimination is carried out by determining whether or not the value of the index register i is equal to or smaller than a value EPNT stored in the accumulation-point storage region. If the value of the index register i is smaller than the value stored in the accumulation-point storage region, then the processing returns to step SI04 in which the next record of the extended-memory-region storage table is read out. Thereafter, the processings in steps succeeding step SI04 are repeated.

If the value of the index register i exceeds the value EPNT of the accumulation-point storage region, then the processing proceeds to step SI10. In step SI10, the identifying means 201 discriminates whether or not the number of sectors requested at present does not exceed the number of reserved sectors in the extended memory region. The discrimination is carried out by comparing the number of sectors requested at present with a value stored in the reserved-sector number storage region allocated to the data RAM 63.

If the number of sectors requested at present does not exceed the number of reserved sectors, then the processing proceeds to step SI11 in which the processing further proceeds to an extended-information-table retrieval subroutine (extended-information-table retrieving means 204). On the other hand, if the number of sectors requested at present exceeds the number of reserved sectors, then the processing proceeds to step SI12. In step SI12, the error-signal outputting means 209 outputs an error signal to the I/F controller 25, thereby the processing being ended forcibly. The error signal is supplied through the I/F controller 25 to the host computer 31. Based on the supplied error signal, the host computer 31 informs an operator of occurrence of an error thorough a display apparatus connected to the host computer 31, such as a cathode ray tube (CRT), a liquid crystal display panel or the like.

Figure 35:
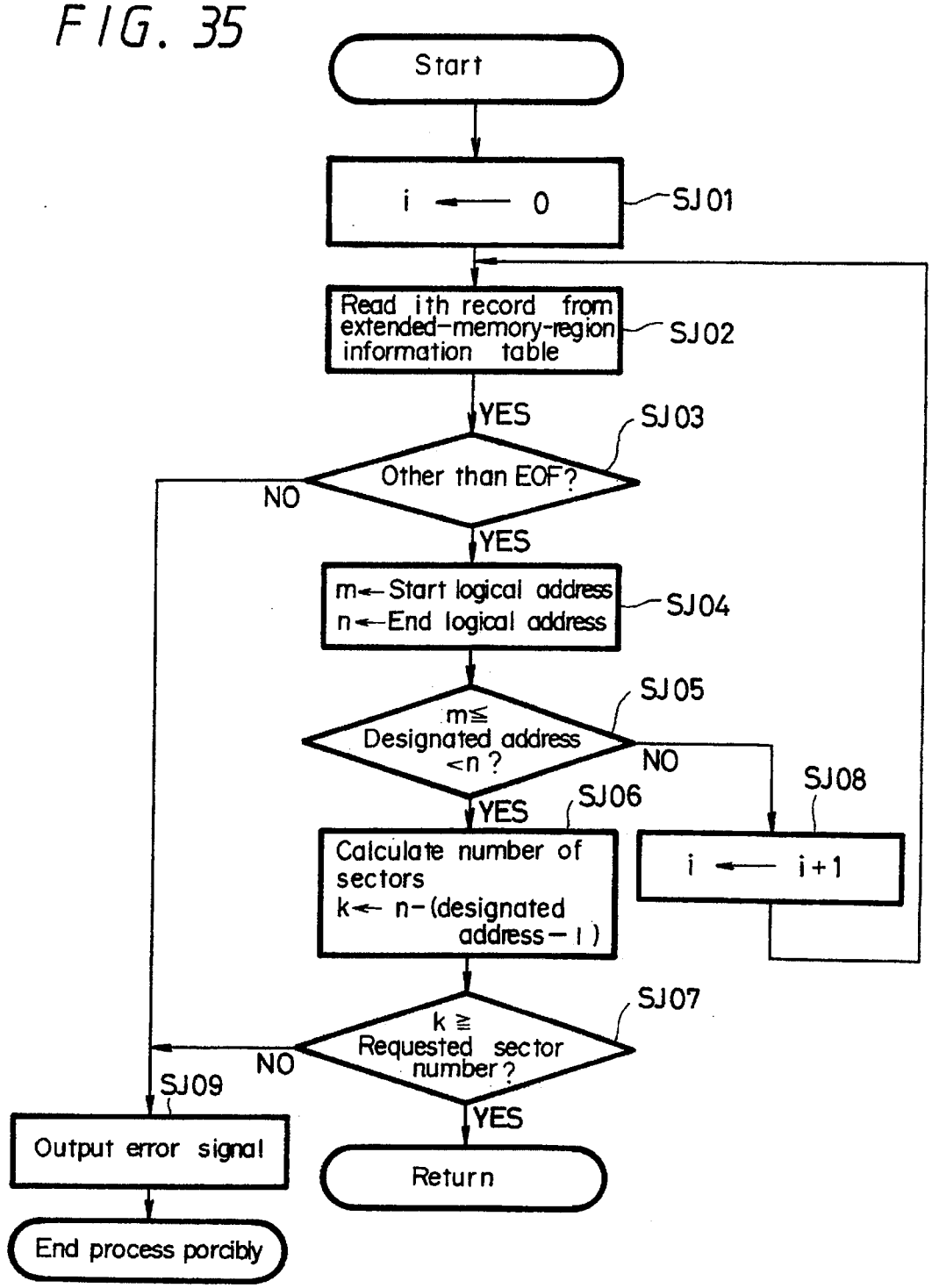
FIG. 35 is a flowchart to which reference will be made in explaining an operation of an extended information table retrieving means in the extended read processing means of the system controller.

In step SI11, the extended-information-table retrieving means 204 carries out the processings in the extended-information-table retrieval subroutine as shown in FIG. 35. In step SJ01, the index register i which is to be an index used to read a record of the storage information table is initialized. Specifically, an initial value "0" is stored in the index register i.

In step SJ02, the table reading means 203 reads a record of the number indicated by the index register i from the extended-memory-region information table. Specifically, the table reading means 203 reads the record of the ith record from the extended-memory-region information table. In step SJ03, the discriminating means 201 discriminates whether or not contents of the above ith record is other than the EOF code. If the contents are other than the EOF code, then the processing proceeds to step SJ04 in which a start logical address and an end logical address are read out from the above ith record.

In step SJ05, the identifying means 201 discriminates whether or not a start logical address requested at present is an address between the a start logical address read out from the above ith record and an end logical address read out therefrom.

If the start logical address requested at present is an address between the above start and end logical addresses, then the processing proceeds to step SJ06. In step SJ06, the sector-number calculating means 210 calculates the number of sectors of the extended memory region form the start logical address requested at present stored in the ith record of the extended-memory-region information table. Specifically, the sector-number calculating means 210 calculates the number of sectors by subtracting from the end logical address stored in the ith record a value obtained by subtracting "1" from the start logical address requested at present. The calculated number of sectors is stored in the index register k.

In step SJ07, the identifying means 201 discriminates whether or not the number of sectors of the extended memory region form the start logical address requested at present stored in the ith record is equal to or greater than the number of sectors requested at present. The discrimination is carried out by determining whether or not the value of the index register k is equal to or greater than the number of sectors requested at present. If the value of the index register k is equal to or greater than the number of sectors requested at present, then the processing of the extended-information-table retrieval subroutine (the extended-information-table retrieving means 203) is ended.

If on the other hand the start logical address requested at present is not an address between the above start and end logical addresses, then the processing proceeds to step SJ08. In step SJ08, the index register i is updated by adding "1" to its value. Thereafter, the processing proceeds to step SJ02 in which the next record of the extended-memory-region information table is read out. Thereafter, the processings in steps succeeding the step SJ02 are repeated.

If it is determined in step SJ07 that the value of the index register k is smaller than the number of sectors requested at present or if it is determined in step SJ03 that the contents of the ith record of the extended-memory-region information table are the EOF code, then the processing proceeds to step SJ09. In step SJ09, the error-signal outputting means 209 outputs the error signal to the I/F controller 25, thereby the processing being ended forcibly.

When the processing returns to the main routine shown in FIG. 33 to end the extended-information-table retrieval routine (the extended-information-table retrieving means 204), the processing proceeds to step SJ13. In step SI13, the extended-memory-region storage table generating means 206 stores the address stored in table buffer in a record address, which corresponds to the value stored in the accumulation-point storage region, of the extended-memory-region storage table. In step SI14, the value stored in the accumulation-point storage region is updated by adding "1" thereto.

Figure 34:
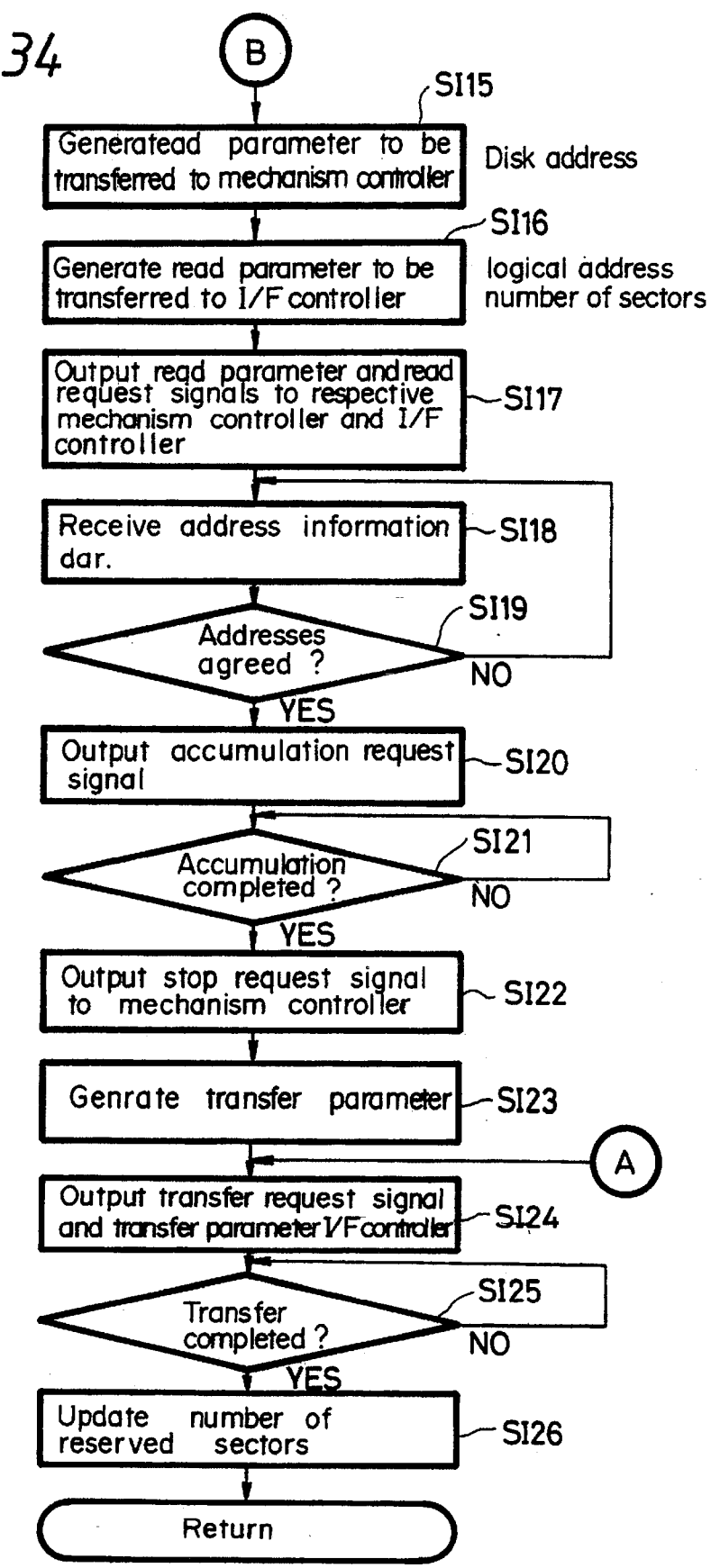

In step SI15 shown in FIG. 34, the parameter generating means 205 generates a read parameter to be transferred to the mechanism controller 28. Specifically, the parameter generating means 205 stores in the mechanism-read-parameter storage region allocated to the data RAM 63 the address of the optical disk D requested at present and stored in the table buffer.

In step SI16, the parameter generating means 205 generates a read parameter to be transferred to the I/F controller 25. Specifically, the parameter generating means 205 stores in the I/F-read-parameter storage region allocated to the data RAM 63 the start logical address requested at present and the number of sectors requested at present.

In step SI17, the request outputting means 208 outputs a read-request signal to the mechanism controller 28 and the parameter generating means 205 outputs thereto the read parameter stored in the mechanism-read-parameter storage region. Simultaneously, the request outputting means 208 outputs the read-request signal to the I/F controller 25 and the parameter generating means 205 outputs thereto the read parameter stored in the I/F-read-parameter storage region.

Under the control of the mechanism controller 28 based on the read-request signal input from the system controller 25 and the read parameter input therefrom, the optical pickup 3 is moved to a track corresponding to an address of the optical disk D indicated by the above parameter. Reproduced data Di from the optical pickup 3 is converted by the decoder 24 into the ROM data Dr which is supplied to the I/F controller 25. The decoder 24 supplies the ROM address information Dar corresponding to the ROM data Dr to the system controller 29.

In step SI18 shown in FIG. 34, the system controller 29 receives through the address-information reading means 202 the ROM address information Dar transferred from the decoder 24 through the input port 64. In step SI19, the identifying means 201 discriminates whether or not the address received through the address information reading means 202 are agreed with the address of the optical disk D requested at present. Until the two addresses become agreed with each other, the processings in steps SI18 and SI19 are repeated.

If the two addresses become agreed with each other, then the processing proceeds to step SI20. In step SI20, the request outputting means 208 outputs an accumulation-request signal to the I/F controller 25. Based on the accumulation-request signal, the I/F controller 25 successively accumulates the ROM data Dr supplied from the decoder 24 in the extended memory region EZ from the determined start logical address by a sector unit. When the ROM data Dr of requested sectors are accumulated therein, the I/F controller 25 outputs an accumulation-completion signal to the system controller 29. This operation will be described in detail later on.

In the processing routine shown in FIG. 34, after the request outputting means 208 outputs the accumulation-request signal in step SI20, the processing proceeds to step SI21. In step SI21, the system controller 29 waits until an accumulation-completion signal from the I/F controller is input thereto. When the accumulation-completion signal from the I/F controller 25 is input to the system controller 29, the processing proceeds to the step SI22. In step SI22, the request outputting means 208 outputs a stop-request signal to the mechanism controller 28. Under the control of the mechanism controller 28 based on the input stop-request signal, the operation of reproducing the optical disk D is stopped.

In step SI23, the parameter generating means 205 generates a transfer parameter. Specifically, the parameter generating means 205 stores the determined start logical address and the number of sectors requested at present in the parameter storage region allocated to the data RAM 63.

In step SI24, the request outputting means 208 outputs a transfer-request signal to the I/F controller 25 and at the same time, the parameter generating means 205 outputs thereto the transfer parameter stored in the parameter storage region. The processing in step SI24 is carried out not only after the processing in step SI23 is ended but also after the processing in step SI07 shown in FIG. 33 is ended.

Based on the transfer-request signal input from the system controller 29, the I/F controller 25 successively reads out the ROM data Dr from the extended memory region EZ from the start logical address stored in the transfer parameter n to transfer the read ROM data Dr to the host computer 31 side. When the ROM data Dr of requested sectors are transferred to the host computer 31 side, the I/F controller 25 outputs a transfer-completion signal to the system controller 29. This operation will be described in detail later on.

In the processing routine shown in FIG. 34, after the system controller 29 outputs the transfer-request signal to the I/F controller 25 in step SI24, the processing proceeds to step SI25. In step SI25, the system controller waits until the transfer-completion signal is input from the I/F controller 25 thereto. When the transfer completion signal is input from the I/F controller 25 to the system controller 29, the processing proceeds to step SI26. In step SI26, the remaining-sector-number updating means 207 updates the number of reserved sectors. Specifically, the remaining-sector-number updating means 207 stores in the reserved-sector-number storage region a value obtained by subtracting the number of sectors requested at present from the value stored in the reserved-sector-number storage region.

When the processing in step SI26 is ended, the extended read processing subroutine (the extended read processing means 98) is ended. At the same time, the various-request processing subroutine (the various-request processing means 95) shown in FIG. 10 is ended.

In the extended read request subroutine (the extended read requesting means 78) of the I/F controller 25 shown in FIG. 29, after the command outputting means 182 outputs the command data to the system controller 29 in step SF01, the processing proceeds to step SF02.

In step SF02, the identifying means 181 discriminates whether or not the request signal is input from the system controller 29 to the I/F controller 25. Specifically, the I/F controller 25 waits for the request signal to be input thereto. When the request signal is input from the system controller 29 to the I/F controller 25, the processing proceeds to step SF03. In step SF03, the identifying means 181 discriminates whether or not the request signal input from the system controller 29 is a read-request signal.

If the input request signal is the read-request signal, then the processing proceeds to step SF04. In step SF04, the parameter receiving means 183 receives the read parameter supplied thereto through the input port 54 and stores it in the parameter storage region allocated to the data RAM 53. Thus, the start logical address and the number of sectors of the extended memory region EZ in which data is to be accumulated are stored in the parameter storage region. At this time, the start logical address is stored in the index register j.

Figure 30:
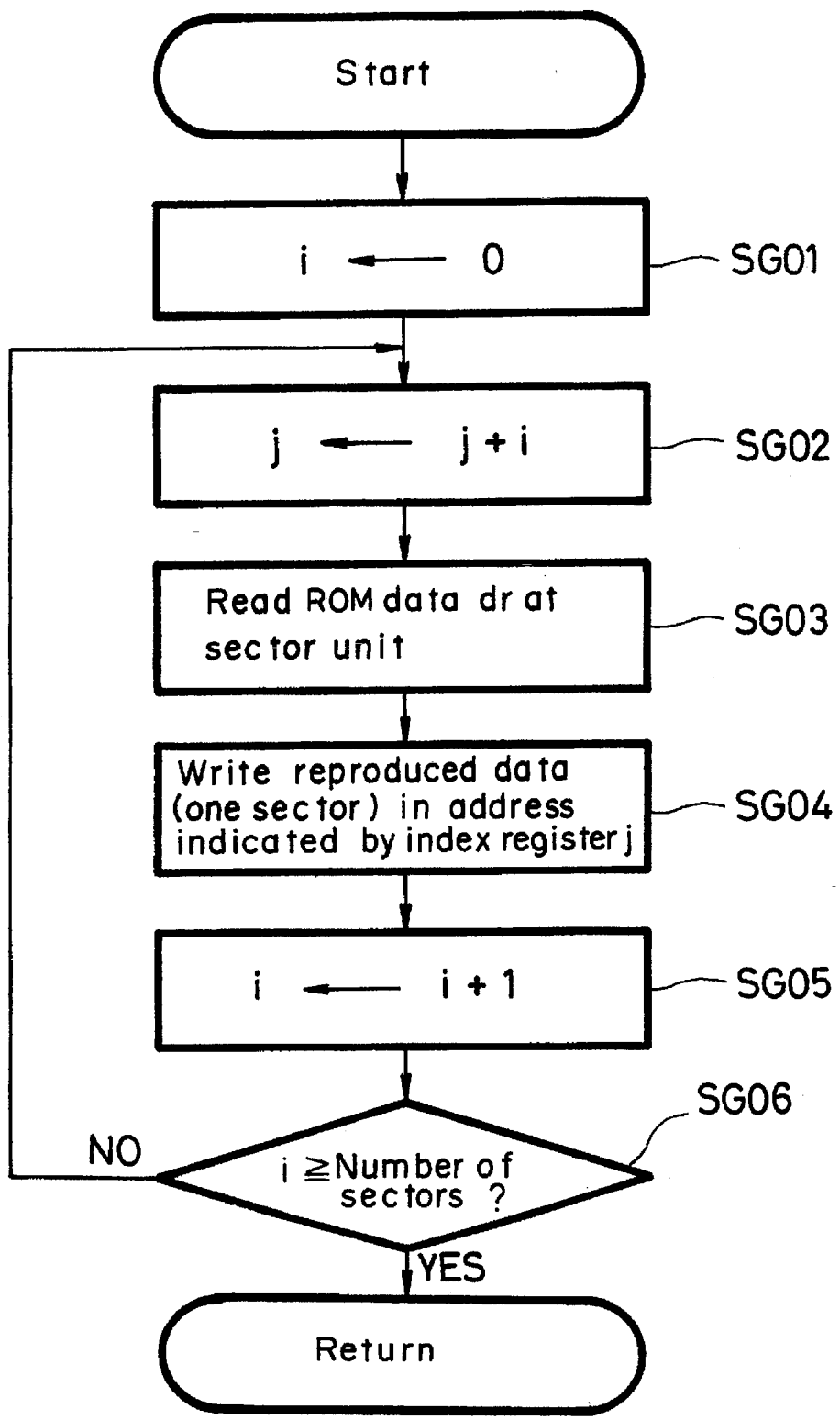
FIG. 30 is a flowchart to which reference will be made in explaining an operation of a storage request means in the extended read request means of the I/F controller.

In step SF05, the identifying means 181 waits for the accumulation request signal to be input from the system controller 29. When the accumulation-request signal is input thereto from the system controller 29, the processing proceeds to step SF06. In step SF06, the processing further proceeds to an accumulation-request processing subroutine (the accumulation-request processing means 184). A processing in this subroutine is carried out as shown in a flowchart of FIG. 30. In step SG01, the index register i is initialized. Specifically, an initial value "0" is stored in the index register i.

In step SG02, addresses to be accumulated of the ROM data Dr stored in the extended memory region EZ are calculated. Specifically, a value obtained by adding a value of the index register j and the value of the index register i is stored in the index register j. In step SG03, the reproduced-data reading means 187 reads the ROM data (one sector) Dr supplied from the decoder 24 through the input port 54.

In step SG04, the reproduced-data writing means 188 writes the ROM data (one sector) Dr read in step SG03 in a logical address of the extended memory region indicated by the value of the index register j. In step SG05, the index register i is updated by adding "1" to its value.

In step SG06, the identifying means 181 discriminates whether or not the value of the index register i is equal to or greater than the number of sectors stored in the parameter storage region. If the value of the index register i is smaller than the number of sectors, then the processing returns to step SG02. In step SG02, the logical address stored in the index register j is updated. The processings in steps succeeding step SG02 are repeated. If on the other hand the value of the index register i is equal to or greater than the number of sectors, then the accumulation-request processing subroutine (the accumulation request processing means 184) is ended.

In the main routine shown in FIG. 29, when the accumulation-request processing subroutine (the accumulation-request processing means 184) in step SF06 is ended, the processing of the I/F controller 25 proceeds to step SF07. In step SF07, the completion-signal outputting means 186 outputs an accumulation-completion signal to the system controller 29.

In step SF08, the identifying means 181 discriminates whether or not the transfer-request signal is input from the system controller 29 to the I/F controller 25. Specifically, the I/F controller 25 waits for the transfer-request signal to be input from the system controller 29 thereto.

If the transfer-request signal is input from the system controller 29 to the I/F controller 25 in step SF08 or if it is determined in step SF03 that the request signal is not the read-request signal, then the processing proceeds to step SF09. In step SF09, the parameter receiving means 183 receives the transfer parameter supplied through the input port 54 to store it in the parameter storage region allocated to the data RAM 53. Thus, the start logical address and the number of sectors of the transfer buffer region where data to be transferred at present are accumulated are stored in the parameter storage region. At this time, the start logical address is stored in the index register j.

Figure 31:
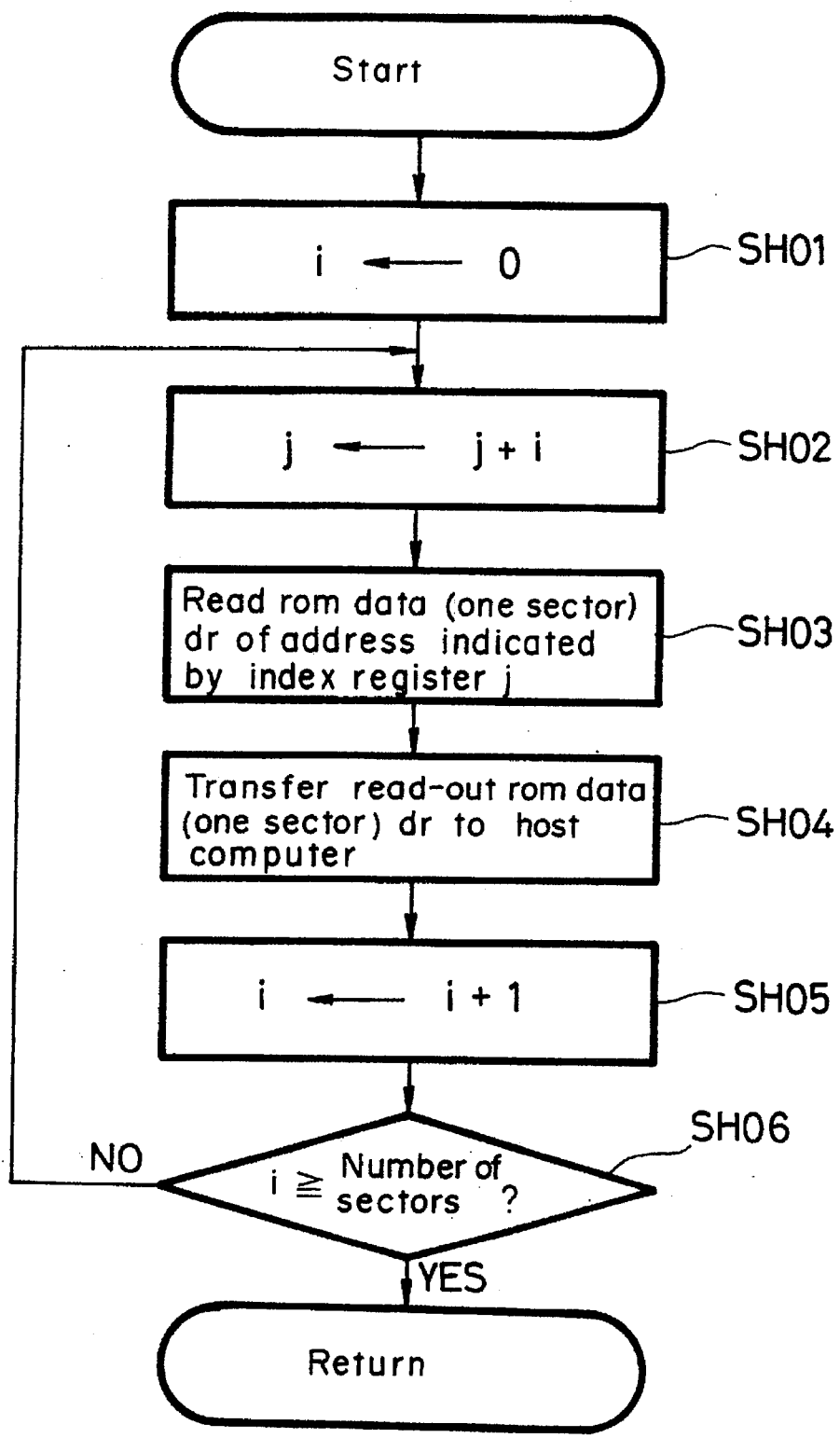
FIG. 31 is a flowchart to which reference will be made in explaining an operation of a transfer request means in the extended read request means of the I/F controller.

In step SF10, the processing proceeds to the transfer-request processing subroutine (the transfer-request processing means 185). A processing in this subroutine is carried out as shown in a flowchart of FIG. 31. In step SH01, index register i is initialized. Specifically, an initial value "0" is stored in the index register i.

In step SH02, addresses of the extended memory region EZ from which data are to be transferred are calculated. Specifically, a value obtained by adding the value of the index register j and the value of the index register i is stored in the value of the index register j. In step SH03, the data reading means 189 reads the ROM data (one sector) Dr accumulated in the extended memory region EZ of the logical address indicated by the value of the index register j.

In step SH04, the data transfer means 190 transfers the ROM data Dr of one sector read out in step SH03 to the host computer 31. In step SH05, the index register i is updated by adding "1" to its value.

In step SH06, the identifying means 181 discriminates whether or not the value of the index register i is equal to or greater than the number of sectors stored in the parameter storage region. If the value of the index register i is smaller than the number of sectors, then the processing returns to step SH02. In step SH02, the logical address stored in the index register j is updated. Thereafter, processings in steps succeeding step SH02 are repeated. If on the other hand the value of the index register i is equal to or greater than the number of sectors, then the transfer-request processing subroutine (the transfer-request processing means 185) is ended.

In the main routine shown in FIG. 29, when the transfer-request processing subroutine (the transfer-request processing means 185) in step SF10 is ended, the processing of the I/F controller 25 proceeds to step SF11. In step SF11, the completion-signal outputting means 186 outputs the transfer-completion signal to the system controller 29. When the processing in step SF11 is ended, the processing of the extended read request processing subroutine (the extended read request processing means 78) is ended. At the same time, the various-request processing subroutine (the various-request processing means 75) in step S103 shown in FIG. 6 is ended.

A block transfer processing from the transfer buffer region to the extended memory region will be described below.

When the block transfer command is input from the host computer 31 to the I/F controller 25, the processing of the I/F controller 25 proceeds from the various-request processing subroutine (the various-request processing means 75) to a block transfer request subroutine (the block transfer requesting means 79) in step S104 shown in FIG. 6.

Figure 36:
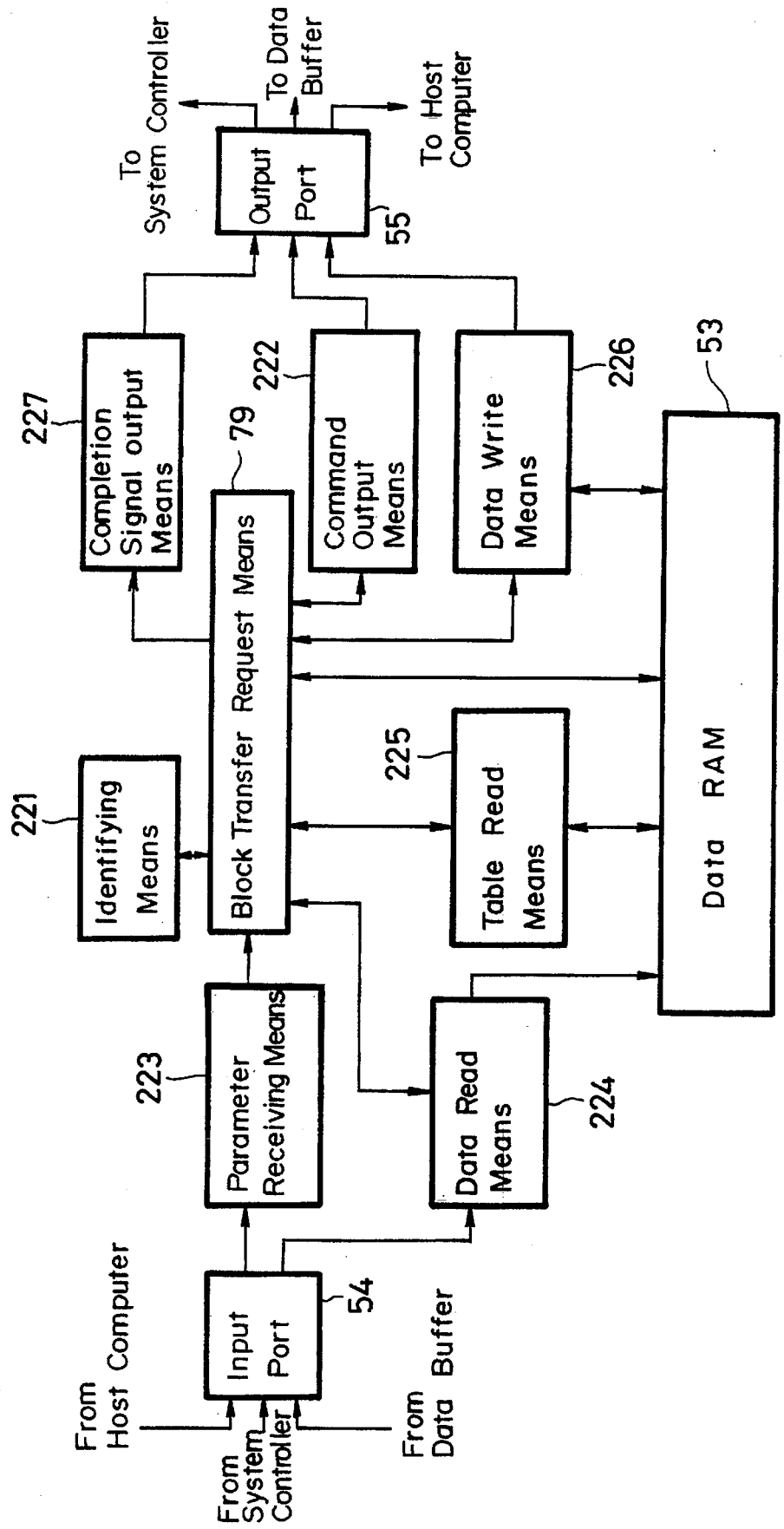
FIG. 36 is a functional block diagram showing a block transfer request means in the I/F controller.
Figure 37:
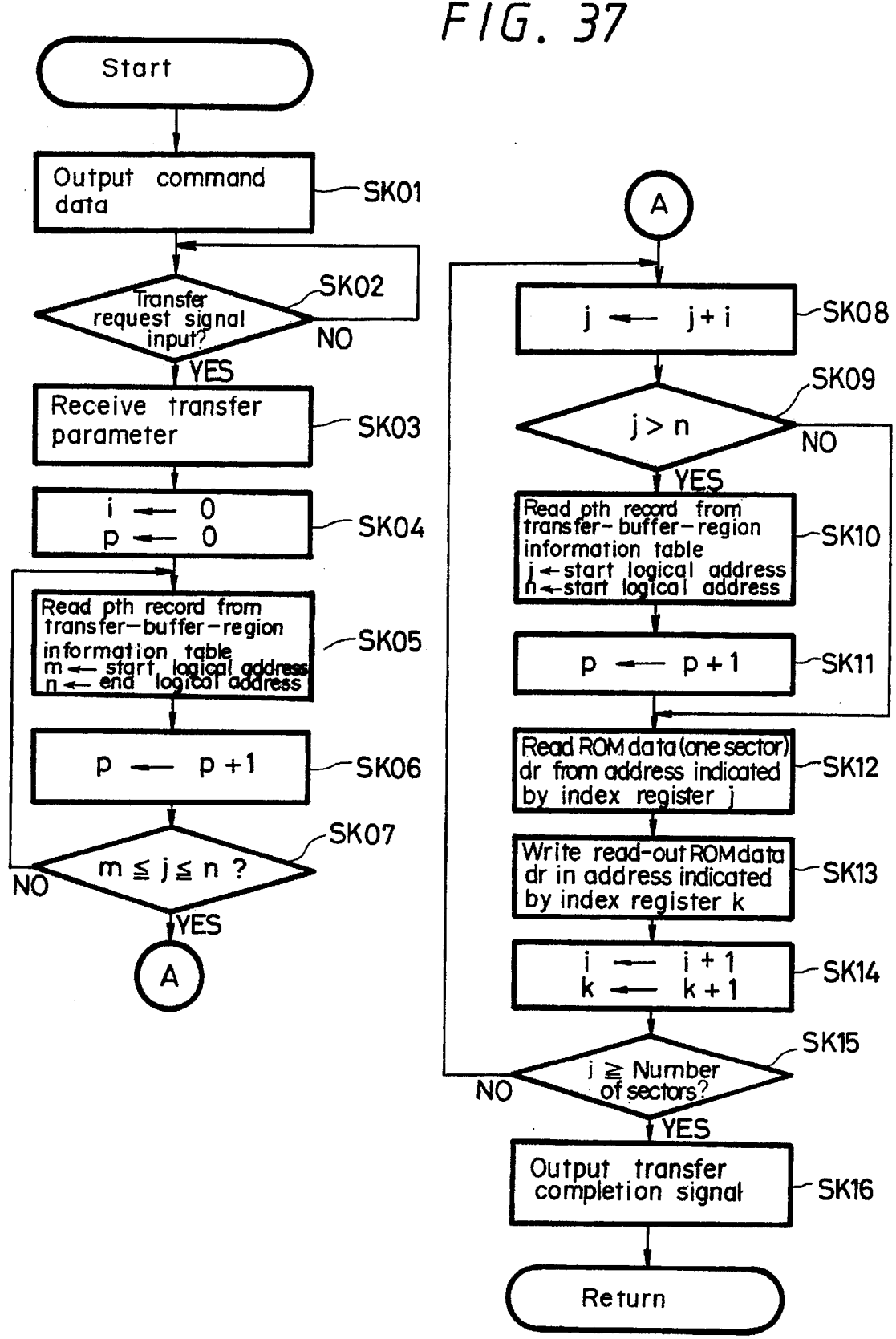
FIG. 37 is a flowchart to which reference will be made in explaining an operation of the block transfer request means in the I/F controller.

As shown in FIG. 36, the block-transfer requesting means 79 has an identifying means 221 for carrying out various discriminations, a command outputting means 222 for outputting commands to the system controller 29, a parameter receiving means 223 for receiving a transfer parameter transferred from the system controller 29, a data reading means for successively reading out the ROM data Dr accumulated in the transfer buffer region TZ from the logical address indicated by the transfer parameter, a table reading means 225 for reading out a transfer-buffer-region information table stored in a predetermined region of the data RAM 53 by a record unit, a data writing means 226 for successively writing the ROM data Dr read out by the above data reading means 224 from the logical address indicated by the transfer parameter by a sector unit, and a completion-signal outputting means 227 for informing the system controller 29 of the completion of the processing.

in step SK01 shown in FIG. 37, the block transfer requesting means 79 outputs the block transfer command data stored in the command storage region through the command outputting means 222 to the system controller 29.

When the block-transfer command data is input from the I/F controller 25 to the system controller 29, the processing of the system controller 29 proceeds from the various-request processing subroutine (the various-request processing means 95) to a block transfer processing subroutine (the block transfer processing means 99) in step S304 shown in FIG. 10. The block transfer command data is consist of a head address of the optical disk D from which data accumulated in the transfer buffer region TZ is originally transferred, the number of relative sectors from the head address, the number of sectors of data to be read, and a start logical address of the extended memory region EZ in which the read data to be written.

Figure 38:
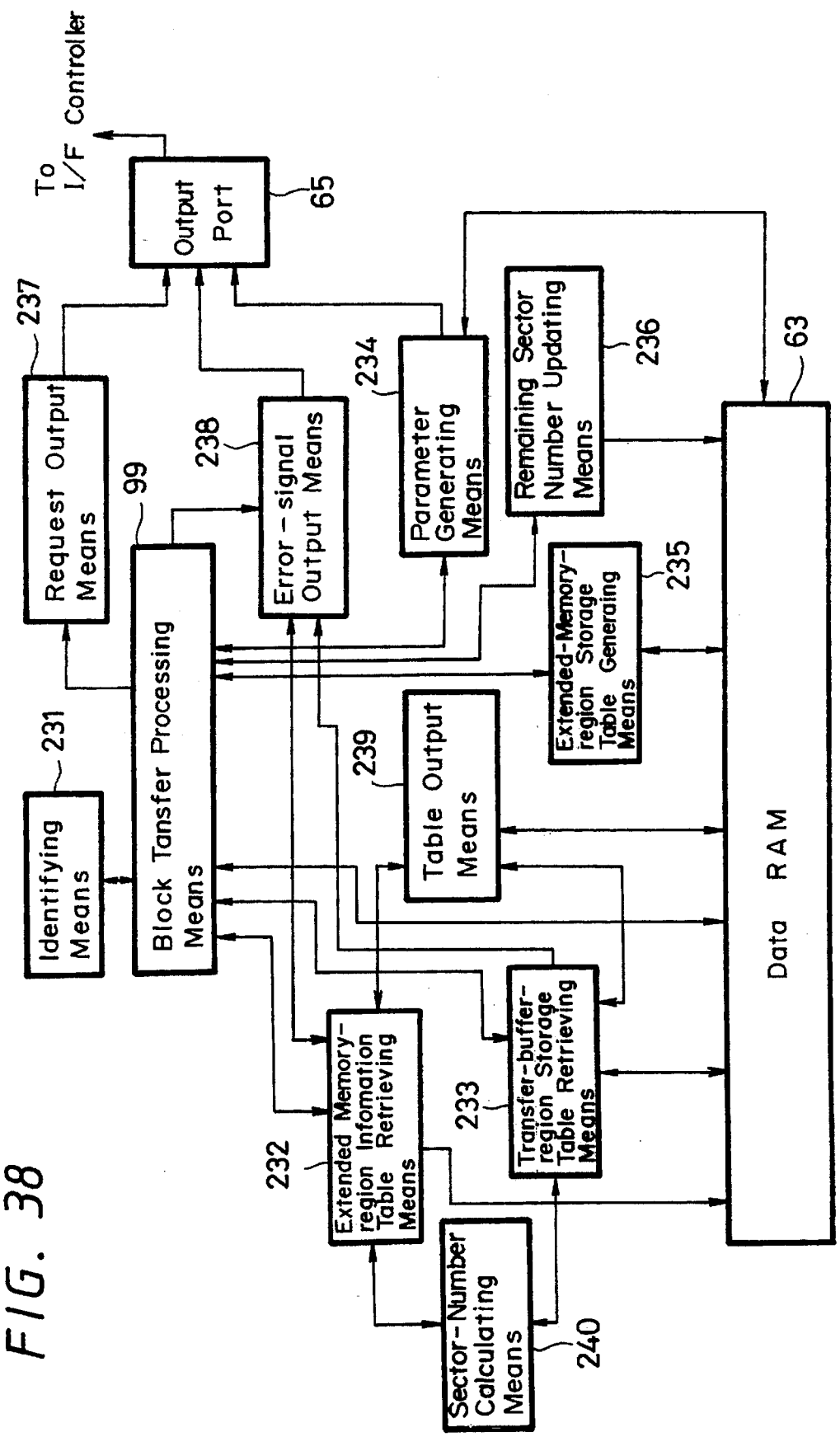
FIG. 38 is a functional block diagram showing a block transfer processing means in the system controller.

As shown in FIG. 38, the block-transfer processing means 99 has an identifying means 231 for carrying out various discriminations, an extended-memory-region information table retrieving means 232 for retrieving a designated record of a corresponding extended-memory-region information table based on the present command data, a transfer-buffer-region storage table retrieving means 233 for retrieving a designated record of a corresponding transfer-buffer-region storage table based on the present command data, a parameter generating meas 234 for generating a transfer parameter for requesting the transfer of data to the extended memory region EZ to transfer it to the I/F controller 25, an extended-memory-region storage table generating means 235 for generating an extended-memory-region storage table based on the present command data, a remaining-sector-number updating means 236 for updating by substraction the number of reserved sectors which is decreased as the data are accumulated in the extended memory region EZ, a request outputting means 237 for outputting a signal used to command various requests to the I/F controller 25, and an error-signal outputting means 238 for outputting an error signal to the I/F controller 25.

The block transfer processing means 99 has a table reading means 239 activated by the extended-information-table retrieving means 232 or the transfer-buffer-region storage table retrieving means 233 for reading the extended-memory-region information table or the transfer-buffer-region storage table stored in a predetermined region of the data RAM 63 by a record unit, and a sector number calculating means 240 for calculating the number of sectors, in which data can be accumulated of the extended memory region EZ in which data is to be accumulated at present or for calculating the number of sectors of the data which is accumulated in the transfer buffer region TZ and to be transferred at present.

Figure 39:
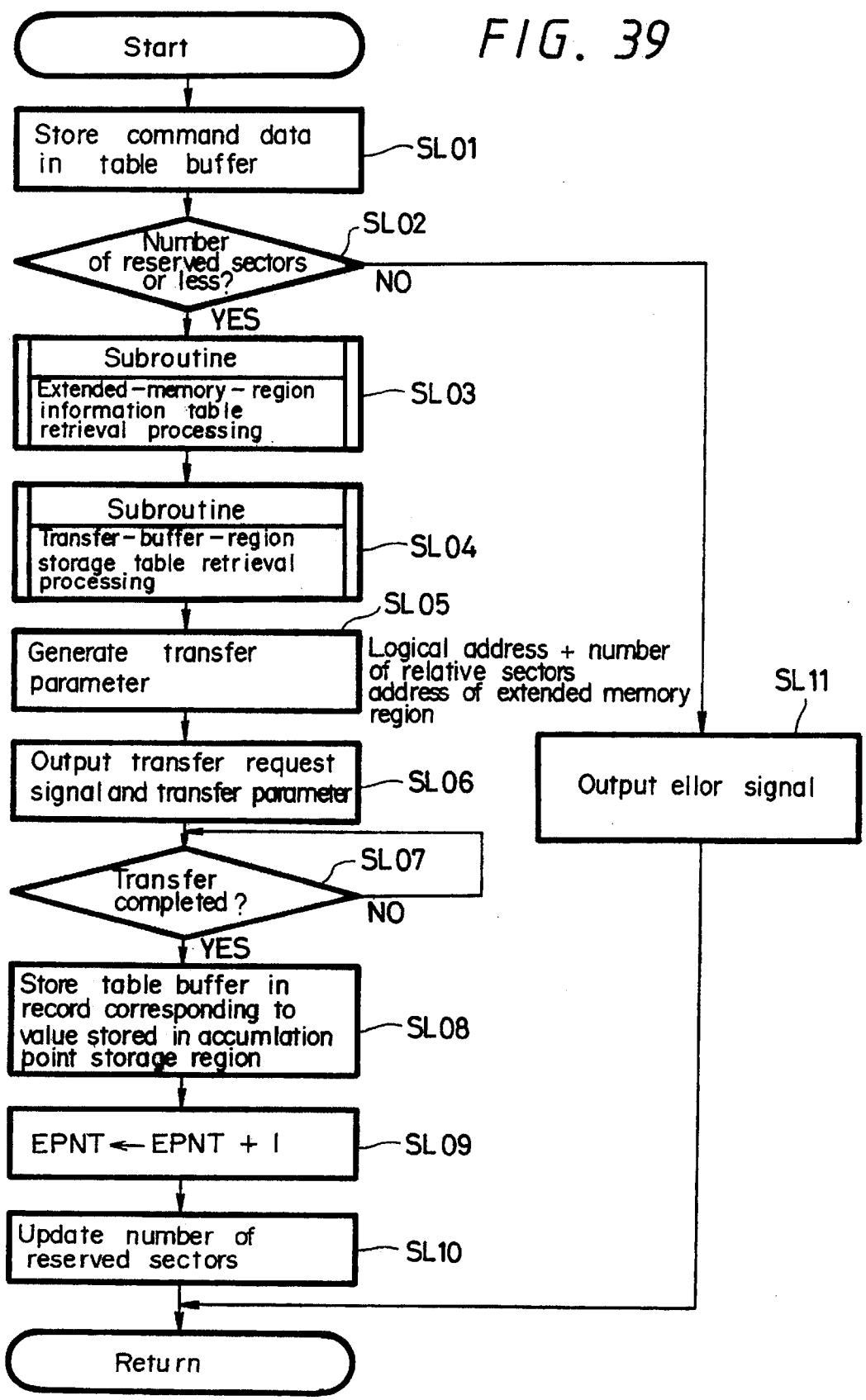
FIG. 39 is a flowchart to which reference will be made in explaining an operation of the block transfer processing means in the system controller.

In step SL01 shown in FIG. 39, the block-transfer processing means 99 stores the command data stored in the command storage area in the table buffer. The table buffer is arranged similarly to a record of the extended-memory-region storage table shown in FIG. 55A. In step SL01, the command data (which is consist of the address of the optical disk D and the number of relative sectors and the start logical address and the number of sectors of the extended memory region EZ) are stored in the table buffer in the same order of the arrangement of the one record of the extended-memory-region storage table.

In step SL02, the identifying means 231 discriminates whether or not the number of sectors requested at present is equal to or smaller than the number of reserved sectors of the extended memory region EZ. This discrimination is carried out by comparing the number of sectors requested at present and a value stored in the reserved-sector-number storage region allocated to the data RAM 63.

Figure 40:
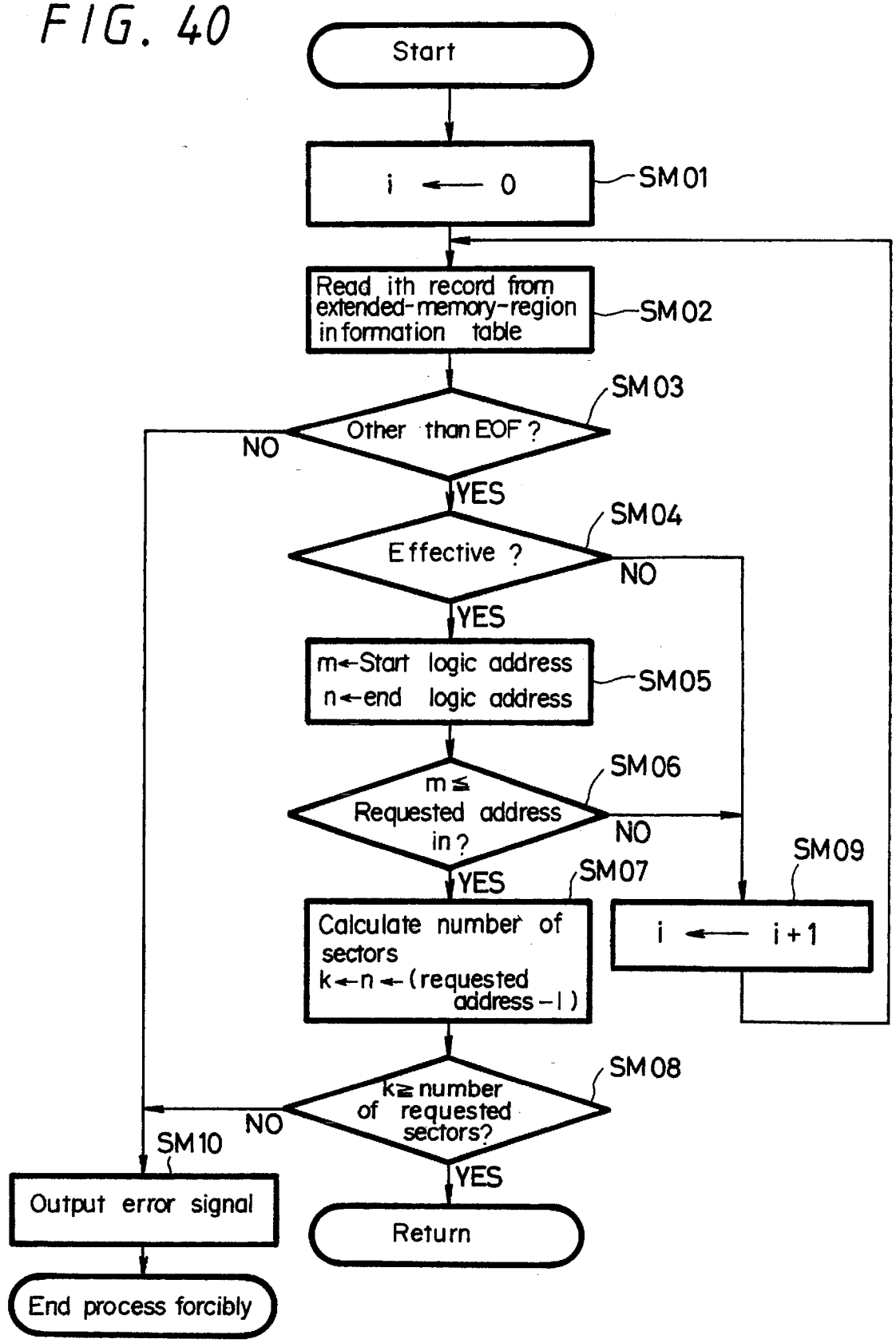
FIG. 40 is a flowchart to which reference will be made in explaining an operation of an extended information table retrieving means in the block transfer processing means of the system controller.

If the number of sectors requested at present is equal to or smaller than the number of the reserved sectors, then the processing proceeds to step SL03. In step SL03, the processing proceeds to an extended-information-table retrieval subroutine (the extended-information-table retrieving means 232). A processing in this subroutine is carried out as shown in FIG. 40. In step SM01, the index register i which is to be a record reading index of the extended-memory-region information table is initialized. Specifically, an initial value "0" is stored in the index register i.

In step SM02, the table reading means 239 reads a record of the number indicated by the index register i from the extended-memory-region information table. Specifically, the table reading means 239 reads a record of an ith record from the extended-memory-region information table.

In step SM03, the identifying means 231 discriminates whether or not contents of the above ith record are other than the EOF code. If it is determined in step SM03 that the contents are other than the EOF code, then the processing proceeds to step SM04. In step SM04, the identifying means 231 discriminates whether or not the contents of the above ith record are effective. This discrimination is carried out by determining whether the first bit of the ith record has a value of "1" or "0". If it is determined in step In SM04 that the contents are effective, then the processing proceeds to step SM05. In step SM05, the start and end logical addresses are rad from the ith record.

In step SM06, the identifying means 231 discriminates whether or not the start logical address requested at present is an address between the start and end logical addresses read out from the ith record.

If the start logical address requested at present is an address between the start and send logical addresses, then the processing proceeds to step SM07. In step SM07, the sector number calculating means 240 calculates the number of sectors of the extended memory region EZ from the start logical address of the ith record set in the extended-memory-region information table. Specifically, the sector-number calculating means 240 calculates the number of sectors by subtracting a value obtained by subtracting "1" from the start logical address requested at present from the end logical address of the ith record. The number of sectors are stored in the index register k.

In step SM08, the discriminating meas 231 discriminates whether or not the number of sectors of the extended memory region EZ from the start logical address requested at present of the ith record is equal to or greater than the number of sectors requested at present. This discrimination is carried out by determining whether or not the value of the index register k is equal to or greater than the number of sectors requested at present. If the value of the index register k is equal to or greater than the number of sectors requested at present, than the extended-information-table retrieval subroutine (the extended-information-table retrieving means 232) is ended.

If on the other hand it is determined in step SM06 that the start logical address requested at present is not an address between the start and end logical addresses of the ith record or if it is determined in step SM04 that the contents of the ith record is not effective, then the processing proceeds to step SM09. In step SM09, the index register i is updated by adding "1" to its value. The processing returns to step SM02 in which the next record of the extended-memory-region information table is read. Thereafter, the processings in steps succeeding step SM02 are repeated.

On the other hand, if it is determined in step SM08 that the value of index register k is smaller than the number of sectors requested at present or if it is determined in step SM03 that the contents of the ith record of the extended-memory-region information table are the EOF code, then the processing proceeds to step SM10. In step SM10, the error-signal outputting means 238 outputs an error signal to the I/F controller 25, thereby the processing being ended forcibly.

Figure 41:
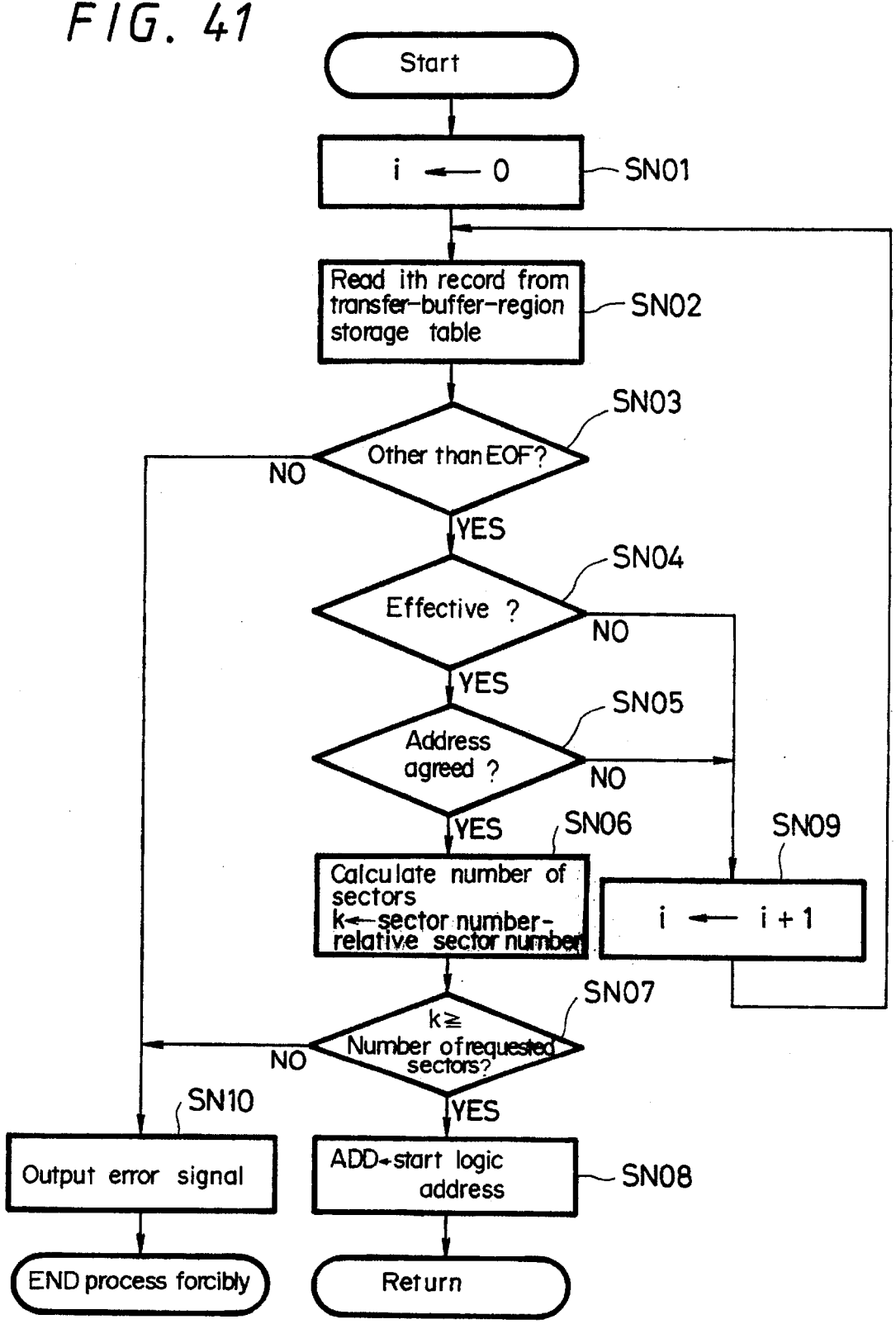
FIG. 41 is a flowchart to which reference will be made in explaining an operation of a transfer storage table retrieving means in the block transfer processing means of the system controller.

In the main routine shown in FIG. 39, if the processing of the extended-information-table retrieval subroutine (the extended-information-table retrieving means 232) is ended, then the processing of the system controller 29 proceeds to step SL04. In step SL04, the processing proceeds to a transfer-buffer-region storage table retrieval subroutine (the transfer-buffer-region storage table retrieving means 233). A processing in this subroutine is carried out as shown in FIG. 41. In step SN01, the index register which is to be a record reading index of the transfer-buffer-region storage table is initialized. Specifically, an initial value "0" is stored in the index register i.

In step SN02, the table reading means 239 reads a record of the number indicated by the index register i from the transfer-buffer-region storage table. Specifically, the table reading means 239 reads the ith record from the transfer-buffer-region storage table.

In step SN03, the identifying means 231 discriminates whether or not contents of the ith record are other than the EOF code. If it is determined in step SN03 that the contents are other than the EOF code, then the processing proceeds to step SN04. In step SN04, the identifying means 231 discriminates whether or not the contents of the ith record is effective. This discrimination is carried out by determining whether a first bit of the ith record has a value of 1 or 0. If the contents are effective, then the processing proceeds to step SN05. In step SN05, the identifying means 231 discriminates whether or not an address of the optical disk D requested at present and an address of the optical disk D stored in the ith record of the transfer-buffer-region storage table are agreed with each other.

If it is determined in step SN05 that both of the address are agreed with each other, then the processing proceeds to step SN06. In step SN06, the sector-number calculating means 240 calculates the number of sectors of the ROM data Dr from a relative sector requested at present which is accumulated in the transfer buffer region TZ of the address designated by the ith record of the transfer-buffer-region storage table. Specifically, the sector-number calculating means 240 calculates the number of sectors by subtracting the number of relative sectors requested at present from the number of sectors of the ith record. The calculated number of sectors is stored in the index register k.

In step SN07, the identifying means 231 discriminates whether or not the number of sectors of the ROM data Dr from the relative sector requested at present which is accumulated in the address designated by the ith record of the transfer-buffer-region storage table is equal to or greater than the number of sectors requested at present. This discrimination is carried out by determining whether or not the value of the index register k is equal to or greater than the number of sectors requested at present. If it is determined in step SN07 that the value of the index register k is equal to or greater than the number of sectors requested at present, then the processing proceeds to step SN08. In step SN08, the start logical address of the transfer buffer region TZ indicated by the ith record is stored in a register ADD. When the processing in step SN08 is ended, the transfer-storage-table retrieval subroutine (the transfer-storage-table retrieving means 232) is ended.

If on the other hand it is determined in step SN05 that the two addresses are not agreed with each other or if it is determined in step SN04 that the contents of the ith record are not effective, then the processing proceeds to step SN09 in which the index register i is updated by adding "1" to its value. The processing returns to step SN02 in which the next record of the transfer-buffer-region storage table is read out. Thereafter, the processings in steps succeeding step SN02 are repeated.

If on the other hand it is determined in step SN07 that the value of the index register k is smaller than the number of the sectors requested at present or if it is determined in step SN03 that the contents of the ith record of the transfer-buffer-region storage table is the EOF code, then the processing proceeds to step SN10. In step SN10, the error-signal outputting means 238 outputs an error signal to the I/F controller 25, thereby the processing being ended forcibly.

In the main routine shown in FIG. 39, if the processing of the transfer-storage-table retrieval subroutine (the transfer-storage-table retrieving means 233) in step SL04 is ended, then the processing of the system controller 29 proceeds to step SL05. IN step SL05, the parameter generating means 234 generates a transfer parameter. Specifically, a value obtained by adding the number of relative sectors requested at present to the start logical address of the transfer buffer region TZ stored in the register ADD (i.e., a logical address of the transfer buffer region TZ from which data is read out), the number of sectors requested at present, and the start logical address of the extended memory region EZ requested at present (a logical address of the extended memory region EZ in which the data is written) are stored in the parameter storage region allocated to the data RAM 63.

In step SL06, the request outputting means 237 outputs a transfer-request signal to the I/F controller 25, and the parameter generating means 234 outputs the transfer parameter stored in the parameter storage region to the I/F controller 25.

Based on the transfer-request signal input from the system controller 29, the I/F controller 25 successively reads the ROM data Dr from the transfer buffer region TZ from the data reading logical address designated by the transfer parameter to write the read-out ROM data Dr in the extended memory region EZ from the data writing logical address designated by the transfer parameter. When the ROM data Dr of requested sectors are written in the extended memory region EZ, the I/F controller 25 outputs a transfer-completion signal to the system controller 29. This operation will be described in detail later on.

In the processing routine shown in FIG. 39, after the request outputting means 237 outputs the transfer-request signal in step SL06, the system controller 29 waits for the transfer completion signal to be input from the I/F controller 25. When the transfer-completion signal is input from the I/F controller 25, the processing of the system controller 29 proceeds to step SL08. In step SL08, the extended-storage-table generating means 235 stores a table buffer in a record of the extended-memory-region storage table whose address corresponds to a value stored in the accumulation-point storage region. In step SL09, the value of the accumulation-point storage region is updated by adding "1" thereto.

In step SL10, the remaining-sector-number updating means 236 decreases the number of reserved sectors to thereby update it. Specifically, the remaining-sector-number updating means 236 stores in the reserved-sector-number storage region a value obtained by subtracting the number of sectors requested at present from the value stored in the reserved-sector-number storage region.

If on the other hand it is determined in step SL02 that the number of sectors requested at present is greater than the number of reserved sectors, then the processing proceeds to step SL11. In step SL11, the error-signal outputting means 238 outputs the error signal to the I/F controller 25.

When the processing in step SL10 or the processing in step SL11 is ended, the block-transfer processing subroutine (the block-transfer processing means 99) is ended. At the same time, the various-request processing subroutine (the various-request processing means 99) is ended.

In the block-transfer request subroutine (the block transfer requesting means 79) of the I/F controller 25 shown in FIG. 37, when in step SK01 the command outputting means 222 has finished outputting the command data to the system controller 29, the processing proceeds to the step SK02.

In step SK02, the identifying means 221 discriminates whether the request signal is input from the system controller 29. Specifically, the I/F controller 25 waits for the request signal to be input from the system controller 29. When the request signal is input from the system controller 29, the processing of the I/F controller 25 proceeds to step SK03. In step SK03, the parameter receiving means 223 receives the transfer parameter supplied through the input port 54 to store the received transfer parameter in the parameter storage region allocated to the data RAM 53. Thus, the start logical address of the transfer buffer region from which data is to be read out, the start logical address of the extended memory region in which data is to be accumulated, and the number of sectors are stored in the parameter storage region. At this time, the start logical address of the transfer buffer region from which data is to be read out is stored in the index register j, and the start logical address of the extended memory region from which data is to be read out is stored in the index register k.

In step SK04, the index register i and an index register p which is to be a record reading index of the transfer-buffer-region information table are initialized. Specifically, initial values "0" are stored in both of the index registers i and p.

In step SK05, the table reading means 225 reads a record of the number indicated by the index register p from the transfer-buffer-region information table. Specifically, the table reading means 225 reads a record of the pth record from the transfer-buffer-region information table. In step SK06, index register p is updated by adding "1" to its value.

In step SK07, the identifying means 221 discriminates whether or not the data-reading-start logical address requested at present (the value of the index register j) is an address between the start and end logical addresses stored in the pth record. If the data reading start logical address requested at present is not the address between the start and end logical addresses, then the processing returns to step SK05 in which the next record of the transfer-buffer-region information table is read out. Thereafter, the processings in steps succeeding step SK05 are repeated.

If it is determined in step SK07 that the data-reading-start logical address requested at present is the address between the start and end logical addresses, then the processing proceeds to step SK08. In step SK08, an address of the data to be read out from the transfer buffer region is calculated. Specifically, a value obtained by adding the value of the index register i and the valuer of the index register j is stored in the index register j.

In step SK09, the identifying means 221 discriminates whether or not the value of the index register j exceeds the end logical address stored in the pth record. If the value of the index register j exceeds the end logical address stored in the record address which is read-out, then the processing proceeds to step SK10. In step SK10, the pth record of the transfer-buffer-region information table is read out, and the start logical address stored in the pth record is stored in the index register j. In step SK11, the index register p is updated by adding "1" to its value.

In step SK12, the data reading means 224 reads out the ROM data (one sector) Dr accumulated in the logical address of the transfer buffer region TZ indicated by the index register j. In step SK13, the data writing means 226 writes the ROM data (one sector) Dr read out in step SK12 in the logical address of the extended memory region designated by the value of the index register k. In step SK14, the index registers i and k are updated by adding "1" to their values.

In step SK15, the identifying means 221 discriminates whether or not the value of the index register i is equal to or greater than the number of sectors stored in the parameter storage region.

If it is determined in step SK15 that the value of the index register i is smaller than the number of sectors, then the processing returns to step SK08 in which the logical address stored in the index register j is updated. Thereafter, the processings in steps succeeding step SK08 are repeated. If on the other hand the value of the index register i is equal to or greater than the number of sectors, then the processing proceeds to step SK16. In step SK16, the completion-signal outputting means 227 outputs the transfer-completion signal to the system controller 29. When the processing in step SK16 is ended, the block-transfer-request subroutine (the block-transfer requesting means 79) is ended. At the same time, the various-request processing subroutine (the various-request processing means 75) shown in FIG. 6 is ended.

A processing of the data transfer from the host computer to the extended memory region will be described below.

If an extended-memory-region writing command is input from the host computer 31 to the I/F controller 25, the processing of the I/F controller 29 proceeds from the various-request processing subroutine (the various-request processing means 75) to an extended-memory-region writing request subroutine (the extended-writing requesting means 80) in step S105 shown in FIG. 6.

Figure 42:
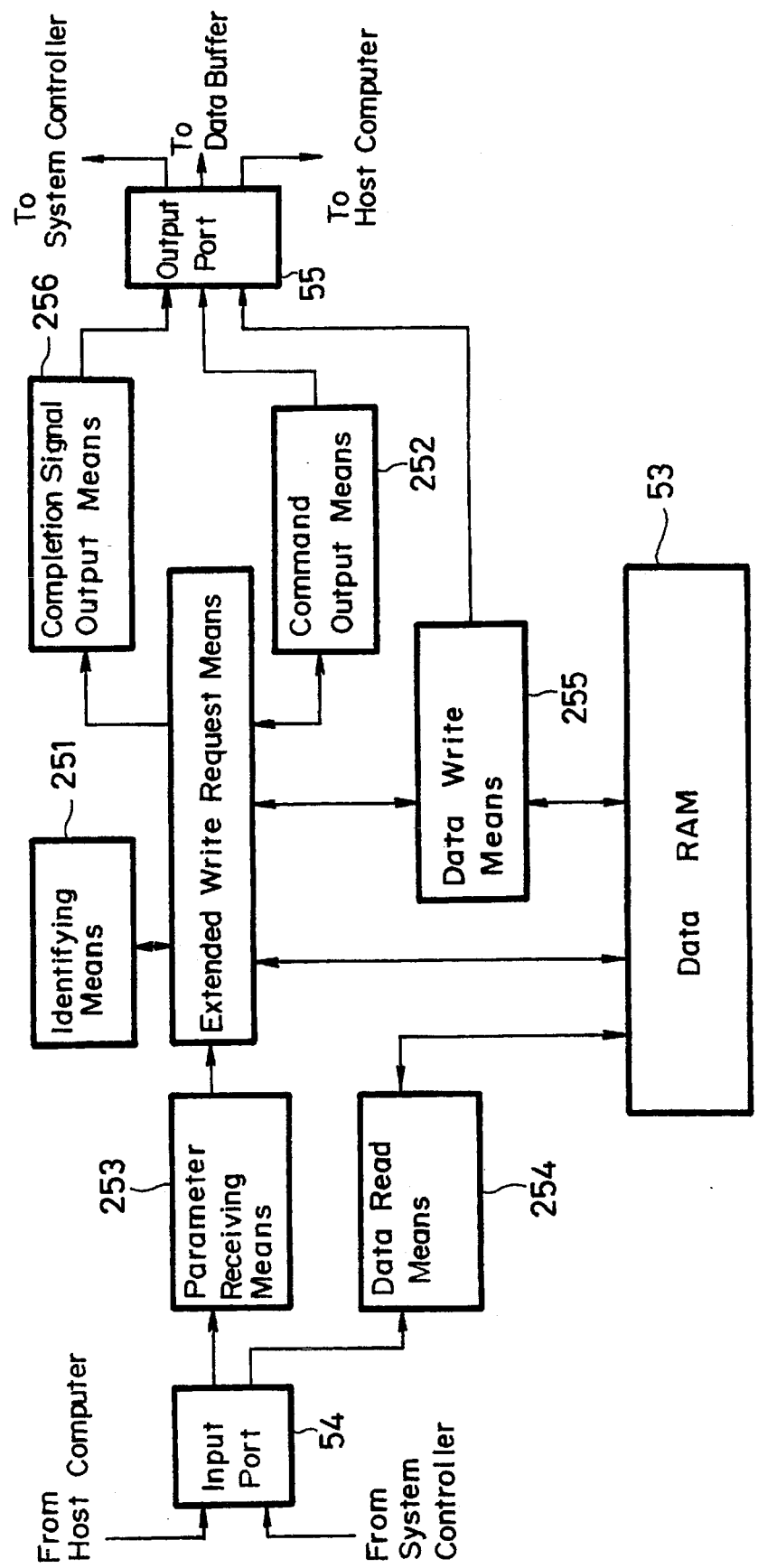
FIG. 42 is a functional block diagram showing an extended write request means in the I/F controller.

As shown in FIG. 42, the extended-memory-region writing requesting means 80 has an identifying means 251 for carrying out various discriminations, a command outputting means 252 for outputting commands to the system controller 29, a parameter receiving means 253 for receiving the transfer parameter transferred from the system controller 29, a data reading means 254 for reading data transferred from the host computer 31, a data writing means 255 for successively writing the data from the host computer 31 read by the data reading means 254 from the logical address indicated by the transfer parameter by a sector unit, and a completion-signal outputting means 256 for informing the system controller 29 of completion of the processing.

Figure 43:
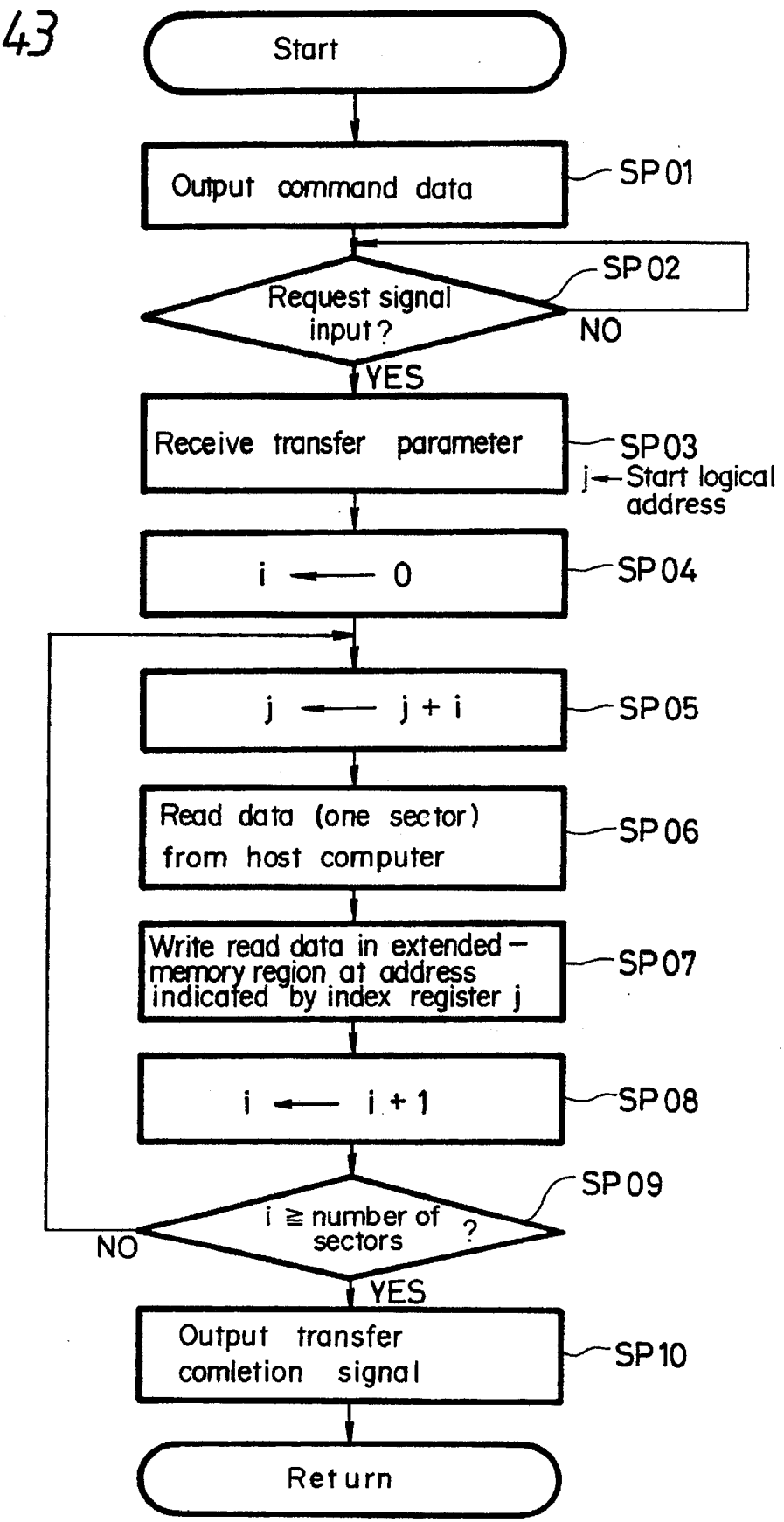
FIG. 43 is a flowchart to which reference will be made in explaining an operation of the extended write request means in the I/F controller.

In step SP01 shown in FIG. 43, the command outputting means 252 of the extended-memory-region writing requesting means 80 outputs the extended-memory-region writing command data stored in the command storage region to the system controller 29.

When the extended-memory-region writing command data is input from the I/F controller 25 to the system controller 29, the processing of the system controller 29 proceeds from the various-request processing subroutine (the various-request processing means 95) shown in FIG. 10 to the extended-memory-region writing processing subroutine (the extended-memory-region writing processing means 100) in step S305 shown in FIG. 10. The extended-memoryregion writing command data is consist of the start logical address of the extended memory region EZ in which the data from the host computer 31 is written and the number of sectors of the data to be written.

Figure 44:
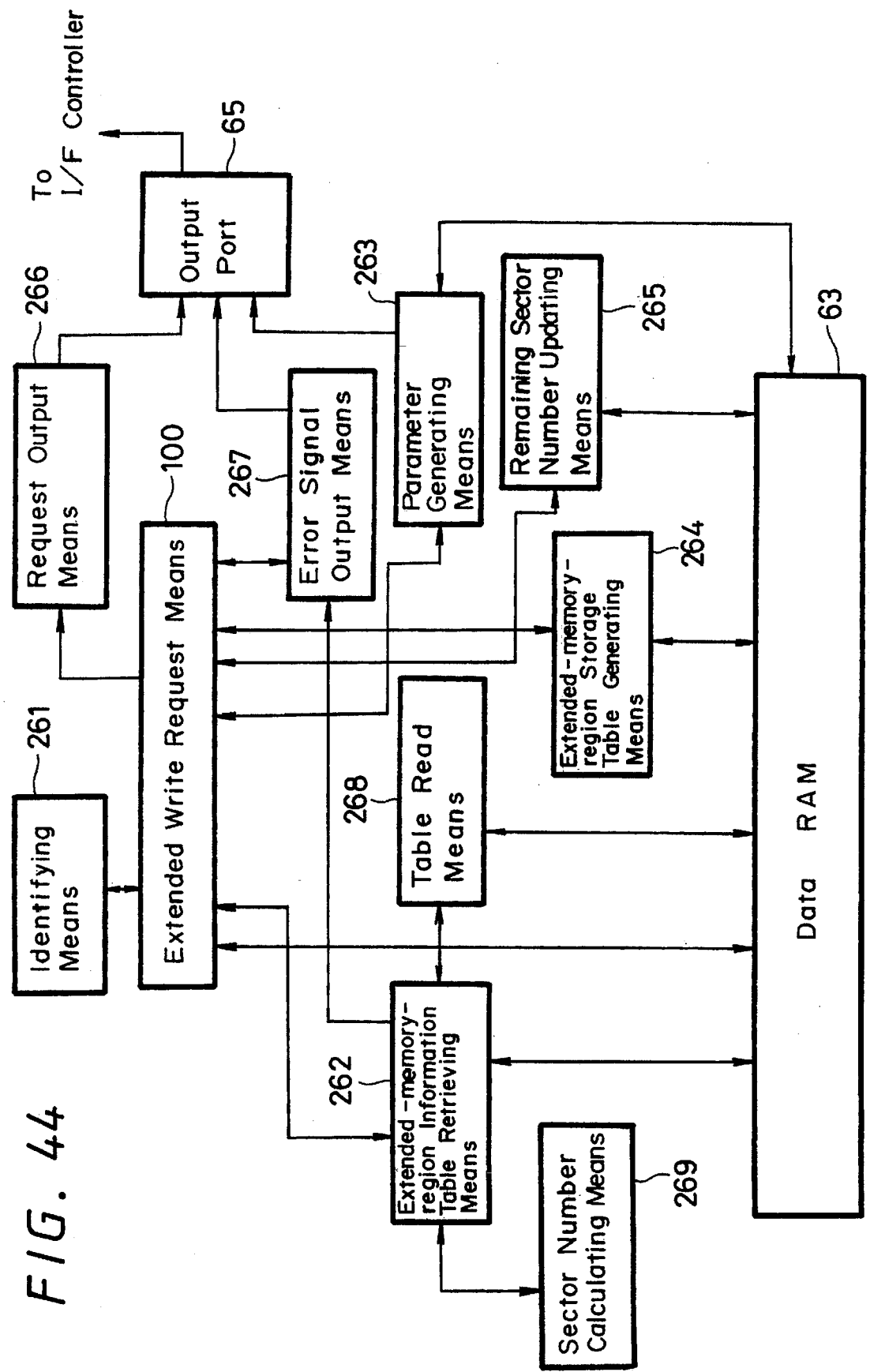
FIG. 44 is a functional block diagram showing an extended write processing means in the system controller.

As shown in FIG. 44, the extended-memory-region writing processing means 100 has an identifying means 261 for carrying out various discriminations, an extended-information-table retrieving means 262 for retrieving a designated record of the corresponding extended-memory-region information table based on the command data input at present, a parameter generating means 263 for generating a transfer parameter used to request the transfer of data to the extended memory region EZ, an extended-storage-table generating means 264 for generating an extended-memory-region storage table based on the command data input at present, a remaining-sector-number updating means 265 for updating by subtraction the number of reserved sectors which is decreased as the data is accumulated in the extended memory region EZ, a request outputting means 266 for outputting to the I/F controller 25 a signal used to command various requests, and an error-signal outputting means 267 for outputting an error signal to the I/F controller 25.

In addition to the various means, the extended-memory-region writing processing means 100 further has a table reading means 268 activated by the extended-information-table retrieving means 262 for reading the extended-memory-region information table stored in a predetermined region of the data RAM 63 by a record unit, and a sector-number calculating mans 269 for calculating the number of sectors, in which data can be stored, of the extended memory region in which the data is accumulated at present.

Figure 45:
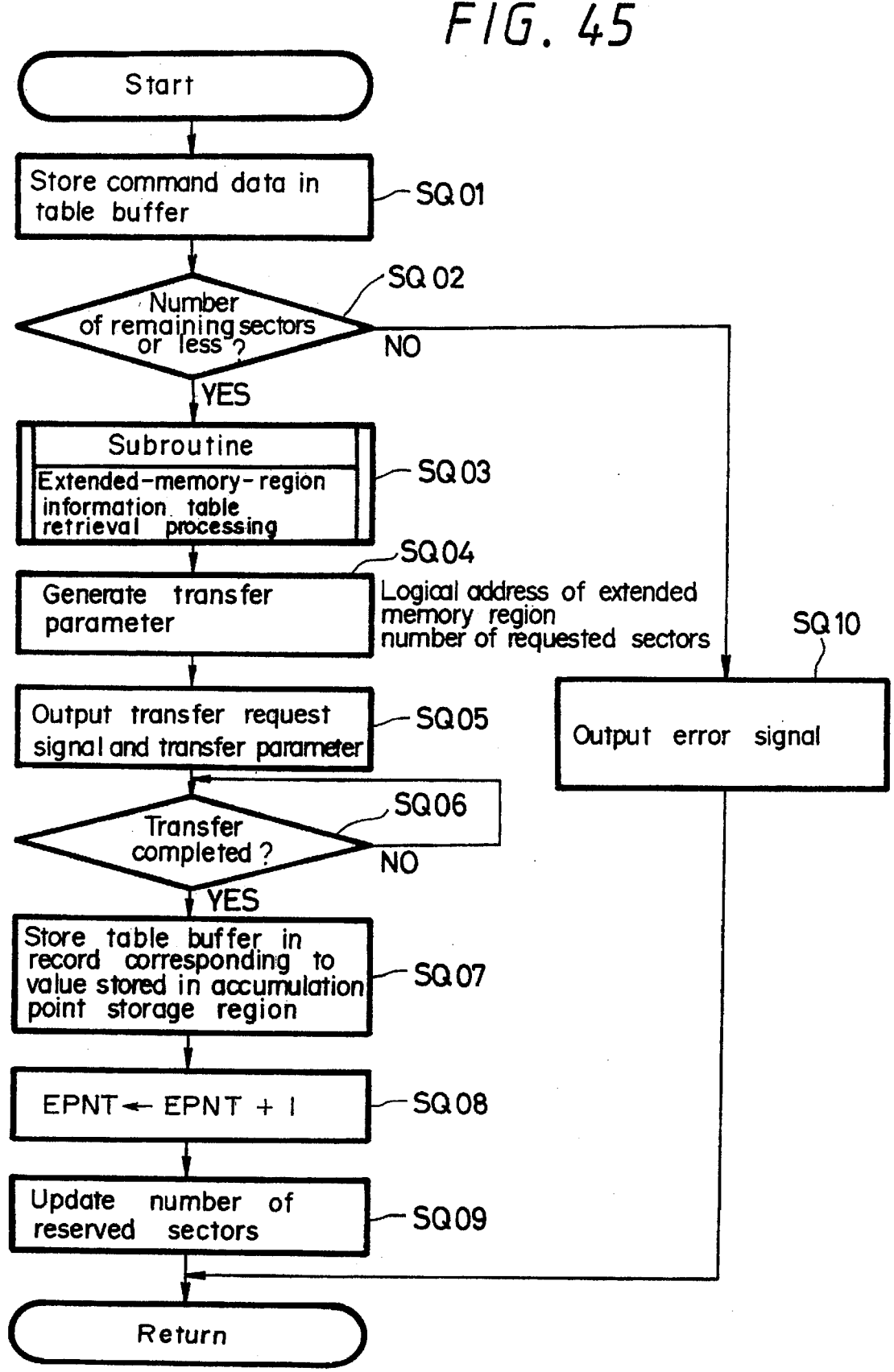
FIG. 45 is a flowchart to which reference will be made in explaining an operation of the extended write processing means in the system controller.

In step SQ01 shown in FIG. 45, the extended-memory-region writing processing means 100 stores the command data stored in the command storage region in the table buffer. The table buffer is arranged similarly to a record of the extended-memory-region storage table shown in FIG. 55A. In step SQ01, the command data (the start logical address of the extended memory region EZ and the number of sectors) are stored in the same order as that of the arrangement of the one record of the extended-memory-region storage table, and a code indicating that the command data is supplied from the host computer 31 is stored in a region of the table buffer where an address of the optical disk D is stored.

In step SQ02, the identifying means 261 discriminates whether or not the number of sectors requested at present is equal to or smaller than the number of reserved sectors of the extended memory region EZ. This discrimination is carried out by comparing the number of sectors requested at present and a value stored in the reserved-sector-number storage region allocated to the data RAM 63.

Figure 46:
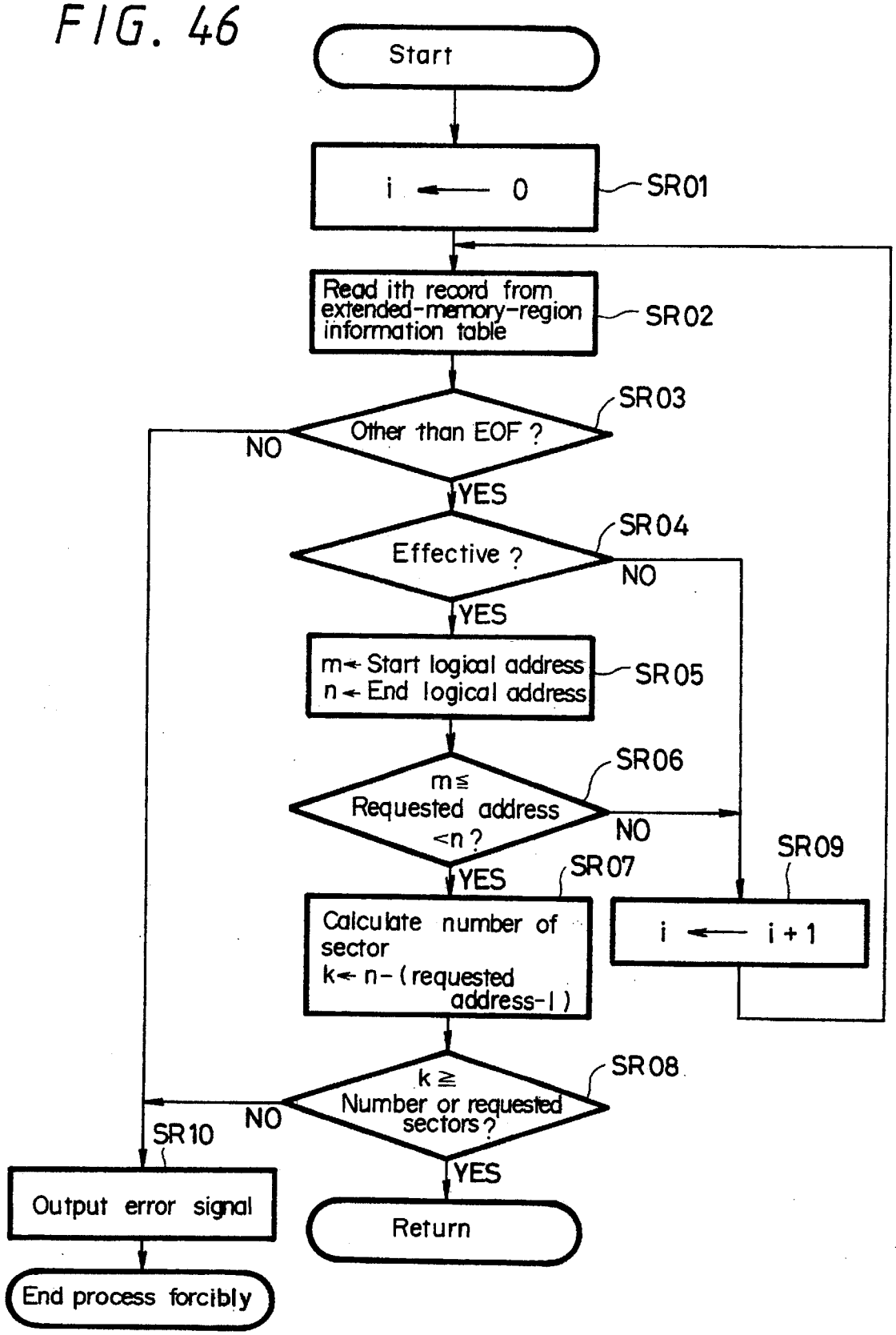
FIG. 46 is a flowchart to which reference will be made in explaining an operation of an extended information table retrieving means in the extended write processing means of the system controller.

If the number of sectors requested at present is equal to or smaller than the number of reserved sectors, then the processing proceeds to step SQ03. In step SQ03, the processing of the system controller 29 proceeds to an extended-information-table retrieval subroutine (the extended-information-table retrieving means 262). A processing in the subroutine is carried out as shown in FIG. 46. In step SR01, the index register i which is to be a record reading index of the extended-memory-region information table is initialized. Specifically, an initial value "0" is stored in the index register i.

In step SR02, the table reading means 268 reads a record of the number indicated by the index register i from the extended-memory-region information table. Specifically, the table reading means 268 reads the ith record from the extended-memory-region information table.

In step SR03, the identifying means 261 discriminates whether or not contents of the ith record are other than the EOF code. If the contents are other than the EOF code, then the processing proceeds to step SR04. In step SR04, the identifying means 261 discriminates whether or not the contents of the ith record are effective. This discrimination is carried out by discriminating whether a first bit of the ith record has a value of "1" or "0". If it is determined in step SR04 that the contents are effective, then the processing proceeds to step SR05. In step SR05, the start and end logical addresses are read out from the ith record.

In step SR06, the identifying means 261 discriminates whether or not the start logical address requested at present is an address between the start and end logical address stored in the above ith record.

If the start logical address is the address between the start and end logical address, then the processing proceeds to step SR07. In step SR07, the sector-number calculating means 269 calculates the number of sectors of the extended memory region EZ concerning the ith record from the start logical address requested at present. Specifically, the sector number calculating means 269 subtracts from the end logical address stored in the ith record a value obtained by subtracting "1" from the start logical address requested at present. The number of sectors is stored in the index register k.

In step SR08, the identifying means 261 discriminates whether or not the number of sectors of the extended memory region EZ from the start logical address which is requested at present and stored in the ith record is equal to or greater than the number of sectors requested at present. This discrimination is carried out by discriminating whether or not the value of the index register k is equal to or greater than the number of sectors requested at present. If the value of the index register k is equal to or greater than the number of sectors requested at present, then the extended-information-table retrieval subroutine (the extended-information-table retrieving means 262) is ended.

If on the other hand it is determined in step SR08 that the value of the index register k is smaller than the number of sectors requested at present or if it is determined in step SR03 that the contents of the ith record of the extended-memory-region information table are the EOF code, then the processing proceeds to step SR10. In step SR10, the error-signal outputting means 267 outputs an error signal to the I/F controller 25, thereby the processing being ended forcibly.

In the main routine shown in FIG. 45, if the extended-information table retrieval subroutine (the extended-information-table retrieving means 262) in step SQ03 is ended, the processing of the system controller 29 proceeds to step SQ04. In step SQ04, the parameter generating meas 263 generates the transfer parameter. Specifically, the parameter generating means 263 stores the start logical address of the extended memory region EZ requested at present and stored in the table buffer and the number of sectors requested at present in the parameter storage region allocated to the data RAM 63.

In step SQ05, the request outputting means 266 outputs the transfer-request signal to the I/F controller 25 and the parameter generating means 263 outputs the transfer parameter stored in the parameter storage region to the I/F controller 25.

Based on the transfer-request signal input from the system controller 29, the I/F controller 25 successively writes the data transferred thereto from the host computer 31 in the extended memory region EZ from the start logical address stored in the transfer parameter. When the data of the requested number of sectors is written in the extended memory region, the I/F controller 25 outputs the transfer-completion signal to the system controller 29. This operation will be described in detail later on.

In the main routine shown in FIG. 45, after the transfer-request signal is output in step SQ05, the processing of the system controller 29 proceeds to step SQ06. In step SQ06, the system controller 29 waits for the transfer-completion signal to be input thereto from the I/F controller 25. When the transfer completion signal is input from the I/F controller 25, the processing proceeds to step SQ07. In step SQ07, the extended-memory-region storage table generating means 264 stores the table buffer in the extended-memory-region storage table of the record of the number corresponding to the value stored in the accumulation-point storage region. In step SQ08, the value of the accumulation-point storage region is updated by adding "1" thereto.

In step SQ09, the remaining-sector-number updating means 265 reduces the number of reserved sectors to thereby update it. Specifically, the remaining-sector-number updating means 265 stores in the reserved-sector-number storage region a value obtained by subtracting the number of sectors requested at present from the value stored in the reserved-sector-number storage region.

If on the other hand, it is determined in step SQ02 that the number of sectors requested at present exceeds the number of reserved sectors, then the processing proceeds to step SQ10. In step SQ10, the error-signal outputting means 267 outputs an error signal to the I/F controller 25.

When the processing in step SQ09 or the processing in step SQ10 is ended, the extended-memory-region writing processing subroutine (the extended-memory-region writing processing means 100) is ended. At the same time, the various-request processing subroutine (the various-request processing means 95) shown in FIG. 10 is ended.

In the extended-memory-region writing request subroutine (the extended-memory-region writing requesting means 80) shown in FIG. 43, after the command outputting means 252 has output the command data to the system controller 29 in step SP01, the processing of the I/F controller 25 proceeds to step SP02.

In step SP02, the identifying means 251 discriminates whether or not the request signal is input from the system controller 29 to the I/F controller 25. Specifically, the I/F controller waits for the request signal to be input thereto from the system controller 29. When the request signal is input from the system controller 29, the processing proceeds to step SP03. In step SP03, the parameter receiving means 253 receives the transfer parameter supplied from the system controller 29 through the input port 54 to store the received transfer parameter in the parameter storage region allocated to the data RAM 53. Thus, the start logical address and the number of sectors of the extended memory region in which the data from the host computer 31 is to be accumulated are stored in the parameter storage region. At this time, the start logical address of the extended memory region in which the data is to be accumulated is stored in the index register j.

In step SP04, the index register i is initialized. Specifically, an initial value "0" is stored in the index register i. In step SP05, the address of the extended memory region EZ in which the data is accumulated is calculated. Specifically, a value obtained by adding the values of the index registers i and j is stored in the index register j. In step SP06, the data reading means 254 reads the data (one sector) supplied from the host computer 31 through the input port 54.

In step SP07, the data writing means 255 writes the data (one sector) supplied from the host computer 31 and read in step SP06 in the extended memory region EZ of the logical address indicated by the index register j. In step SP08, the index register i is updated by adding 1 to their values.

In step SP09, the identifying means 251 discriminates whether or not the value of the index register i is equal to or greater than the number of sectors stored in the parameter storage region.

If the value of index register i is smaller than the number of sectors, then the processing returns to step SP05 in which the logical address stored in the index register j is updated. Thereafter, the processings in steps succeeding step SP05 are repeated. If on the other hand it is determined in step SP09 the value of the index register i is equal to or greater than the number of sectors, then the processing proceeds to step SP10. In step SP10, the completion-signal outputting means 256 outputs the transfer-completion signal to the system controller 29. When the processing in step SP10 is ended, the extended-memory-region writing request subroutine (the extended-memory-region writing requesting means 80) is ended. At the same time, the various-request processing subroutine (the various-request processing means 75) shown in FIG. 6 is ended.

A processing of the data transfer from the extended memory region to the host computer will be described below.

When the extended-memory-region transfer command is input from the host computer 31 to the I/F controller 25, then the processing of the I/F controller 25 proceeds from the various-request processing subroutine (the various-request processing means 75) to the extended-memory-region transfer request subroutine (the extended-memory-region transfer requesting means 81) in step S106 shown in FIG. 6.

Figure 47:
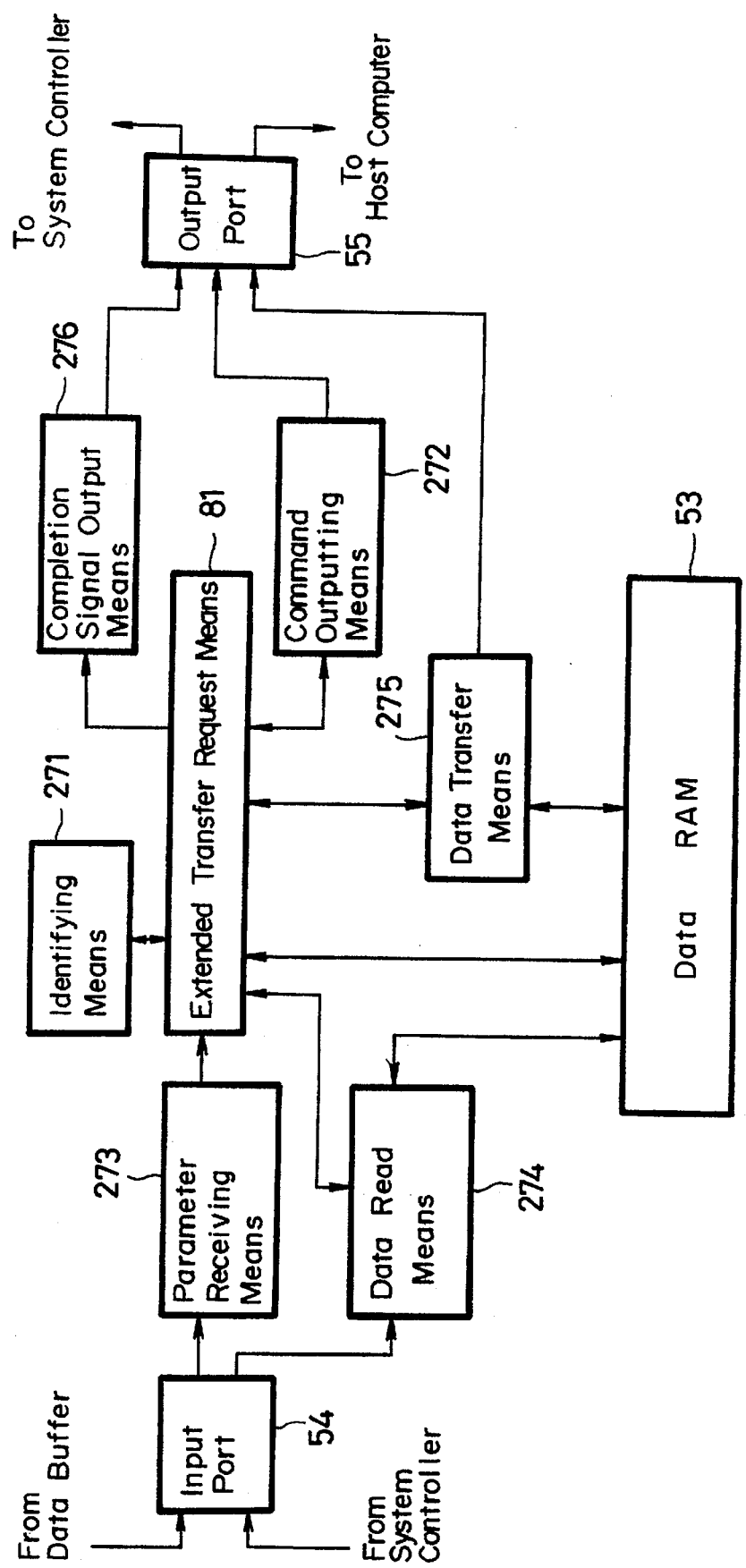
FIG. 47 is a functional block diagram showing an extended transfer request means in the I/F controller.

As shown in FIG. 47, the extended-memory-region transfer requesting means 81 has an identifying means 271 for carrying out various discriminations, a command outputting means 272 for outputting a command to the system controller 29, a parameter receiving means 273 for receiving a transfer parameter transferred from the system controller 29, a data reading means 274 for reading data accumulated in the extended memory region EZ of the logical address indicated by the transfer parameter, a data transfer means 275 for transferring the data read out by the data reading means 274 to the host computer 31, and a completion-signal outputting means 276 for informing the system controller 29 of completion of the processing.

Figure 48:
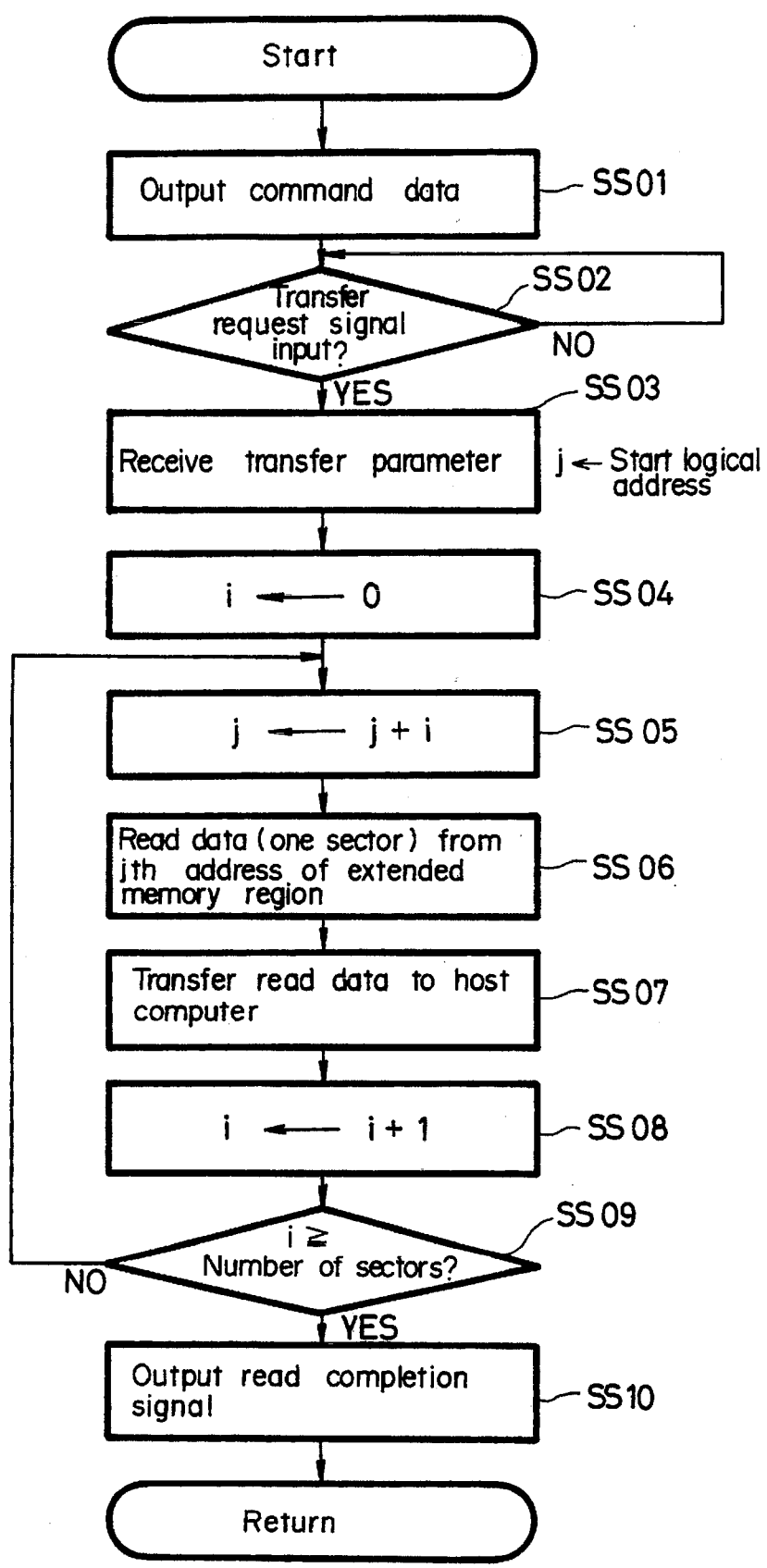
FIG. 48 is a flowchart to which reference will be made in explaining an operation of the extended transfer request means in the I/F controller.

In step SS01 shown in FIG. 48, the command outputting means 272 of the extended-memory-region transfer requesting means 81 outputs extended-memory-region transfer command data stored in the command storage region to the system controller 29.

When the extended-memory-region transfer command data is input from the I/F controller 25 to the system controller 29, the processing of the system controller 29 proceeds from the various-request processing subroutine (the various-request processing means 95) shown in FIG. 10 to the extended-memory-region transfer processing subroutine (the extended-memory-region transfer processing means 101) in step S306 shown in FIG. 10. The extended-memory-region transfer command data is consist of the start logical address and the number of sectors of the extended memory region EZ from which the data is to be read out.

Figure 49:
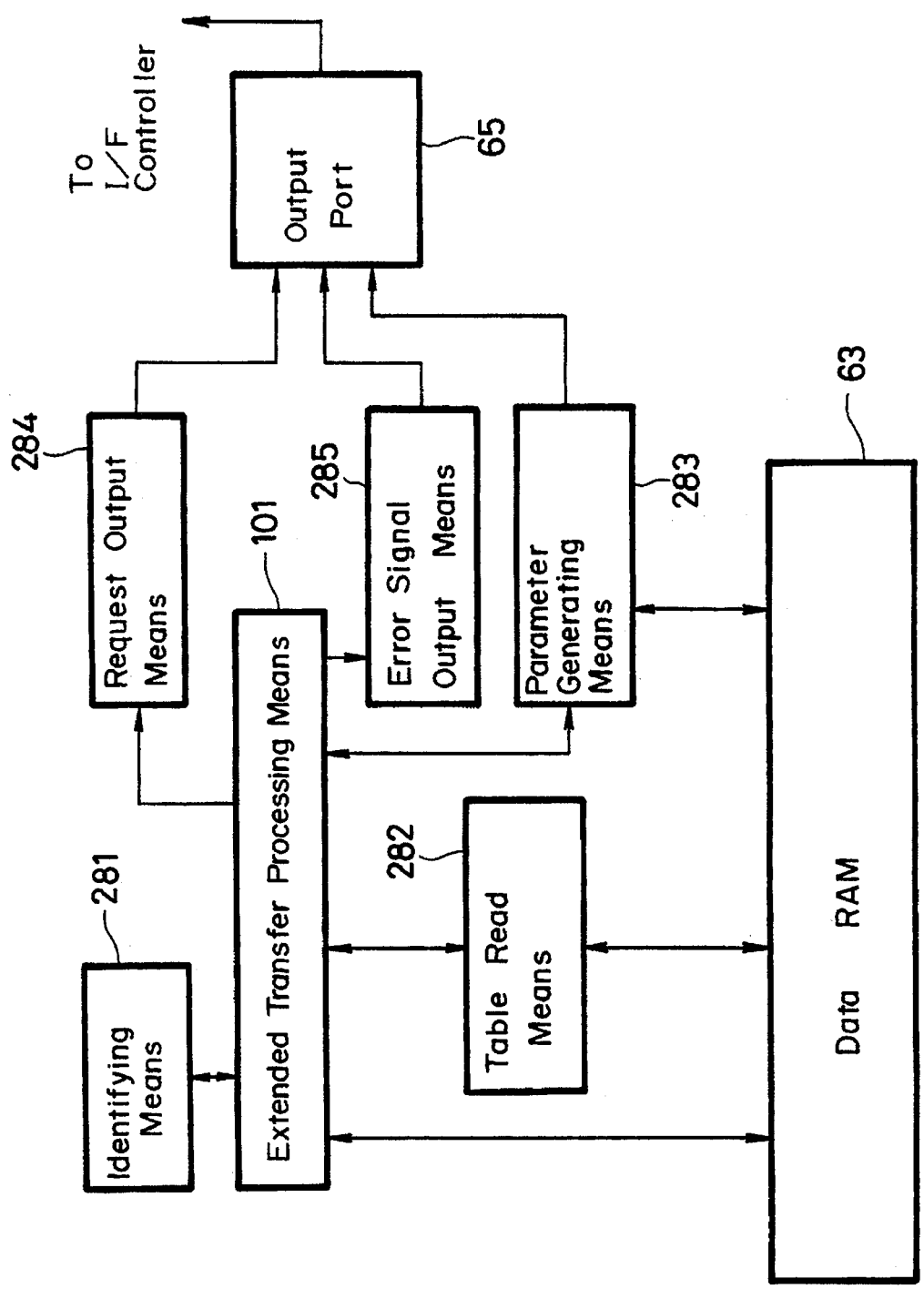
FIG. 49 is a functional block diagram showing an extended transfer processing means in the system controller.

As shown in FIG. 49, the extended-memory-region transfer processing means 101 has an identifying means 281 for carrying out various discriminations, a table reading means 282 for reading an extended-memory-region information table stored in a predetermined region of the data RAM 63 by a record unit, a parameter generating means 283 for generating the transfer parameter used to request data transfer to transfer it to the I/F controller 25, a request outputting means 284 for outputting a signal used to command various requests to the I/F controller 25, and an error-signal outputting means 285 for outputting an error signal to the I/F controller 25.

Figure 50:
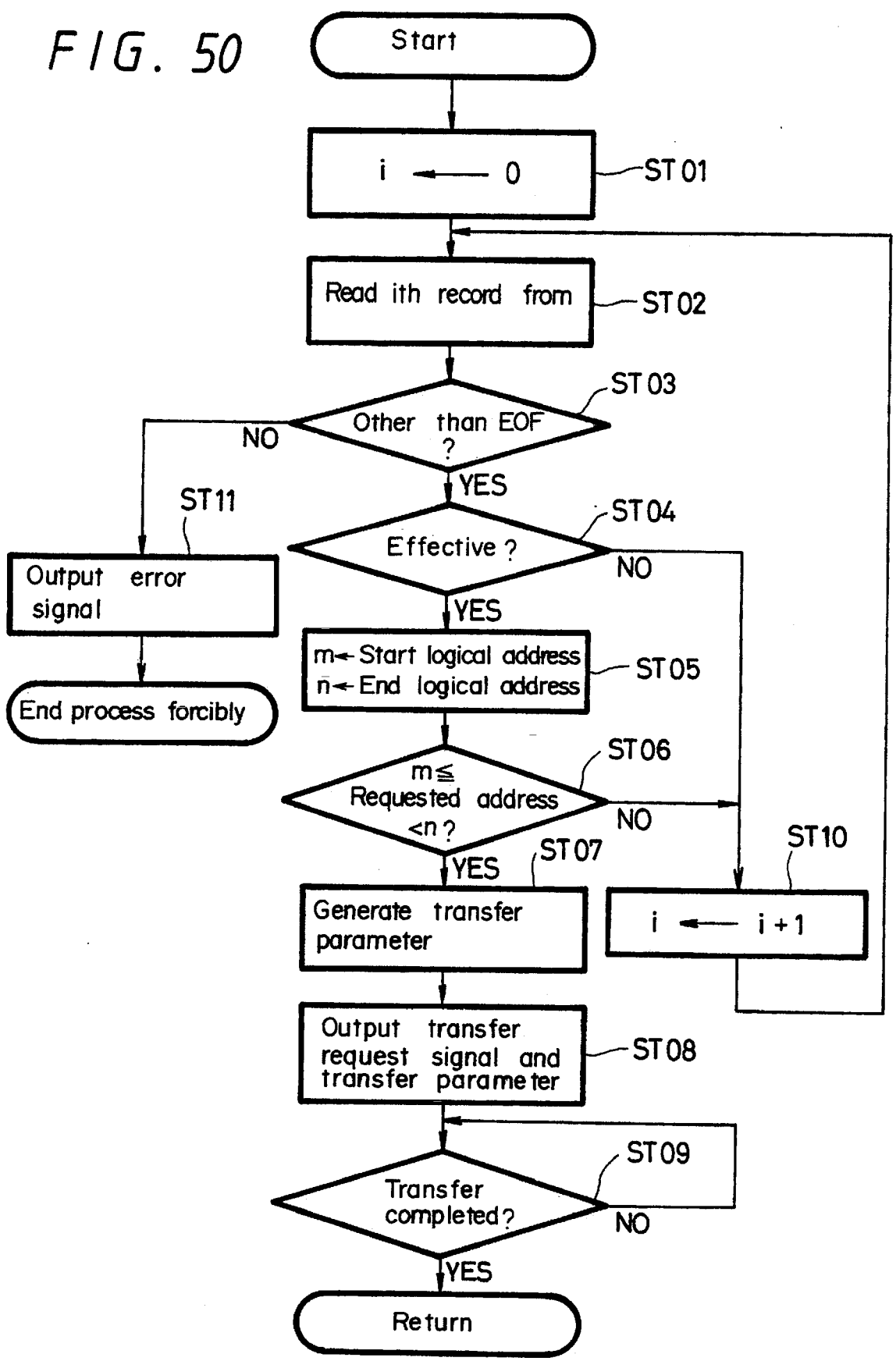
FIG. 50 is a flowchart to which reference will be made in explaining an operation of the extended transfer processing means in the system controller.

In step ST01 shown in FIG. 50, the extended-memory-region transfer processing means 101 initializes the index register i which is to be a record reading index of the extended-memory-region information table. Specifically, an initial value "0" is stored in the index register i.

In step ST02, the table reading means 282 reads a record of the number indicated by the index register i from the extended-memory-region information table. Specifically, the table reading means 282 the ith record from the extended-memory-region information table.

In step ST03, the identifying means 281 discriminates whether or not contents of the ith record are other than the EOF code. If the contents are other than the EOF code, then the processing proceeds to step ST04. In step ST04, the identifying means 281 discriminates whether or not the contents of the ith record are effective. This discriminations is carried out by discriminating whether a first bit of the ith record has a value of "1" or "0". If it is determined in step ST04 that the contents are effective, then the processing proceeds to step ST05. In step ST05, the start land end logical addresses are rad out from the ith record.

In step ST06, the identifying means 281 discriminates whether or not the start logical address requested at present is an address between the start and end logical addresses stored in the ith record.

If the start logical address requested at present is an address between the start and end logical addresses, then the processing proceeds to step ST07. In step ST07, the parameter generating means 283 generates the transfer parameter. Specifically, the parameter generating means 283 stores the start logical address of the extended memory region requested at present and stored in the command storage region and the number of sectors requested at present in the parameter storage region.

In step ST08, the request outputting means 284 outputs the transfer-request signal to the I/F controller 25, and the parameter generating means 283 outputs the transfer parameter stored in the parameter storage region to the I/F controller 25.

Based on the transfer-request signal input from the system controller 29, the I/F controller 25 successively reads out the data from the extended memory region from the start logical address stored in the transfer parameter to transfer the read-out data to the host computer 31 side. When the data of requested sectors are transferred to the host computer 31 side, the I/F controller 25 outputs the transfer-completion signal to the system controller 29. This operation will be described in detail later on.

In the processing routine shown in FIG. 50, after the request outputting means 284 outputs the transfer-request signal in step ST08, the processing proceeds to step ST09. In step ST09, the system controller 29 waits for the transfer-completion signal to be input thereto from the I/F controller 25. When the transfer-completion signal is input from the I/F controller 25 to the system controller 29, the extended-memory-region transfer processing subroutine (the extended-memory-region transfer processing means 101) is ended, and at the same time, the various-request processing subroutine (the various-request processing means 95) shown in FIG. 10 is ended.

If on the other hand it is determined in step ST06 that the start logical address requested at present is not an address between the start and end logical addresses stored in the ith record or if it is determined in step ST04 that the contents of the ith record are not effective, then the processing proceeds to step ST10 in which the index register i is updated by adding "1" to its value. The processing returns from step ST10 to step ST02 in which the next record of the extended-memory-region information table is read out. Thereafter, the processings in steps succeeding step ST02 are repeated.

If on the other hand it is determined in step ST03 that the contents of the ith record of the extended-memory-region information table are the EOF code, then the processing proceeds to step ST11. In step ST11, the error-signal outputting means 285 outputs an error signal to the I/F controller 245.

In the extended-memory-region transfer request subroutine (the extended-memory-region transfer requesting means 81) shown in FIG. 48 of the processing of the I/F controller 25, after the command outputting means 272 has output the command data to the system controller 29 in step SS01, the processing of the I/F controller 25 proceeds to step SS02.

In step SS02, the identifying means 271 discriminates whether or not the transfer-request signal is input from the system controller 29 to the I/F controller 25. Specifically, the IF controller 25 waits for the transfer-request signal to be input thereto from the system controller 29. When the transfer-request signal is input from the system controller 29, the processing proceeds to step SS03. In step SS03, the parameter receiving means 273 receives the transfer parameter supplied through the input port 54 to store it in the parameter storage region allocated to the data RAM 53. Thus, the start logical address and the number of sectors of the extended memory region EZ in which the data to be transferred to the host computer 31 are accumulated are stored in the parameter storage region. At this time, the start logical address of the extended memory region is stored in the index register j.

In step SS04, the index register i is initialized. Specifically, an initial value "0" is stored in the index register i. In step SS05, an address of the extended memory region from which the data is to,be read out is calculated. Specifically, a value obtained by adding the values of the index registers i and j is stored in the index register j. In step SS06, the data reading means 274 reads out the data (one sector) accumulated in the logical address, that is indicated by the index register j, of the extended memory region EZ.

In step SS07, the data transfer means 275 transfers the data of one sector read out in step SS06 to the host computer 31. In step SS08, the index register i is updated by adding "1" to its value. In step SS09, the identifying means 271 discriminates whether or not the value of the index register i is equal to or greater than the number of sectors stored in the parameter storage region.

If the value of the index register i is smaller than the number of sectors, the processing returns to step SS05 in which the logical address stored in the index register j is updated. Thereafter, the processings in steps succeeding step SS05 are repeated. If on the other hand it is determined in step SS09 that the value of the index register i is equal to or greater than the number of the sectors, then the processing proceeds to step SS10. In step SS10, the completion-signal outputting means 276 outputs the transfer-completion signal to the system controller 29. When the processing in step SS10 is ended, the extended-memory-region transfer request subroutine (the extended-memory-region transfer requesting means 81) is ended, and at the same time, the various-request processing subroutine (the various-request processing means 75) shown in FIG. 6 is ended.

A processing of canceling the reservation of the extended memory region will be described below.

When a reservation cancel command is input from the host computer 31 to the I/F controller 25, the command outputting means 82 shown in FIG. 4 of the I/F controller 25 outputs a reservation cancel command stored in the command storage region to the system controller 29 in step S107 of the various-request processing subroutine (the various-request processing means 75) shown in FIG. 6. When the processing in step S107 is ended, the various-request processing subroutine (the various-request processing means 75) is ended.

When the reservation cancel command is input from the I/F controller 25 to the system controller 29, the processing of the system controller 29 proceeds from the various-request processing subroutine (the various-request processing means 95) shown in FIG. 10 to the reservation cancel processing subroutine (the reservation cancel processing means 102) in step S307 shown in FIG. 10. The reservation cancel command data is consist of the head logical address of the extended memory region EZ reserved at present.

Figure 51:
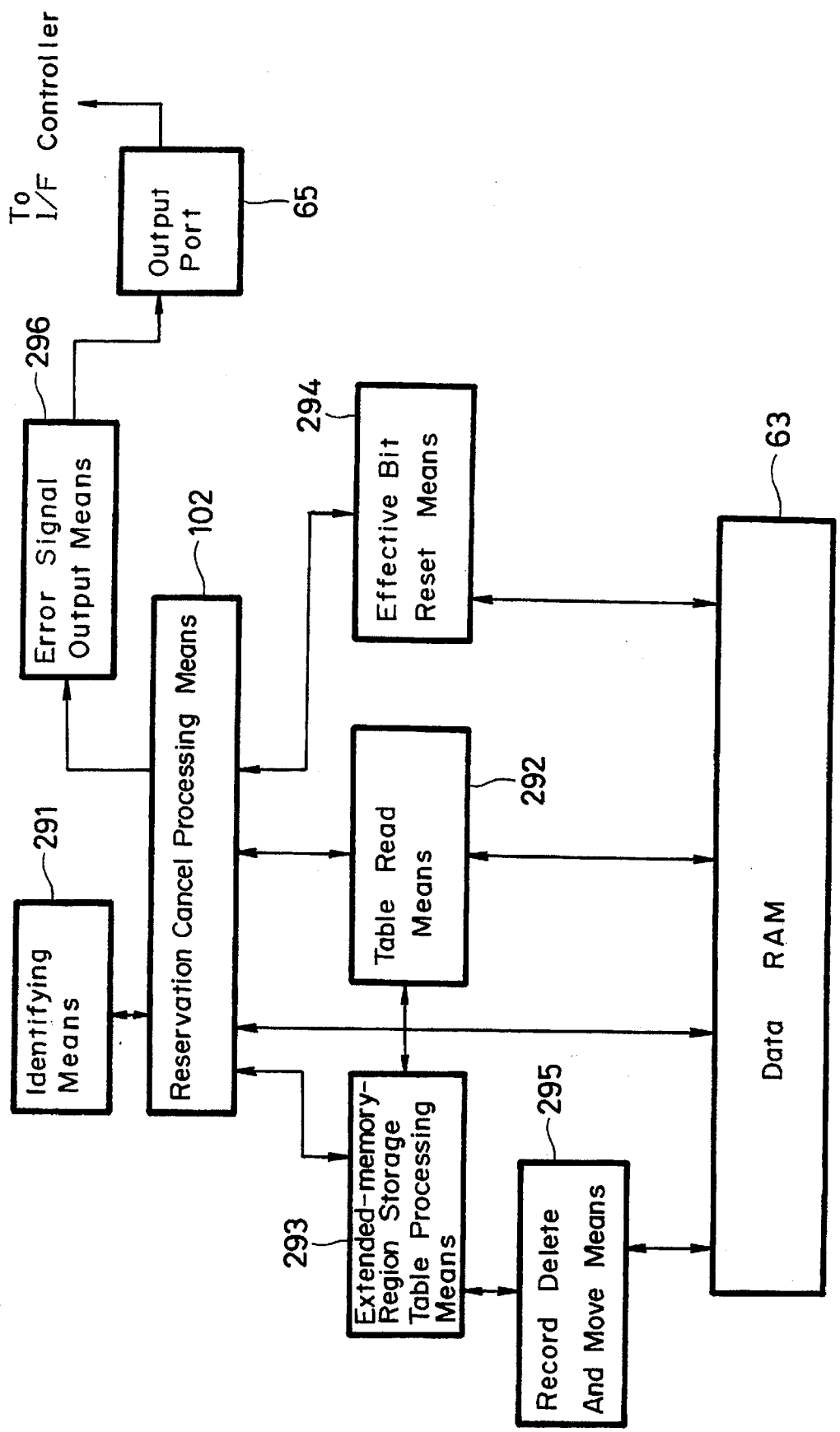
FIG. 51 is a functional block diagram showing a reserve cancel processing means in the system controller.

As shown in FIG. 51, the reservation cancel processing means 102 has an identifying means 291 for carrying out various discriminations, a table reading means 292 for reading the extended-memory-region information table or the extended-memory-region storage table stored in a predetermined region of the data RAM 63 by a record unit, an extended-memory-region storage table processing means 293 for deleting a record of the extended memory region EZ, whose reserved state is to be canceled, from the extended-memory-region storage table, an effective-bit resetting means 294 for resetting an effective bit of the designated record of the extended-memory-region information table, and an error-signal outputting means 296 for outputting an error signal to the I/F controller 25.

In addition to the above means, the reservation cancel processing means 102 has a record deleting and moving means 295 activated by the extended-memory-region storage table processing means 293 for deleting a designated record of the extended-memory-region storage table to move the rest of records.

Figure 52:
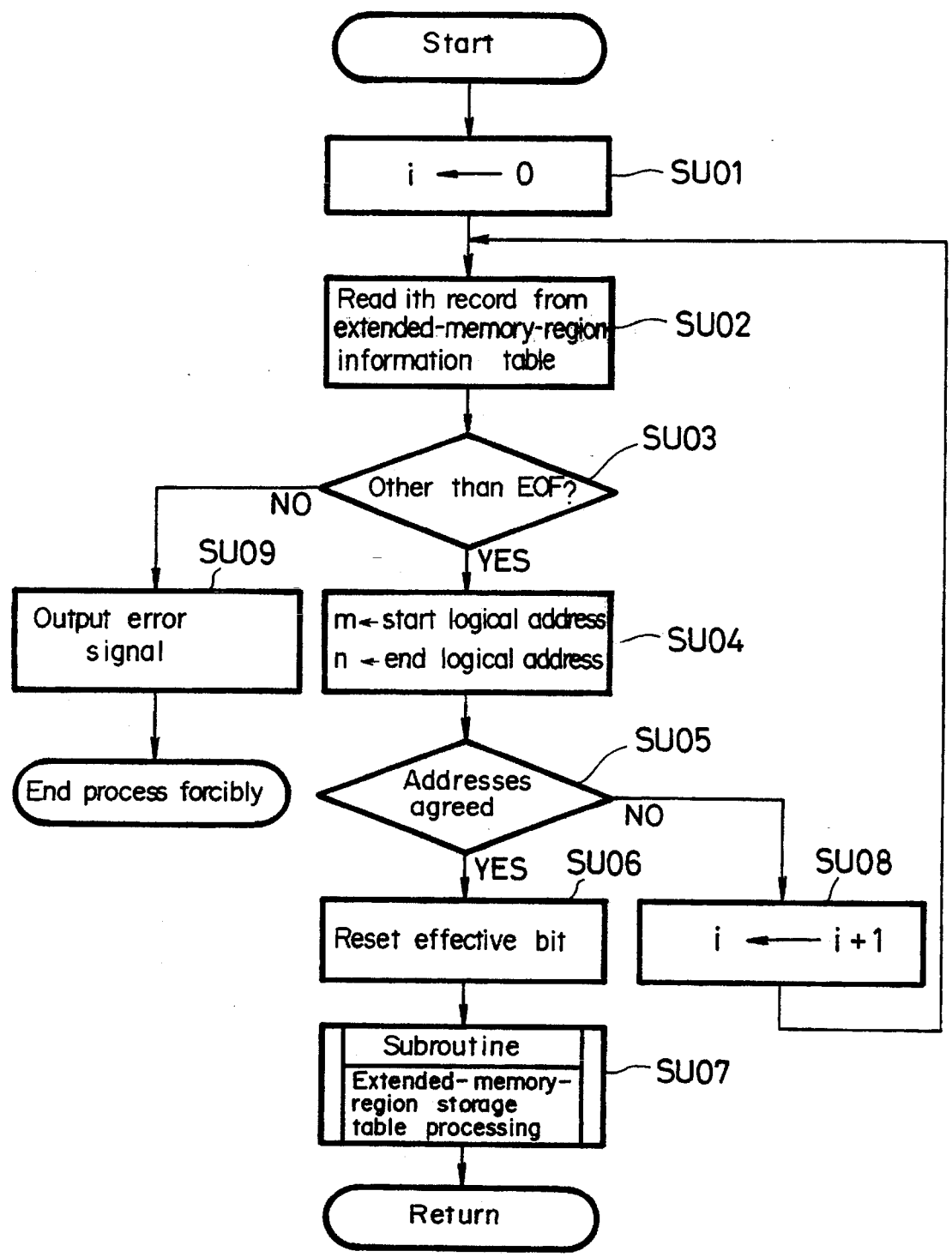
FIG. 52 is a flowchart to which reference will be made in explaining an operation of the reserve cancel processing means in the system controller.

In step SU01 shown in FIG. 52, the reservation cancel processing means 102 initializes the index register i which is to be a record reading index of the extended-memory-region information table. Specifically, an initial value "0" is stored in the index register i.

In step SU02, the table reading means 292 reads a record of the number indicated by the index register i from the extended-memory-region information table. Specifically, the table reading means 292 reads out the ith record from the extended-memory-region information table. In step SU03, the identifying means 291 discriminates whether or not contents of the ith record are other than the EOF code. If it is determined that the contents are other than the EOF code, then the processing proceeds to step SU04. In step SU04, the start and end logical addresses are read out from the ith record.

In step SU05, the identifying means 291 discriminates whether or not the logical address requested at present and stored in the command storage region is agreed with the start logical address of the ith record. If both of the logical addresses are agreed with each other, then the processing proceeds to step SU06. In step SU06, the effective-bit resetting means 294 resets the effective bit of the designated ith record to thereby make the ith record ineffective.

Figure 53:
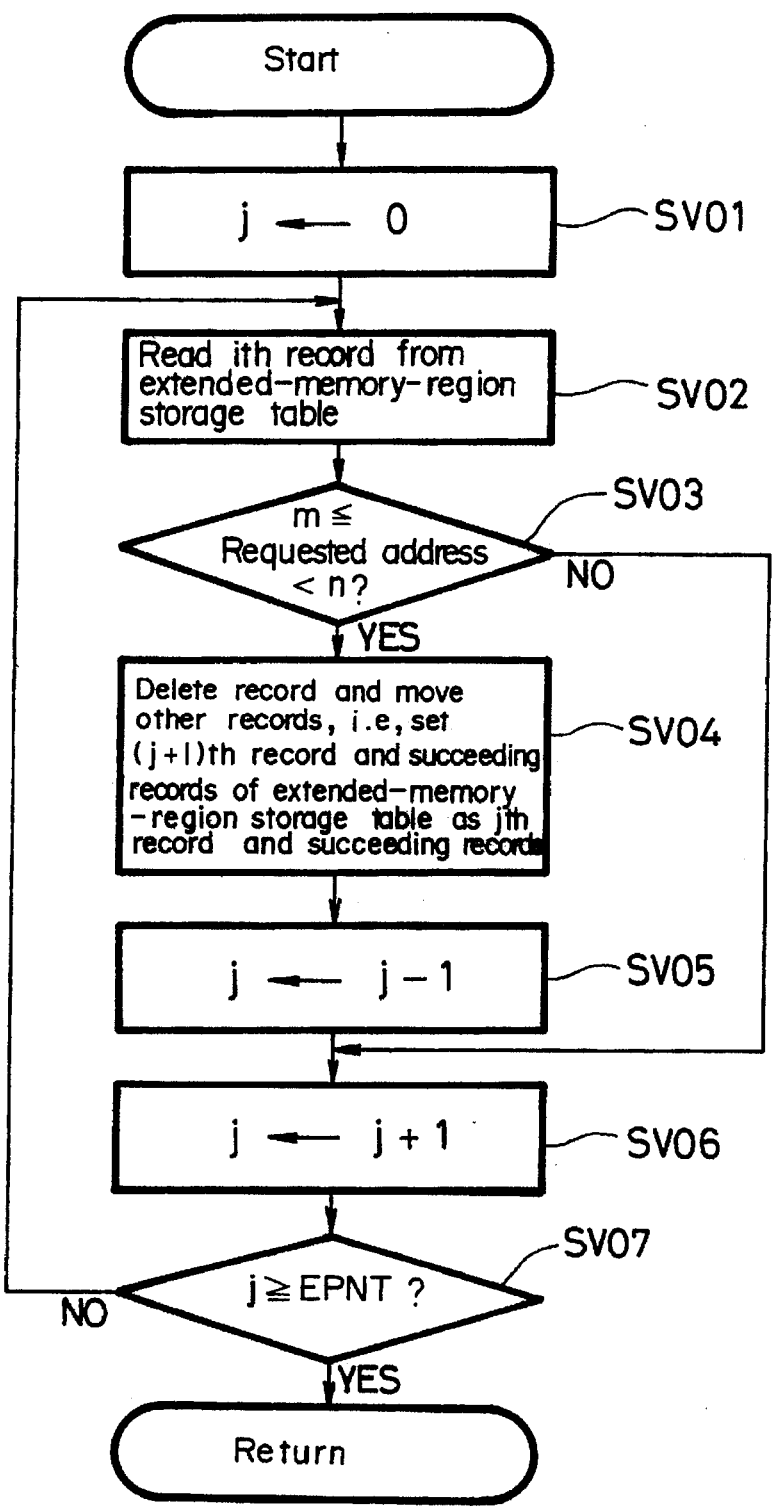
FIG. 53 is a flowchart to which reference will be made in explaining an operation of an extended storage table processing means in the reserve cancel processing means of the system controller.

In step SU07, the processing of the system controller 29 proceeds to the extended-memory-region storage table processing subroutine (the extended-memory-region storage table processing means 293). A processing of this subroutine is carried out as shown in FIG. 53. In step SV01, the index register j which is to be a record reading index of the extended-memory-region storage table is initialized. Specifically, an initial value "0" is stored in the index register j.

In step SV02, the table reading means 292 reads out a record of the number indicated by the index register j from the extended-memory-region storage table. Specifically, the table reading means 292 reads out the ith record from the extended-memory-region storage table.

In step SV03, the identifying means 291 discriminates whether or not the logic address requested at present is an address between the start and end logical addresses stored in the ith record. If the logical address requested at present is the address between the two logical addresses, then the processing proceeds to step SV04. In step SV04, the record deleting and moving means 295 deletes the jth record of the extended-memory-region storage table and further moves the (j+1)th record and the succeeding records to set them as the jth record and the succeeding records, respectively.

In step SV05, the value of the index register j is corrected in accordance with results of the above deleting and moving processing in step SV04. After the processing in step SV05 is ended or if it is determined in step SV03 that the logical address requested at present is not the address between the start and end logical addresses stored in the ith record, then the processing proceeds to step SV06. In step SV06, the index register j is updated by adding "1" to its value.

In step SV07, the identifying means 291 discriminates whether or not the processing in this subroutine is effected in all the records of the extended-memory-region storage table. This discrimination is carried out by discriminating whether or not the value of the index register j is equal to or greater than the value stored in the accumulation-point storage region. If the value of the index register j is smaller than the value stored in the accumulation-point storage region, then the processing returns to step SV02 in which the next record of the extended-memory-region storage table is read out. Thereafter, the processings in steps succeeding step SV02 are repeated.

If it is determined in step SV07 that the value of the index register j is equal to or greater than the value stored in the accumulation-point storage region, then the extended-memory-region storage table processing subroutine (the extended-memory-region storage table processing means 293) is ended.

In the main routine shown in FIG. 52, when the extended-memory-region storage table processing subroutine (the extended-memory-region storage table processing means 293) in step SU07 is ended, the reservation cancel processing subroutine (the reservation cancel processing means 102) is ended, and at the same time, the various-request processing subroutine (the various-request processing means 95) is ended.

If on the other hand it is determined in step SU05 that the logical address requested at present is not agreed with the start logical address stored in the ith record, then the processing proceeds to step SU08 in which the index register i is updated by adding "1" to its value. After the processing in step SU08 is ended, the processing returns to step SU02 in which the next record of the extended-memory-region information table is read out. Thereafter, the processings in steps succeeding step SU02 are repeated.

If on the other hand it is determined in step SU03 that the contents of the ith record of the extended-memory-region information table are the EOF code, then the processing proceeds to step SU09. In step SU09, the error-signal outputting means 296 outputs the error signal to the I/F controller 25, thereby the processing being ended forcibly.

As described above, according to the reproducing apparatus of the present invention, the ROM data Dr reproduced by the reproduction means, i.e., reproduced by the optical pickup 3, the RF amplifier unit 21, the demodulator 22, and the decoder 24 in the order named are accumulated in the transfer buffer region TZ of the storage region of the data buffer 26. Thereafter, the accumulated ROM data Dr are transferred through the I/F controller 25 to the host computer 31. Since the data are transferred from the optical disk D, the recorded data of the optical disk D are reproduced by the reproduction means and temporarily accumulated in the transfer buffer region TZ. In this case, the data previously accumulated in the transfer buffer region TZ are erased and the data transferred at present are overwritten therein.

According to the embodiment of the present invention, even if a plurality of extended memory regions EZ are randomly allocated to the data buffer 26, the extended memory regions EZ are dealt as pseudo write-protect regions and the ROM data Dr are continuously accumulated only in the transfer buffer region TZ without the extended memory region EZ being used. Therefore, even if the ROM data Dr is of a large number of sectors, it is possible to transfer such ROM data Dr to the host computer 31 without restriction of the extended memory region EZ.

When the data is transferred via the transfer buffer region TZ, the data transferred at present are accumulated in the transfer buffer region TZ from the address next to the end logical address of the region where the previous data are accumulated, and information of=the data (such as the addresses of the optical disk D or the like) are registered in the transfer-buffer-region storage table. As a result, whenever the data transfer is requested, the data transferred based on the request are randomly accumulated in the transfer buffer region TZ. Specifically, a large number of data having different addresses supplied from the optical disk D are stored in the transfer buffer region TZ, which increases the possibility that when the data reading is requested, the data to be read out is accumulated in the transfer buffer region TZ. Therefore, it is possible to reduce the access time required when the data reading is requested.

The ROM data Dr reproduced by the above reproduction means are accumulated in the extended memory region EZ of the storage region of the data buffer 26, too. In this case, unlike accumulation of the data in the transfer buffer region TZ, it is inhibited to overwrite the data in the region where the accumulated data are kept. Specifically, the data once accumulated in the extended memory region EZ are kept in the extended memory region EZ regardless of the later reading of the data from the optical disk D.

Accordingly, if the data of the address which is very frequently read out from the optical disk D is accumulated in the extended memory region EZ and the data of other addresses are temporarily accumulated in the transfer buffer region TZ, then it is unnecessary that every time the data of the address which is frequently read out is transferred to the host computer 31, the data is read out from the corresponding address of the optical disk D through the reproducing means. Therefore, it is possible to transfer the data accumulated in the extended memory region EZ directly to the host computer 31.

As a result, time of data access to the reproducing apparatus does not depend upon a mean access time of the reproducing apparatus. Therefore, it is possible for the reproducing apparatus to present its pseudo performance which allows data access faster than means access time.

Thus, according to the reproducing apparatus of the present invention, it is possible to achieve a full effect of use of the data buffer (e.g., the semiconductor memory) incorporated to improve the data transfer efficiency. It is possible to efficiently transfer the data recorded on the optical disk D to the host computer 31.

By inputting the extended-memory-region writing command from the host computer 31 to the I/F controller 25 and the system controller 29, it is possible to accumulate the data transferred from the host computer 31 in the extended memory region EZ. In this case, when the host computer 31 is short of its memory capacity, it is possible to utilize the extended memory region EZ as an external storage apparatus of the host computer 31.

Since the I/F controller 25 and the system controller 29 respectively have the reservation-requesting means 76 and the reservation processing means 96 both of which logically divide the storage region of the data buffer 26 into the transfer buffer region TZ and the extended memory region EZ, if the host computer 31 does not request reservation of the extended memory region EZ, the storage region is used as the transfer buffer region TZ only as it is and the data reproduced from the optical disk D are transferred through the storage region to the host computer 31.

Based on the reservation-request command supplied from the host computer 31, the reservation requesting means 76 and the reservation processing means 96 divide the storage region into the transfer buffer region TZ and the extended memory region EZ. Thereafter, the above-mentioned data access is carried out with the transfer buffer region TZ and the extended memory region EZ being employed. Specifically, it is possible to transfer the data of the randomly read-out address from the optical disk D through the transfer buffer region TZ to the host computer 31 and to transfer the data of the frequently read-out address from the optical disk D through the transfer buffer region TZ to the host computer 31. It is possible to accumulate the data supplied from the host computer 31 in the extended memory region EZ.

As described above, according to the arrangement of this embodiment, when the storage region of the data buffer 26 is used as the transfer buffer region TZ to which data is transferred only from the optical disk D and further a part of the storage region is used as the extended memory region EZ to which the data is transferred from both of the optical disk D and the host computer 31, it is possible to realize such partition of the storage region only with the reservation-request command supplied from the host computer 31. Therefore, it is possible to fully utilize the data buffer 26 (the semiconductor memory) incorporated in the reproducing apparatus.

Since the reproducing apparatus according to the present invention includes the extended read requesting means 78 and the extended read processing means 98 for, only upon the first request to read data from a predetermined address previously determined on the optical disk D, transferring the data recorded in the address of the optical disk D through the extended memory region EZ to the host computer 31, the extended-memory-region transfer requesting means 81 and the extended-memory-region transfer processing means 101 for transferring the data stored in the extended memory region EZ to the host computer 31 upon the second request and the succeeding requests, and the reading requesting means 77 and the reading processing means 97 for, upon the request to read data of an address other than the predetermined address of the optical disk D, transferring the data recorded in the address of the optical disk D through the transfer buffer region TZ to the host computer 31, the reproducing apparatus has the following advantages.

When the host computer 31 requests the reproducing apparatus to read the data recorded on the optical disk D of the address other than a predetermined address, which is determined previously, at the first time, the reading requesting means 77 and the reading processing means, 97 transfer the ROM data Dr reproduced by the reproducing means through the transfer buffer region TZ to the host computer 31. When the data of the address other than the predetermined address are transferred to the host computer 31 at the second time or the succeeding time, the reading requesting means 77 and the reading processing means 97 transfer the ROM data Dr reproduced by the reproducing means through the transfer buffer region TZ to the host computer 31. Specifically, the data is successively overwritten in the transfer buffer region TZ and transferred to the host computer 31.

On the other hand, when the host computer 31 requests the reproducing apparatus to read the data of the predetermined address of the optical disk D at the first time, the extended read requesting means 78 and the extended read processing means 98 accumulate the data of the predetermined address reproduced by the reproducing means in the extended memory region EZ of the data buffer 26. Thereafter, the extended read requesting means 78 and the extended read processing means 98 transfer the data accumulated in the extended memory region EZ to the host computer 31.

When the data of the predetermined address is transferred to the host computer 31 at the second time or the succeeding time, the extended-memory-region transfer requesting means 81 and the extended-memory-region transfer processing means 101 transfer the data accumulated in the extended memory region EZ to the host computer 31. Specifically, when the data of the predetermined address is transferred to the host computer 31, it is unnecessary to read the data by the reproducing means from the designated address of the optical disk D, and it is possible to transfer the data accumulated in the extended memory region EZ directly to the host computer 31. This transfer drastically reduces the data access time.

According to the arrangement of this embodiment, the reproducing apparatus includes the block-transfer requesting means 79 and the block-transfer processing means 99 for transferring the data temporarily stored in the transfer buffer region TZ to the extended memory region EZ based on the block-transfer-request command from the host computer 31. When the reading requesting means 77 and the reading processing means 97 accumulate in the transfer buffer region TZ the data of the second predetermined address which is determined later, the block-transfer requesting means 79 and the block-transfer processing means 99 transfer the data accumulated in the transfer buffer region TZ to the extended memory region EZ based on the block-transfer-request command from the host computer 31.

This transfer is effective when the data of the frequently read-out address is found out later. Some data of the addresses frequently read out are determined previously, other data of the addresses frequently read out are found out later while the reproducing apparatus is being used. According to this embodiment, when the reading requesting means 77 and the reading processing means 97 accumulate the data of the frequently read-out address, which are found out later, in the transfer buffer region TZ, it iS possible for the block-transfer requesting means 79 and the block-transfer processing means 99 to transfer the data from the transfer buffer region TZ to the extended memory region EZ to accumulate the data in the extended memory region EZ. When the data of the frequently read-out address which is found out later is transferred upon the second request or the succeeding time, it is possible to transfer not the data recorded on the optical disk D but the data accumulated in the extended memory region EZ to the host computer 31. As a result, it is possible to transfer the data between the reproducing apparatus and the! host computer 31 more efficiently.

Since the block-transfer-request command is consist of the address of the optical disk D and the relative sector, it is possible for the host computer 31 to select from the data accumulated in the transfer buffer region TZ only the data such as coefficient data, arithmetic parameters or the like which are frequently used. Moreover, it is possible to accumulate the data in the predetermined region of the extended memory region EZ which is determined based on the command.

Since the reproducing apparatus includes the extended write requesting means 80 and the extended write processing means 100 both for writing the data transferred from the host computer 31 in the extended memory region EZ based on the data-write-request command from the host computer 31, it is possible for the extended write requesting means 80 and the extended write processing means 100 to accumulate the data transferred from the host computer 31 in the extended memory region Ez based on the data-write-request command from the host computer 31. In this case, it is possible to use the extended memory region EZ as the external storage apparatus of the host computer 31 when the host computer 31 is short of its memory capacity.

According to this embodiment, the reproducing apparatus includes the reservation-cancel processing means 102 for canceling the logical division, that is carried out by the reservation requesting means 76 and the reservation processing means 96, of the data buffer 26 into the transfer buffer region TZ and the extended memory region EZ based on the reservation-cancel-request command from the host computer 31 to reset the extended memory region EZ as the transfer buffer region TZ. This reservation cancel processing is effective in the following cases.

Specifically, when the host computer 31 does not need to frequently access the optical disk on which the fixed data is recorded (e.g., the optical disk where the data is recorded in a sequential-file system), by setting the extended memory region EZ as the transfer buffer region EZ by the reservation-cancel processing means 102, it is possible to increase the data size to be transferred once. Consequently, it is possible to efficiently reduce the time of the data access to such optical disk.

While the data buffer 26 is formed of the volatile semiconductor memory such as the DRAM and the SRAM in this embodiment, the following arrangement can be employed. Specifically, the data buffer is previously divided into the storage region which is to be the extended memory region EZ and the storage region which is to be the transfer buffer region TZ (e.g., when specification and design of the reproducing apparatus are determined). The region for the transfer buffer region TZ is formed of the volatile semiconductor memory (volatile RAM) and the region for the extended memory region is formed of the non-volatile memory (non-volatile RAM) such as a flash memory, an electrically erasable programmable read-only memory (EEPROM) or the like.

The I/F controller 25 includes a first memory controller for controlling access to the transfer buffer region TZ (the volatile RAM) and a second memory controller for controlling access to the extended memory region EZ (the non-volatile RAM), controlling the memory controllers based on the request from the system controller 29.

In this case, the extended write requesting means 80 and the extended write processing means 100 write in the extended memory region EZ the data composed by the program activated in the reproducing apparatus, such as the logical address to be read next and the various parameters, and the data composed by the program operating in the host computer 31, such as the frequently read-out address which is found out later and the various parameters. As a result, it is possible to keep such data even after the reproducing apparatus is de-energized or even upon sudden interruption of the power supply. This arrangement allows the easy system integrity.

While this embodiment mainly employs the CD-ROM as the optical disk D, the present invention is not limited thereto. It is possible to apply the present invention to a read-only phase-change optical disk and a read-only magneto-optical disk. Only by incorporation of an arithmetic circuit for each format in the demodulator, the reproducing apparatus can read the above optical disks. Other arrangements are similar to those shown in FIG. 1. Specifically, the demodulator 22 outputs the same data even if the optical disk D of any kind is used. It is possible to access to the data buffer 26 regardless of sorts of the optical disk D.

According to the present invention, the reproducing apparatus employs a disk-like recording medium and includes a rotating means for rotating the disk-like recording medium, the reproducing means for reproducing the information data from the disk-like recording medium, a control means for controlling at least the rotating means and the reproducing means, a storage means for temporarily storing the information data reproduced by the reproducing means, and the interface means for transferring the information data stored in the storage means based on the reading request from the control means. The storage region of the storage means is divided into the transfer buffer region to which the data is transferred from the disk-like recording medium and the extended memory region to which the data is transferred from any means and in which the data cannot be overwritten in the data-recorded portion. Therefore, it is possible to accumulate the data of the frequently read-out address recorded on the disk-like recording medium in the extended memory region and temporarily accumulate the data of other address in the transfer buffer region. As a result, it becomes unnecessary for the reproducing means to read the data from the address of the disk-like recording medium every time when the data of the frequently read-out address is transferred to the external apparatus. It is possible to transfer the data accumulated in the extended memory region directly to the external apparatus.

As a result, the time of the data access to the reproducing apparatus does not depend upon a mean access time of the reproducing apparatus. Therefore, it is possible for the reproducing apparatus to present its pseudo performance which allows data access faster than means access time.

Thus, according to the reproducing apparatus of the present invention, it is possible to achieve a full effect of the storage means (e.g., the semiconductor memory) incorporated to improve the data transfer efficiency. It is possible to efficiently transfer the data recorded on the disk-like recording medium to the external apparatus.

Since the data is transferred to the extended memory region from any means or apparatus, it is possible to accumulate the data transferred from the external apparatus in the extended memory region EZ. In this case, when the external apparatus is short of its memory capacity, it is possible to utilize the extended memory region EZ as an external storage apparatus of the external apparatus.

According to the present invention, the reproducing apparatus includes the extended-memory-region reserving means for logically dividing the storage region of the storage means into the transfer buffer region and the extended memory region based on the extended-memory-region reservation request from the external apparatus. Therefore, when the storage region of the storage means is employed as the transfer buffer region to which the data is transferred from only the disk-like recording medium and a part of the storage region is employed as the extended memory region to which the data is transferred from any means, medium and apparatus, it is possible to realize such partition only by the extended-memory-region reservation request from the external apparatus. Consequently, it is possible to fully utilize the storage means (the semiconductor memory) incorporated in the reproducing apparatus. It is possible to achieve the full effect presented by the storage means.

According to the present invention, the reproducing apparatus includes a first transfer means and a second transfer means. Only when the external apparatus requests the reproducing apparatus to read the data of the predetermined address, the is previously determined, of the disk-like recording medium at the first time, the first transfer means transfers the data of the address of the disk-like recording medium through the extended memory region to the external apparatus. When the external apparatus requests the reproducing apparatus to read the data at the second time or later, the first transfer means transfers the data stored in the extended memory region to the external apparatus. When the external apparatus requests the reproducing apparatus to read the data of the address other than the predetermined address of the disk-like recording medium, the second transfer means transfers the data of the address through the transfer buffer region to the external apparatus. Therefore, it is unnecessary to read the data from the predetermined address of the disk-like recording medium every time when the data of the predetermined address is transferred to the external apparatus. It is possible to transfer the data accumulated in the extended memory region directly to the external apparatus.

According to the present invention, the reproducing apparatus includes a third transfer means for transferring the data temporarily stored in the transfer buffer region to the extended memory region based on the inter-region transfer request from the external apparatus. This transfer is effective when the frequently read-out address is found out later. Specifically, some frequently read-out address are previously determined, other frequently read-out addresses are found out later while the reproducing apparatus is being used. According to the present invention, when the second transfer means accumulates the data of the frequently read-out address, that is found out later, in the transfer buffer region, it is possible to transfer the data to the extended memory region to store it therein. After the second transfer, when the data of the frequently read-out address, that is found out later, is transferred, it is possible to transfer not the data recorded on the disk-like recording medium but the data accumulated in the extended memory region to the external apparatus. As a result, it is possible to transfer the data between the reproducing apparatus and the external apparatus more efficiently.

According to the reproducing apparatus of the present invention, since the reproducing apparatus includes the data writing means for writing the data transferred from the external apparatus in the extended memory region EZ based on the data writing request command from external apparatus, it is possible for the data writing means to accumulate the data transferred from the external apparatus in the extended memory region based on the data writing request command from the external apparatus. It is possible to use the extended memory region EZ as the external storage apparatus of the external apparatus when the external apparatus is short of its memory capacity.

According to the present invention, the reproducing apparatus includes the reservation canceling means for canceling the logical division, that is carried out by the extended-memory-region reserving means, of=the storage means into the transfer buffer region and the extended memory region based on the reservation cancel request command from the external apparatus to reset the extended memory region as the transfer buffer region. Therefore, when the external apparatus does not need to frequently access the disk-like recording medium on which the fixed data is recorded (e.g., the disk-like recording medium where the data is recorded in a sequential-file system), by setting the extended memory region as the transfer buffer region Z by the reservation canceling means, it is possible to increase the data size to be transferred once. Consequently, it is possible to efficiently reduce the time of the data access to such disk-like recording medium.

According to the reproducing apparatus of the present invention, the extended memory region of the storage region is formed of the non-volatile semiconductor memory. Therefore, by writing it the extended memory region by the data writing means the data composed by the program activated in the reproducing apparatus, such as the read address and the various parameters, and the data composed by the program operating in the external apparatus, such as the frequently read-out address which is found out later and the various parameters. As a result, it is possible to keep the data even after the reproducing apparatus is de-energized and even upon sudden interruption of the power supply. This allows the easy system integrity.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A reproducing apparatus comprising:
    rotating means operative to set a disk-like recording medium thereon and rotating said disk-like recording medium;
    reproducing means for reproducing information data from said disk-like recording medium;
    control means for controlling at least said rotating means and said reproducing means;
    memory means for temporarily storing information data reproduced by said reproducing means; and
    interface means for transferring information data stored in said memory means to an external device in accordance with a read request supplied thereto from said control means, wherein a memory region of said memory means is assigned to a transfer buffer region whose data transfer destination is said disk-like recording medium and an extended memory region from which data is transferred to an arbitrary destination and in which data is inhibited from being replaced to a region in which data is recorded.

2. A reproducing apparatus according to claim 1, further comprising extended memory reserve means for logically assigning said memory region of said memory means to said transfer buffer region and said extended memory region based on an extended memory reserve request from said external device.

3. A reproducing apparatus according to claim 1, further comprising first transfer means for transferring data of a predetermined address on said disk-like recording medium in response to a data read request for reading the predetermined address previously-determined on said disk-like recording medium through said extended memory region to said external device only when said data read request is issued once and transferring data stored in said extended memory region to said external device without accessing said disk-like recording medium after said data request is issued twice or more and second transfer means for transferring data of corresponding address on said disk-like recording medium through said transfer buffer region to said external device when data other than data of said predetermined address on said disk-like recording medium is requested to be read out.

4. A reproducing apparatus according to claim 1 further comprising third transfer means for transferring data temporarily stored in said transfer buffer region to said extended memory region on the basis of a region transfer request from said external device.

5. A reproducing apparatus according to claim 1, further comprising data write means for writing data transferred thereto from said external device in said extended memory region on the basis of a data write request from said external device.

6. A reproducing apparatus according to claim 2, further comprising reserve cancel means for canceling a logical allocation of said transfer buffer region and said extended memory region in said memory means by said extended memory reserve means on the basis of a reserve cancel request from said external device and changing a whole memory region of said memory means or a part of said extended memory region to said transfer buffer region.

7. A reproducing apparatus according to claim 1, wherein said extended memory region of said memory means is formed of a nonvolatile semiconductor memory.

* * * * *